FLIGHT COMPUTING SYSTEM AND APPARATUS

Original Filed Oct. 2, 1947 33 Sheets-Sheet 1

Inventor
RICHARD C. DEHMEL
by Orin R. Severn
his Attorney

FLIGHT COMPUTING SYSTEM AND APPARATUS

Original Filed Oct. 2, 1947

33 Sheets-Sheet 2

Inventor
RICHARD C. DEHMEL
by Orin R. Severn
his Attorney

July 15, 1958 R. C. DEHMEL 2,842,867

FLIGHT COMPUTING SYSTEM AND APPARATUS

Original Filed Oct. 2, 1947 33 Sheets-Sheet 3

Inventor
RICHARD C. DEHMEL
By Orin R. Severn
his Attorney

Inventor
RICHARD C. DEHMEL
by Orin R. Severn
his Attorney

Inventor
RICHARD C. DEHMEL
by Orin R. Severn
his Attorney

July 15, 1958 R. C. DEHMEL 2,842,867

FLIGHT COMPUTING SYSTEM AND APPARATUS

Original Filed Oct. 2, 1947 33 Sheets-Sheet 6

Inventor
RICHARD C. DEHMEL
by Orin R. Severn
his Attorney

July 15, 1958 R. C. DEHMEL 2,842,867

FLIGHT COMPUTING SYSTEM AND APPARATUS

Original Filed Oct. 2, 1947 33 Sheets-Sheet 7

Inventor

RICHARD C. DEHMEL by Orin R. Severn his Attorney

FLIGHT ANGLE γ = θ − ∝

INVENTOR.
RICHARD C. DEHMEL
BY Orin R. Brown
his ATTORNEY.

FLIGHT COMPUTING SYSTEM AND APPARATUS

Original Filed Oct. 2, 1947 33 Sheets-Sheet 9

Inventor
RICHARD C. DEHMEL
by Orin R. Severn
his Attorney

July 15, 1958 R. C. DEHMEL 2,842,867

FLIGHT COMPUTING SYSTEM AND APPARATUS

Original Filed Oct. 2, 1947 33 Sheets-Sheet 10

Inventor
RICHARD C. DEHMEL

By Orin R. Severn
his Attorney

Inventor
RICHARD C. DEHMEL
By Orin R. Severn
his attorney

July 15, 1958 R. C. DEHMEL 2,842,867

FLIGHT COMPUTING SYSTEM AND APPARATUS

Original Filed Oct. 2, 1947 33 Sheets-Sheet 12

Inventor
Richard C. Dehmel

By Alvin R. Sweeney
his Attorney

July 15, 1958 R. C. DEHMEL 2,842,867

FLIGHT COMPUTING SYSTEM AND APPARATUS

Original Filed Oct. 2, 1947

33 Sheets-Sheet 13

Inventor
RICHARD C. DEHMEL
By Orin R. Swern
his Attorney

Inventor
RICHARD C. DEHMEL
By Orin R. Severn
his Attorney

July 15, 1958 R. C. DEHMEL 2,842,867

FLIGHT COMPUTING SYSTEM AND APPARATUS

Original Filed Oct. 2, 1947 33 Sheets-Sheet 15

Inventor
RICHARD C. DEHMEL
by Orin R. Severn
his Attorney

Inventor
RICHARD C. DEHMEL
By Orin L. Severn
his Attorney

July 15, 1958 R. C. DEHMEL 2,842,867

FLIGHT COMPUTING SYSTEM AND APPARATUS

Original Filed Oct. 2, 1947

33 Sheets-Sheet 17

Inventor
RICHARD C. DEHMEL
By Orin R. Severn
his Attorney

July 15, 1958 R. C. DEHMEL 2,842,867

FLIGHT COMPUTING SYSTEM AND APPARATUS

Original Filed Oct. 2, 1947 33 Sheets-Sheet 18

Richard C. Dehmel
Inventor by Orin R. Severn
his Attorney

Inventor
RICHARD C. DEHMEL
By Orin R. Severn
his Attorney

Inventor
Richard C. Dehmel
by Alvin R. Sever[?]
his Attorney

FLIGHT COMPUTING SYSTEM AND APPARATUS

Original Filed Oct. 2, 1947

Inventor
RICHARD C. DEHMEL
By Orin R. Severn
his Attorney

July 15, 1958 R. C. DEHMEL 2,842,867

FLIGHT COMPUTING SYSTEM AND APPARATUS

Original Filed Oct. 2, 1947 33 Sheets-Sheet 22

Richard C. Dehmel
Inventor by Orin R. Sweeney
his Attorney

Richard C. Dehmel
Inventor by Orin R. Severn
his Attorney

July 15, 1958 R. C. DEHMEL 2,842,867

FLIGHT COMPUTING SYSTEM AND APPARATUS

Original Filed Oct. 2, 1947 33 Sheets-Sheet 24

Richard C. Dehmel
Inventor by Orin R. Severn
his Attorney

FLIGHT COMPUTING SYSTEM AND APPARATUS

Original Filed Oct. 2, 1947

Inventor
Richard C. Dehmel
by Orin R. Severn
his Attorney

Richard C. Dehmel
Inventor

By Orin R. Severn
his Attorney

INVENTOR.
RICHARD C. DEHMEL
BY Orin R. Severn
ATTORNEY.

July 15, 1958 R. C. DEHMEL 2,842,867

FLIGHT COMPUTING SYSTEM AND APPARATUS

Original Filed Oct. 2, 1947 33 Sheets-Sheet 28

INVENTOR.
RICHARD C. DEHMEL
BY
By Orin R. Severn
his ATTORNEY.

July 15, 1958 R. C. DEHMEL 2,842,867

FLIGHT COMPUTING SYSTEM AND APPARATUS

Original Filed Oct. 2, 1947 33 Sheets-Sheet 29

INVENTOR.

RICHARD C. DEHMEL

BY Orin R. Severn his ATTORNEY

FLIGHT COMPUTING SYSTEM AND APPARATUS

Inventor
RICHARD C. DEHMEL
by Orin R. Severn
his Attorney

July 15, 1958

R. C. DEHMEL 2,842,867

FLIGHT COMPUTING SYSTEM AND APPARATUS

Original Filed Oct. 2, 1947

33 Sheets-Sheet 31

INVENTOR.
RICHARD C. DEHMEL

BY

Orin R. Severn his ATTORNEY.

INVENTOR.
RICHARD C. DEHMEL
BY
Orin R. Severn
his ATTORNEY.

July 15, 1958 R. C. DEHMEL 2,842,867

FLIGHT COMPUTING SYSTEM AND APPARATUS

Original Filed Oct. 2, 1947 33 Sheets-Sheet 33

INVENTOR.
RICHARD C. DEHMEL

BY

Orin R. Severn
his ATTORNEY.

United States Patent Office 2,842,867

Patented July 15, 1958

2,842,867

FLIGHT COMPUTING SYSTEM AND APPARATUS

Richard C. Dehmel, Short Hills, N. J.

Continuation of abandoned application Serial No. 777,414, October 2, 1947. This application May 12, 1954, Serial No. 429,314

92 Claims. (Cl. 35—12)

This invention relates generally to flight computing and integrating systems and apparatus for automatically computing in the course of simulated flight maneuvers flight values, such as air speed, direction, rate of turn, climb and dive, altitude etc. thereby representing and, if desired, predicting flight conditions.

Specifically, in the embodiment illustrated the invention relates to aircraft training apparatus of the grounded or emplaced type having simulated aircraft controls and flight instruments responsive to the operation of said controls for simulating actual maneuvers.

This application is a continuation of my co-pending application, Serial No. 777,414, filed October 2, 1947, now abandoned, for "Flight Computing System and Apparatus."

Flight training systems of this general character are disclosed in my Patent No. 2,366,603, granted January 2, 1945, for "Aircraft Training Apparatus," and also in my Patent No. 2,494,508, granted January 10, 1950, for "Means for Aircraft Flight Training," the systems therein disclosed being adapted to simulate the usual maneuvers involved in the early training of student pilots. Flight simulating and computing apparatus of the character herein shown is disclosed but not generically claimed in my co-pending application Serial No. 29,066, now Patent No. 2,687,580, filed May 25, 1948.

The present invention is concerned mainly with more advanced training technique, as well as with preliminary or basic training technique, and with the simulation of complicated flight maneuvers including inside and outside loops, inverted flying, spirals, spins, stalls and rolls.

The principal object of this invention therefore is to provide an improved flight computing and integrating system and apparatus particularly adapted for grounded aircraft trainers that is precise, efficient and so flexible in its operation that it can be used for practicing all flight maneuvers to a degree of accuracy closely simulating actual aircraft operation.

A further object of the invention is to provide an improved flight computing and integrating system that takes into account most factors of importance entering into modern flight navigation so that the pilot may be confronted with problems such as icing, rough air, yawing, side-slip, stall, etc. and can use standard procedure realistically in take-off, flight and landing such as for example, the raising and lowering of landing gear, operation of flaps, trimming of ship, regulation of manifold pressure, navigating by compass, etc.

A further object of the invention is to provide an improved electronic flight computing and integrating system that is based on and operates in general according to fundamental aerodynamic principles of flight. Specifically, an interconnected servo system including automatic balancing servo actuated potentiometers is controlled by electrical quantities derived according to the operation of simulated aircraft controls and the respective servo units representing flight factors such as air speed, direction, altitude, pitch, rolls, angle of attack, etc. modify the operation of each other so that variation in a single control factor for example requires that the entire system search for a new position of balance, thereby simulating the inherent aerodynamic equilibrium of airplanes.

The invention will be more fully set forth in the following description referring to the accompanying drawings, and the features of novelty will be pointed out with particularity in the claims annexed to and forming a part of this specification.

Referring to the drawings Fig. 1 is an outline view in perspective of a grounded flight trainer embodying the present invention;

Figure 35A:
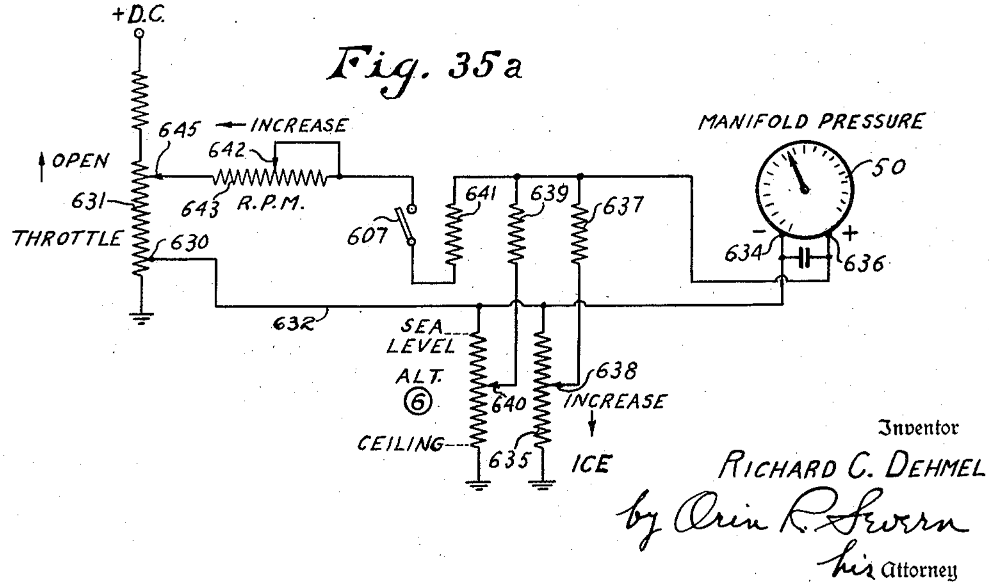
Figure 12:
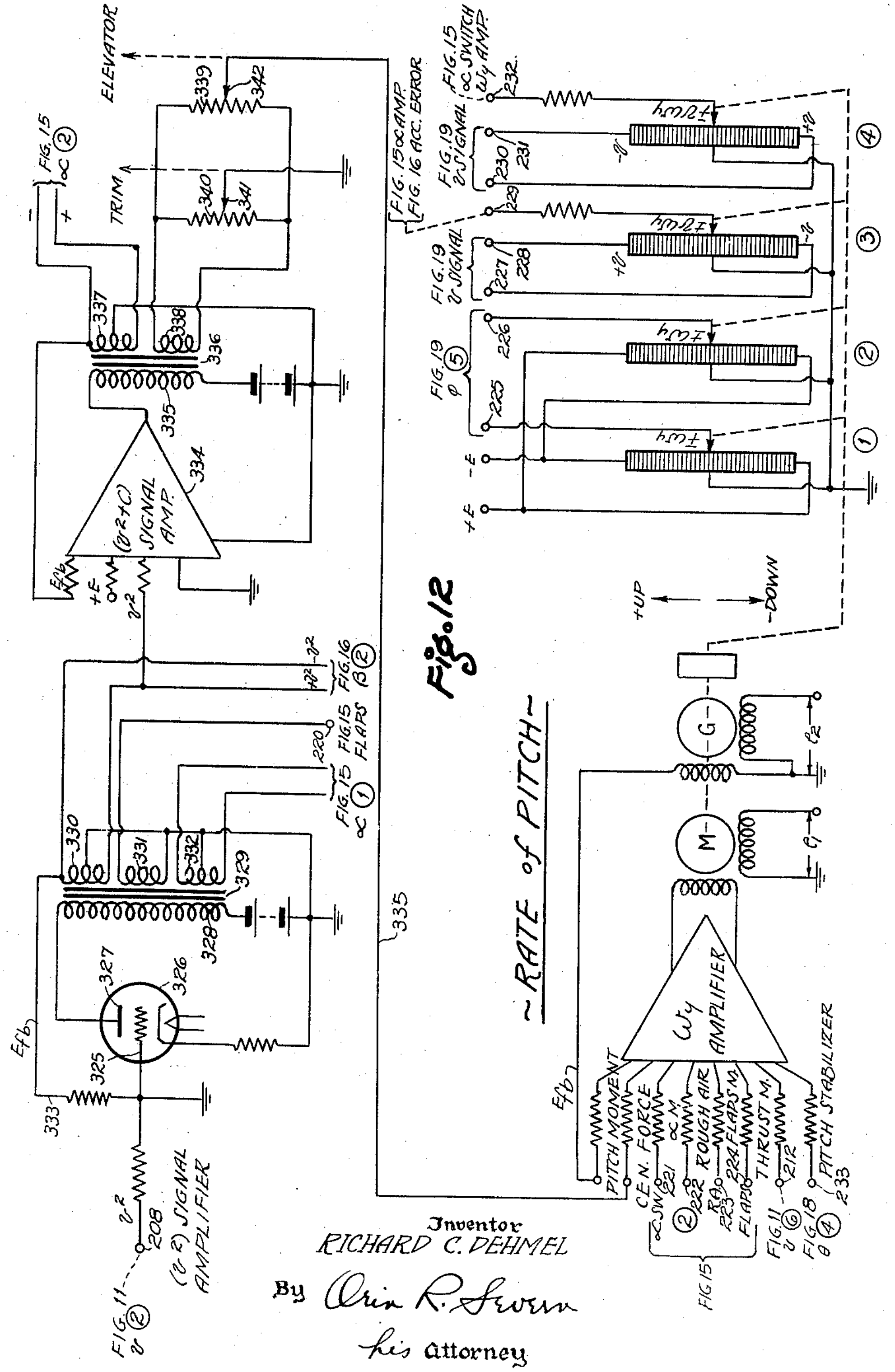
Figure 14:
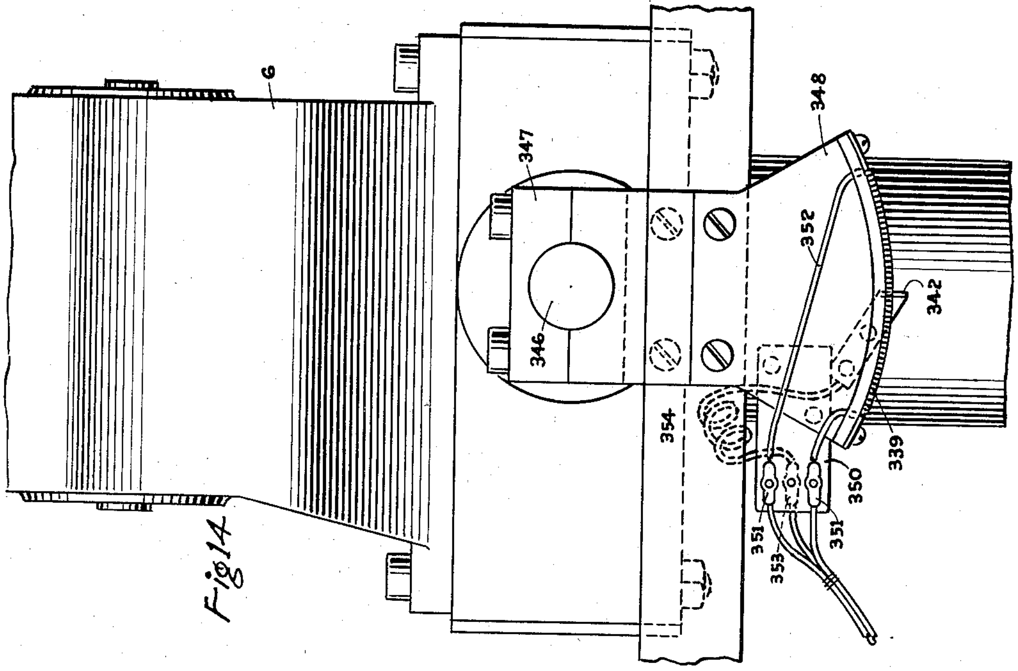
Figure 13:
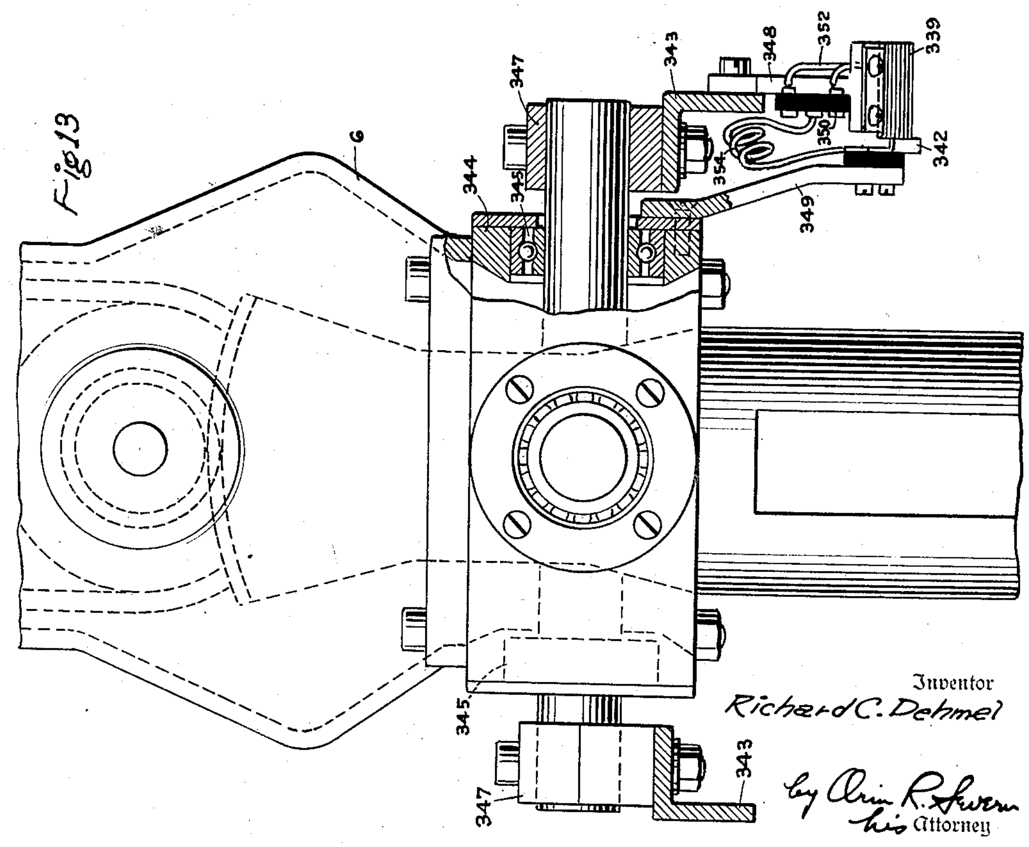
Figure 15:
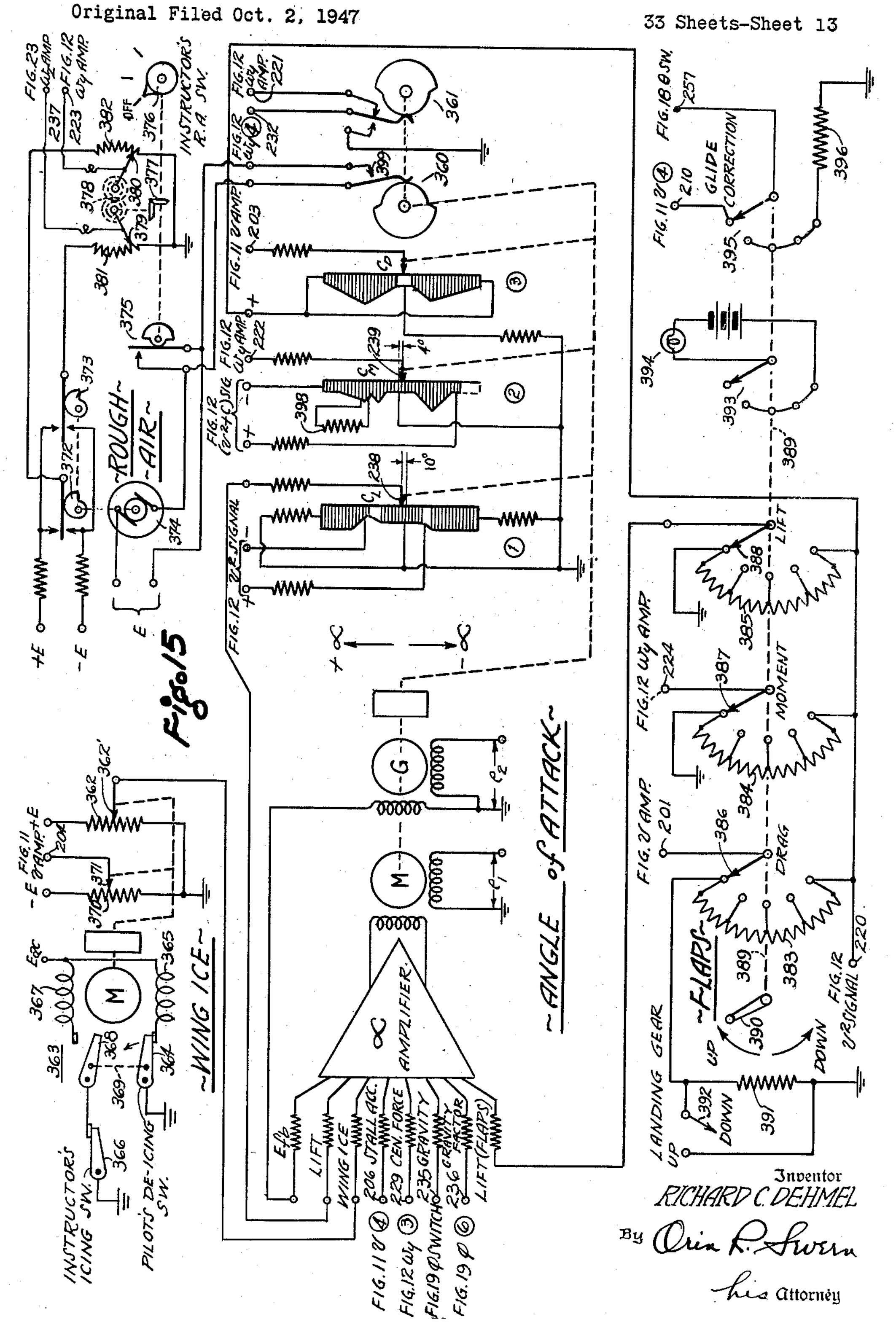
Figure 16:
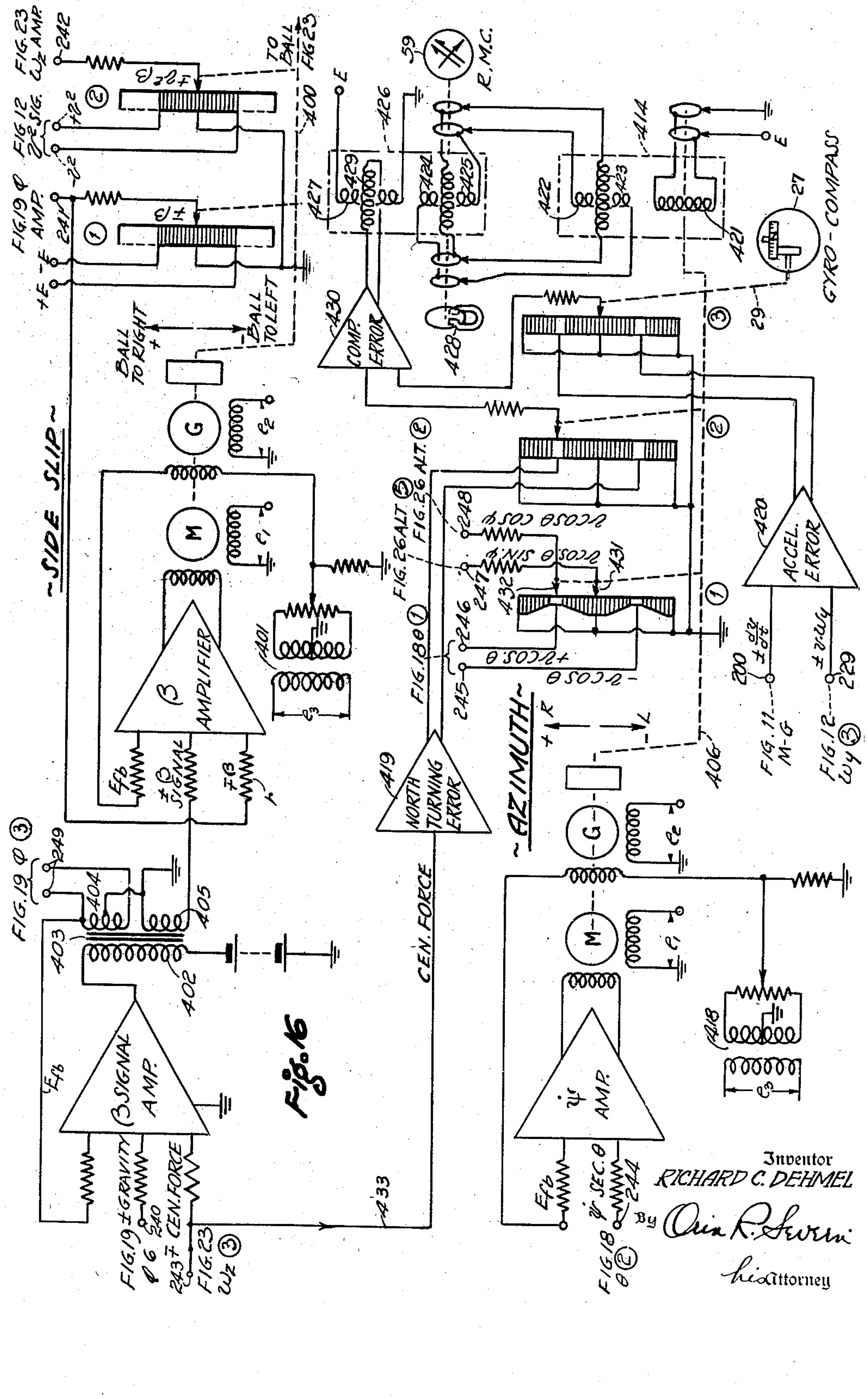
Figure 17:
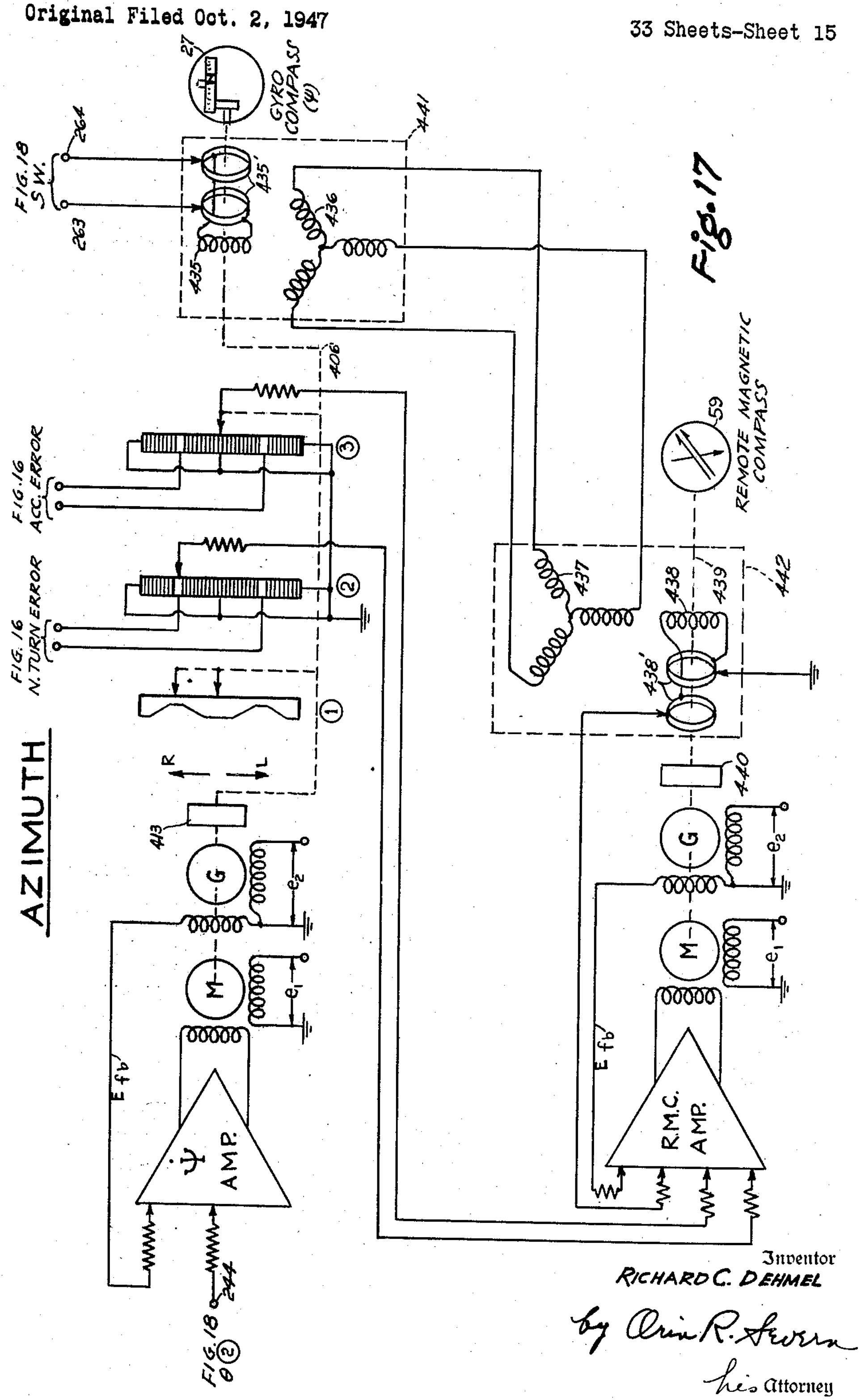
Figure 18:
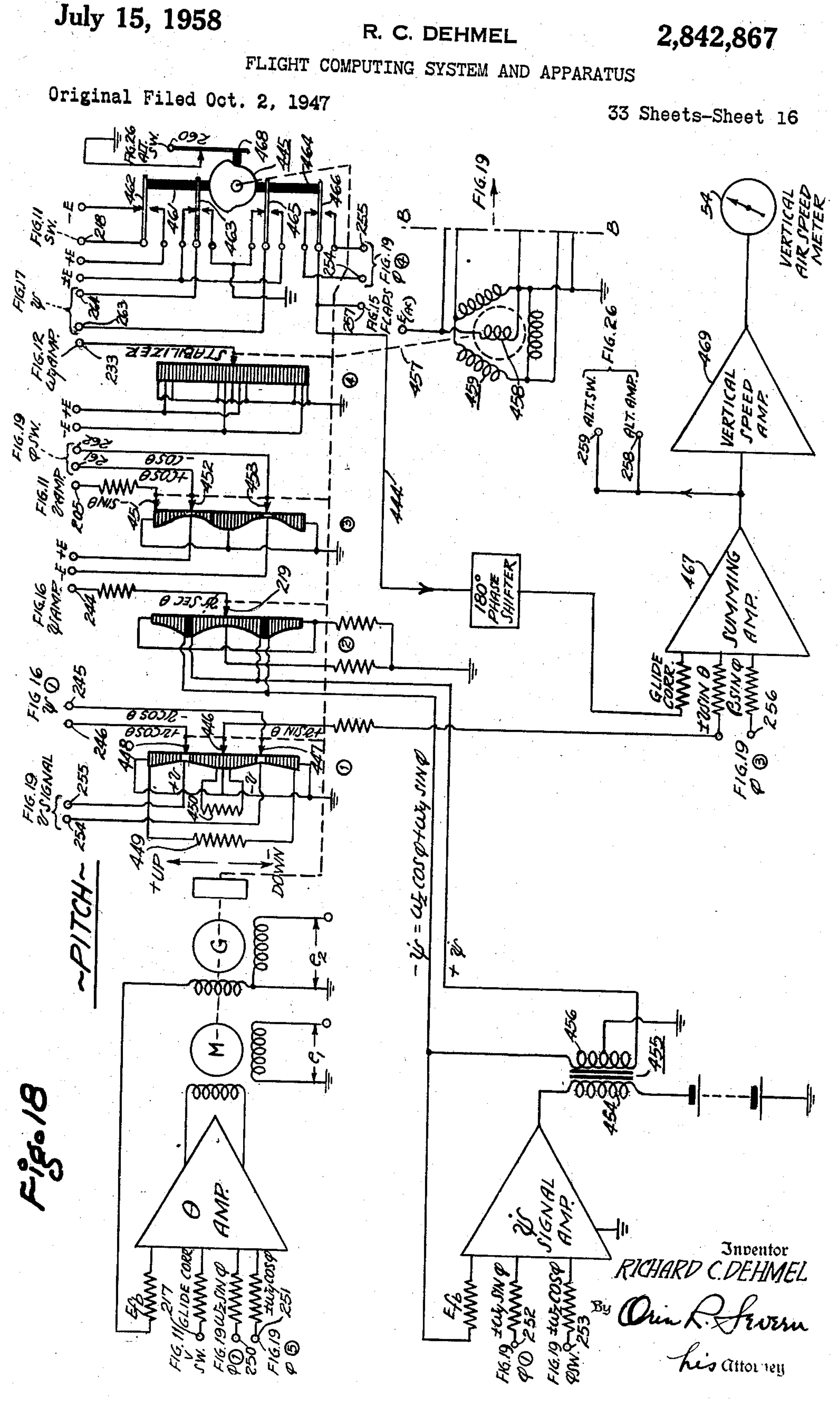
Figures 19, 20:
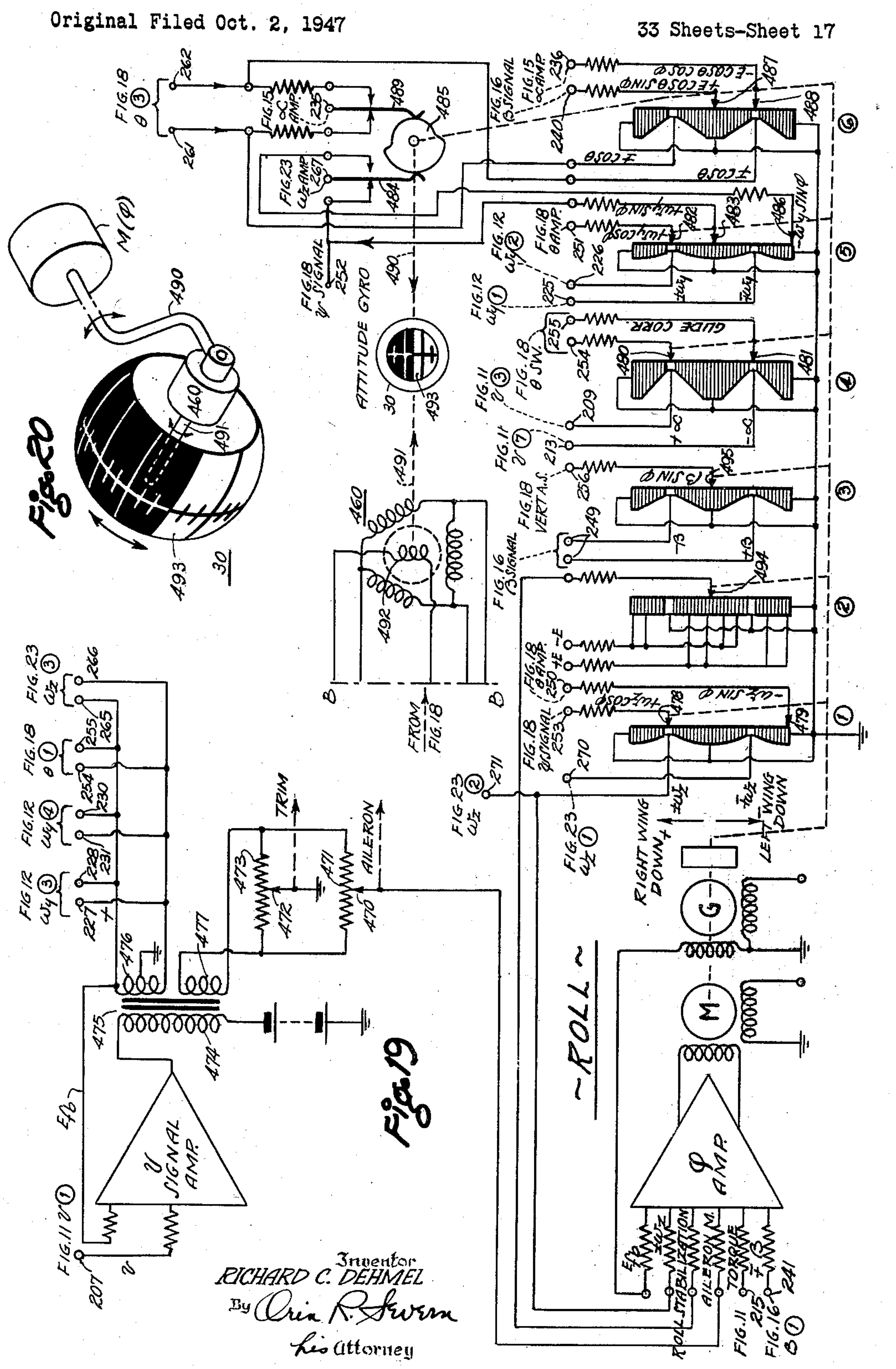
Figure 21:
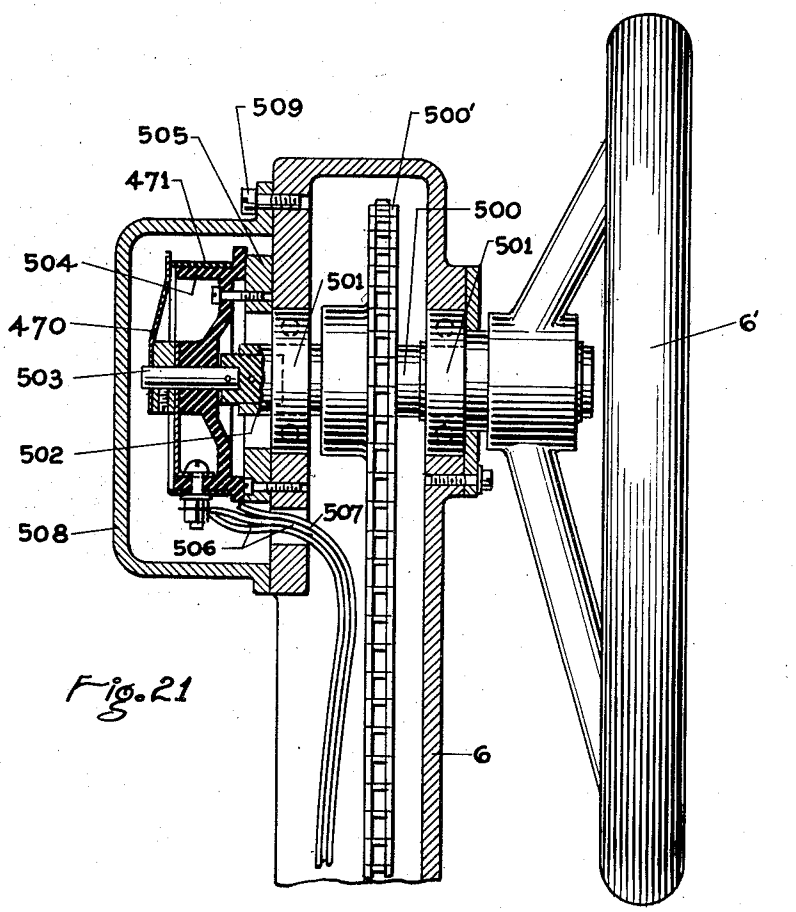
Figure 22:
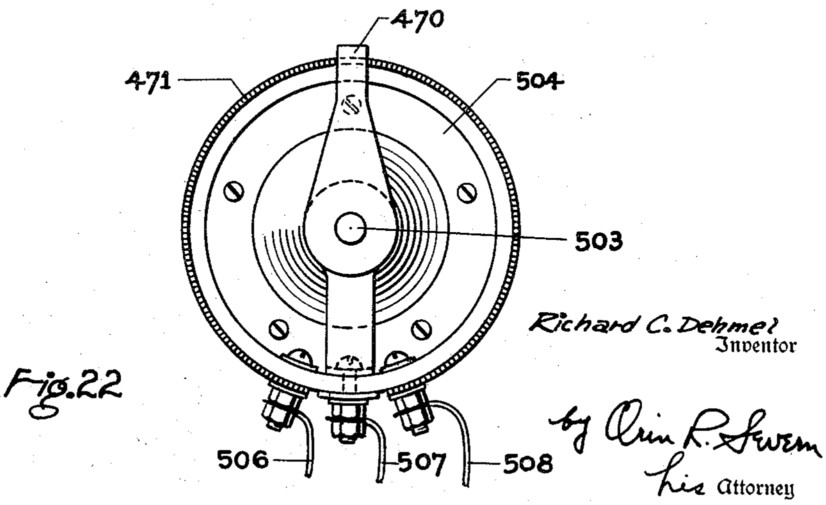
Figure 23:
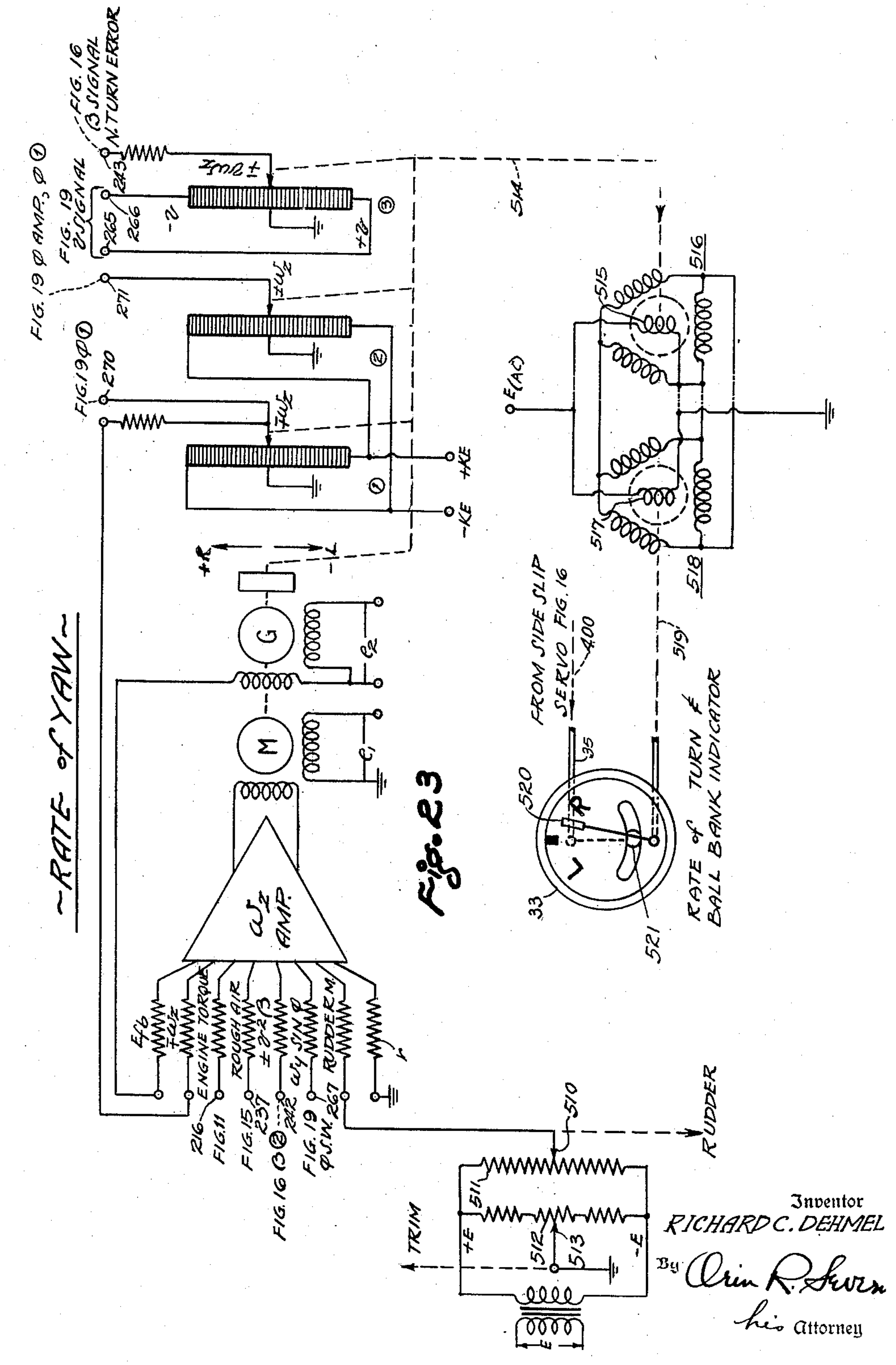
Figure 25:
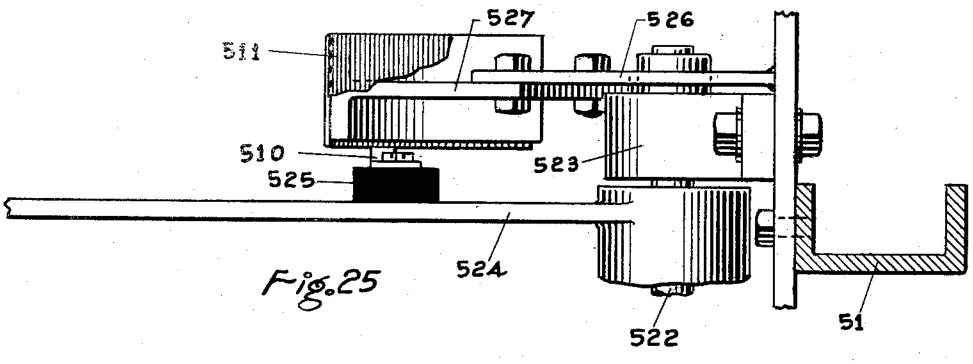
Figure 24:
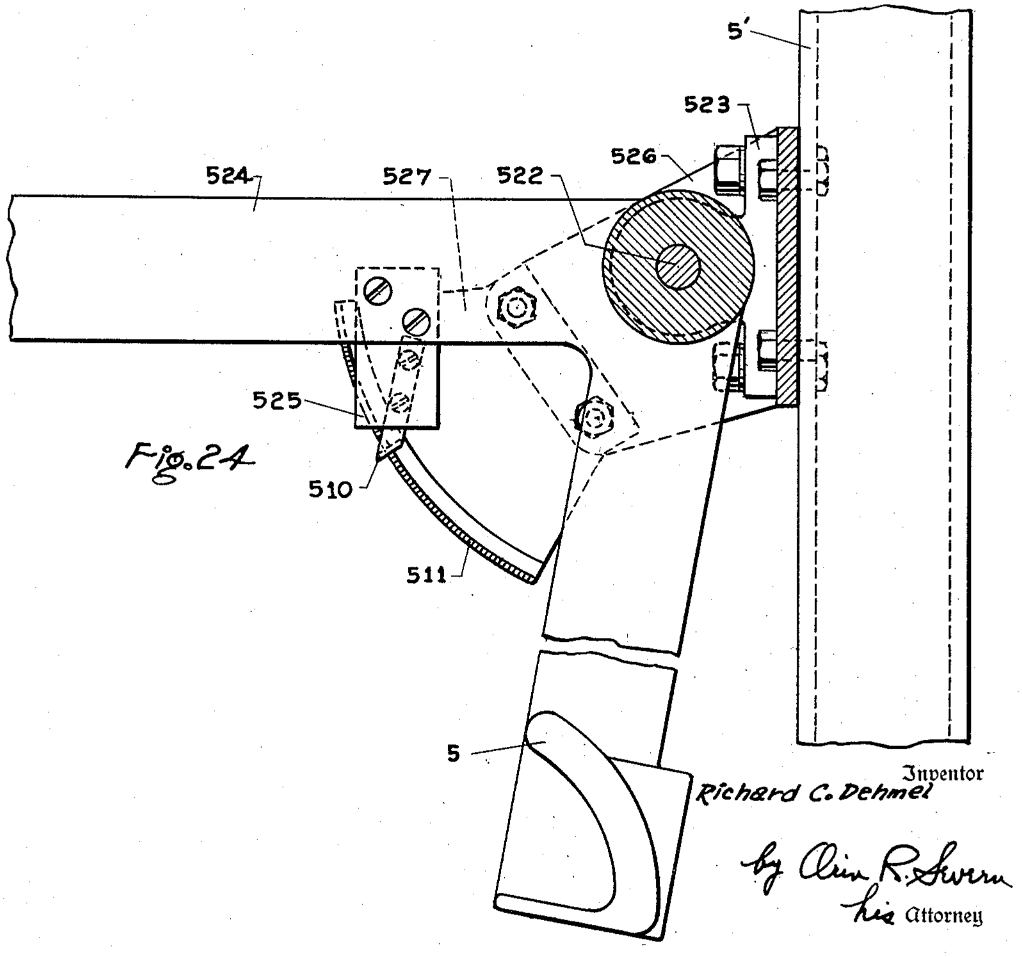
Figure 26:
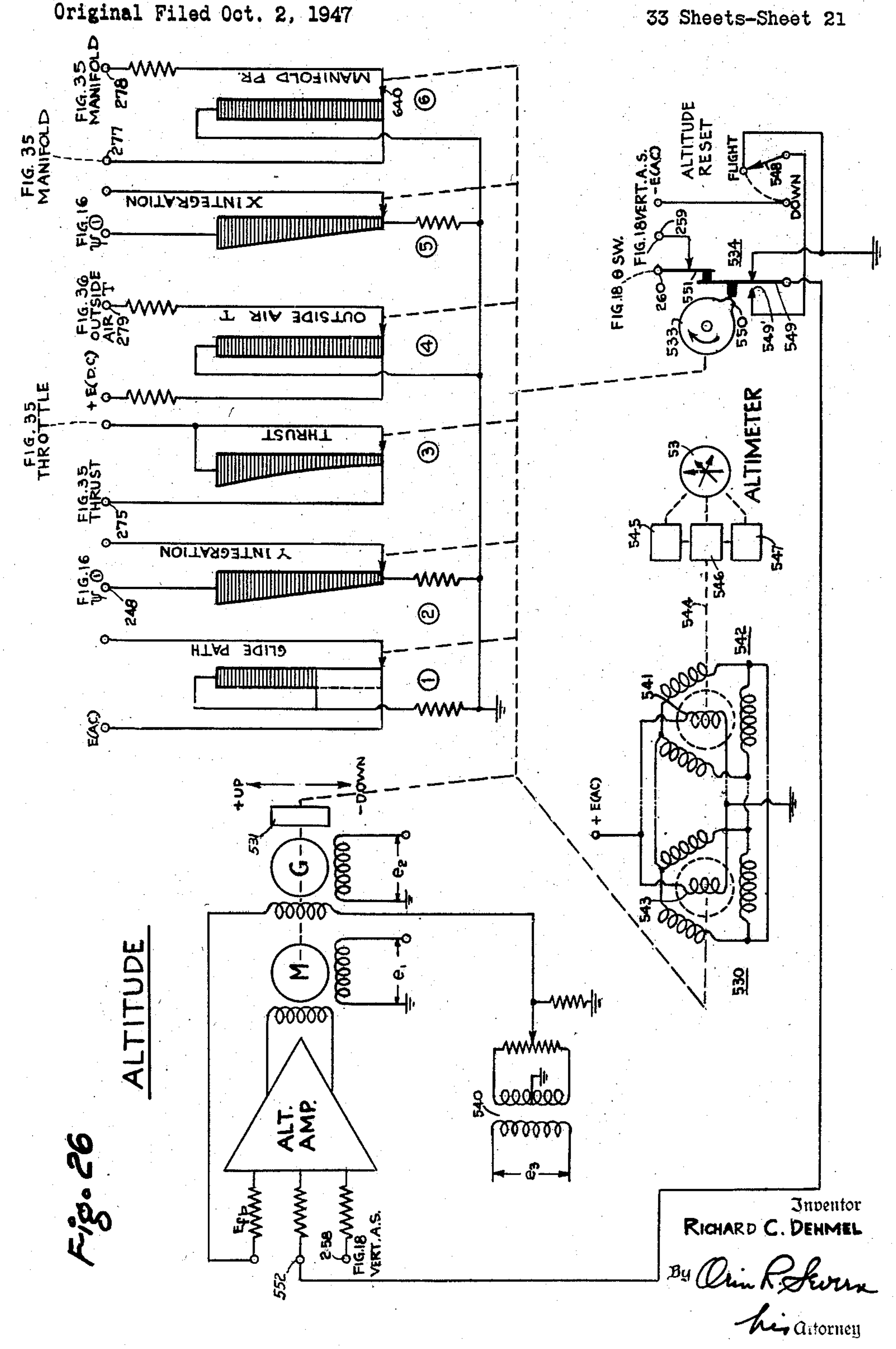
Figure 27:
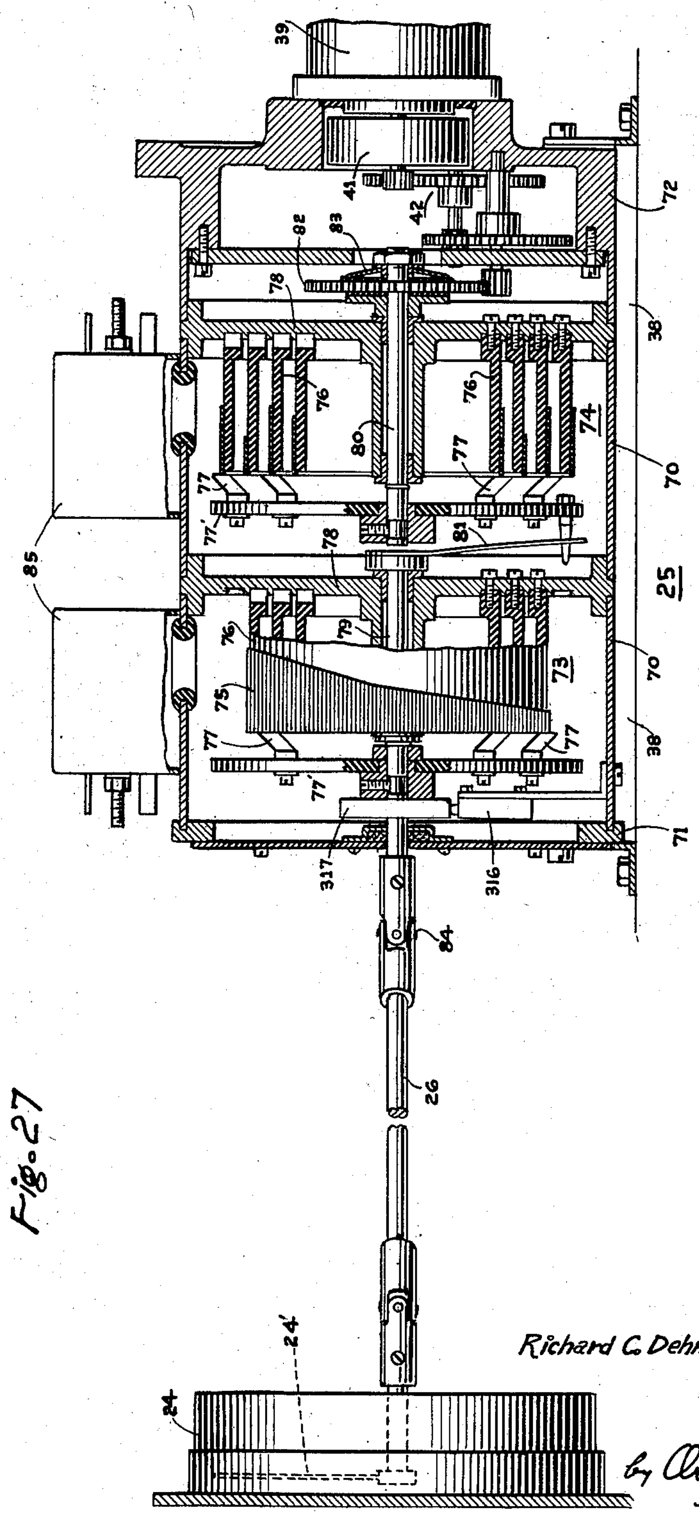
Figure 28:
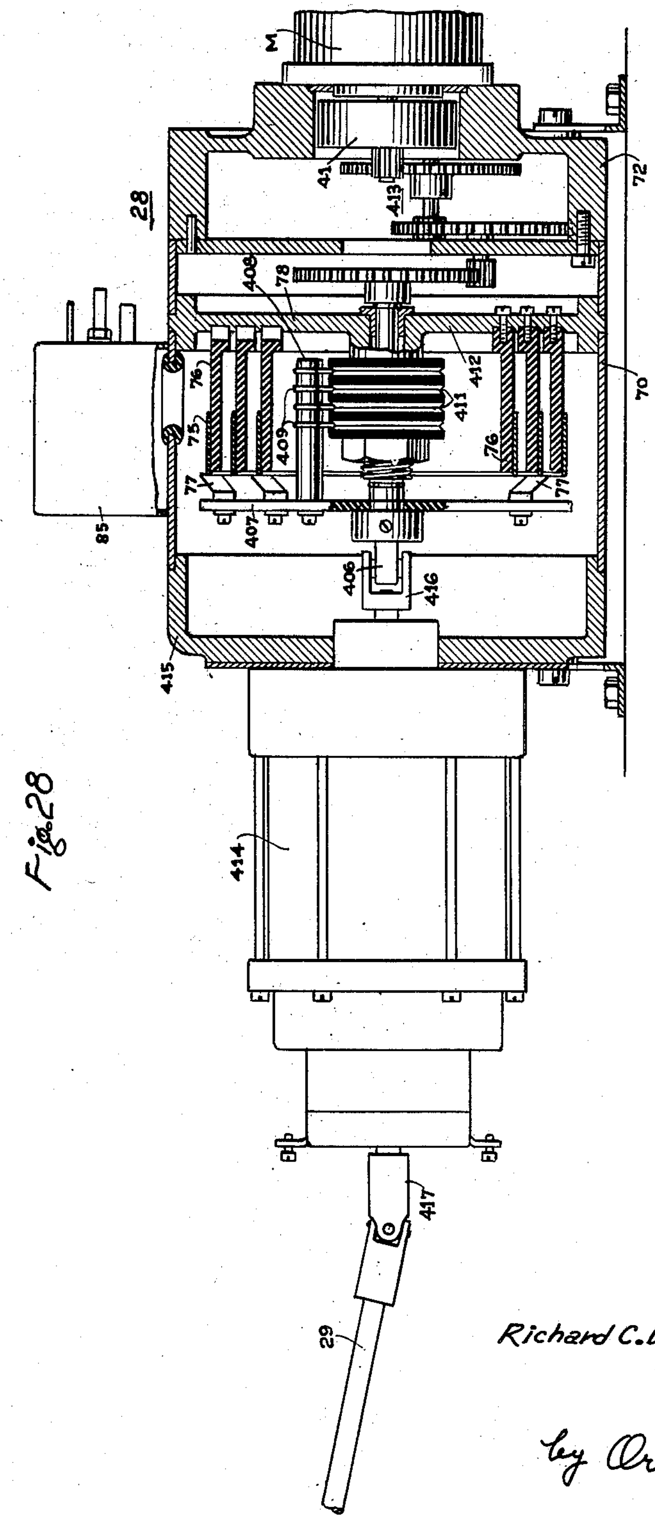
Figure 29:
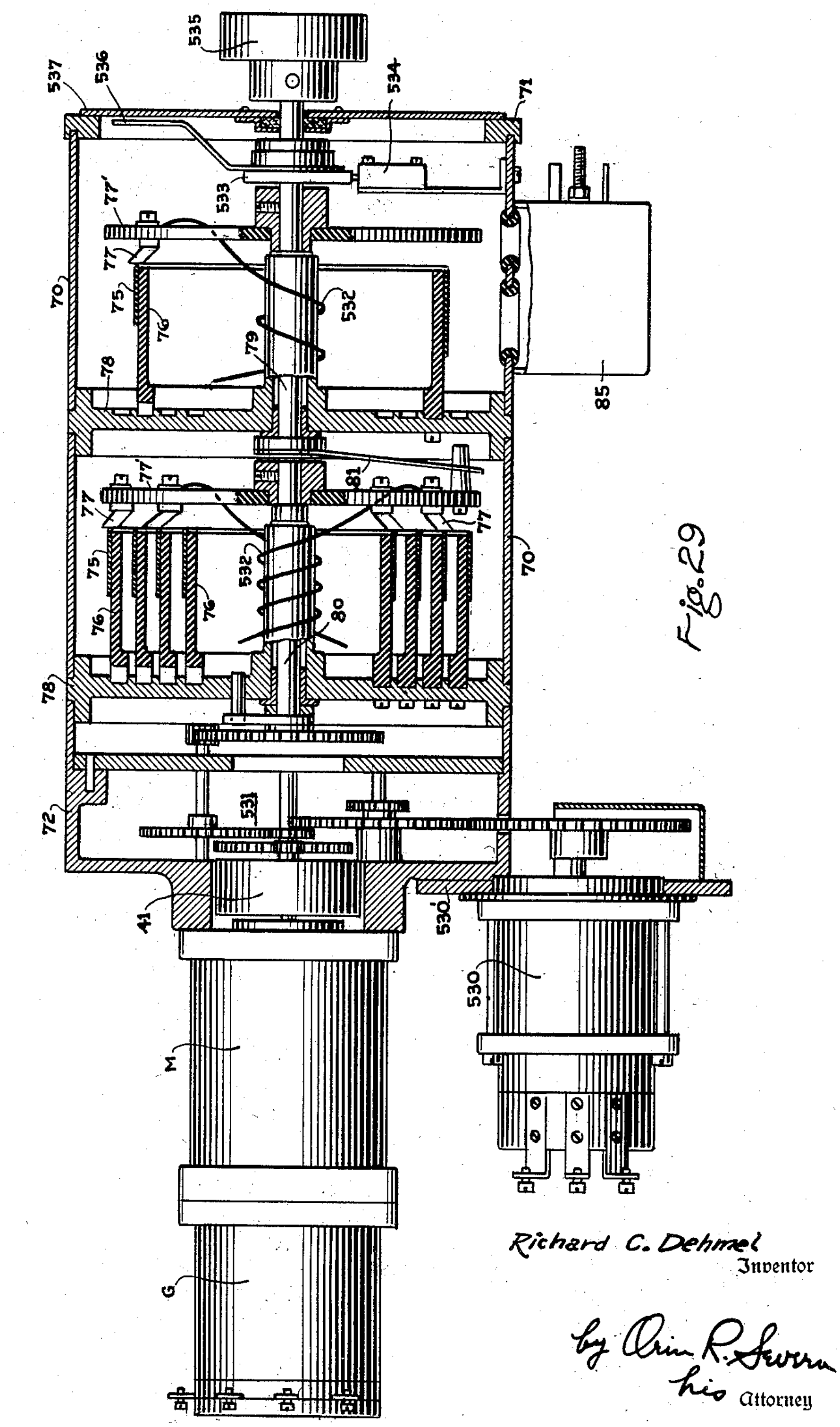
Figure 30:
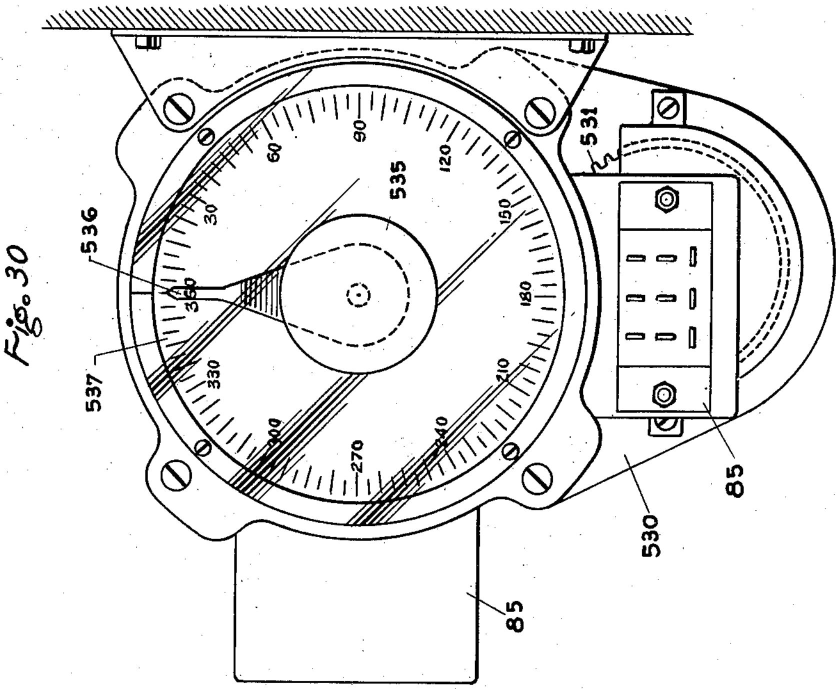
Figure 31:
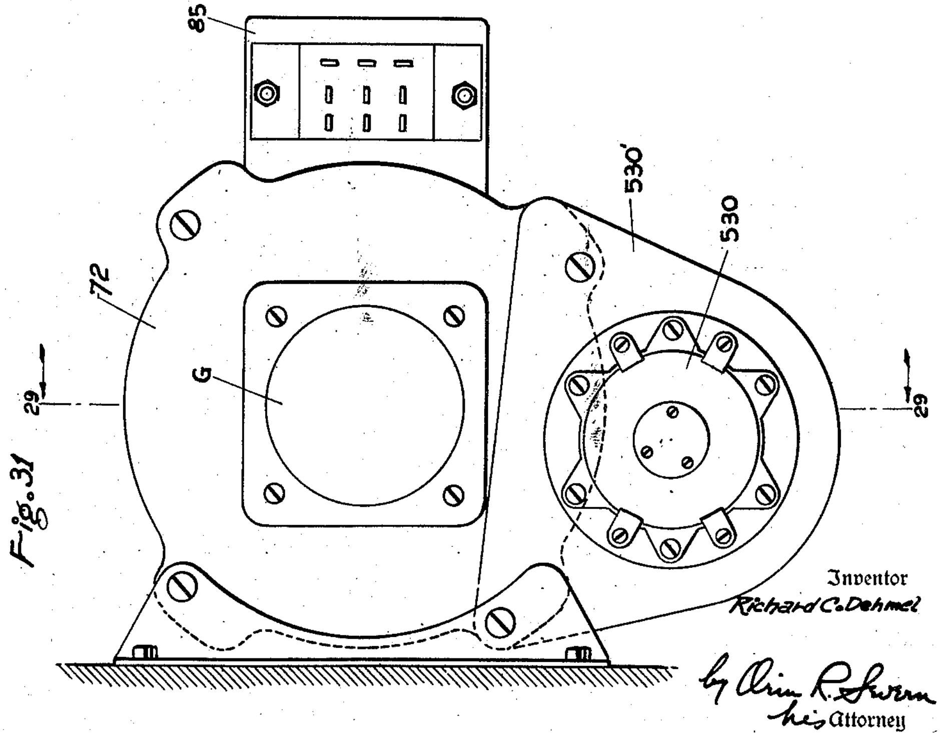
Figure 32:
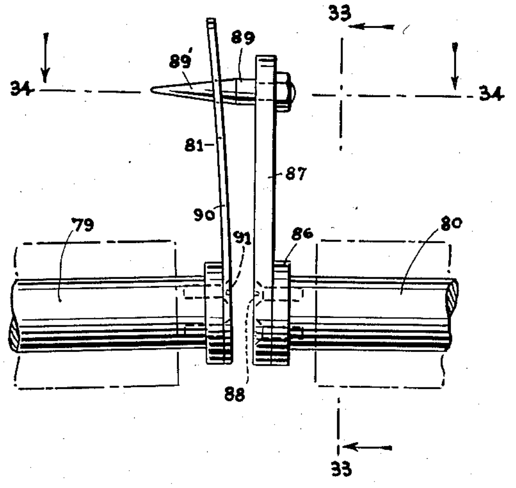
Figure 33:
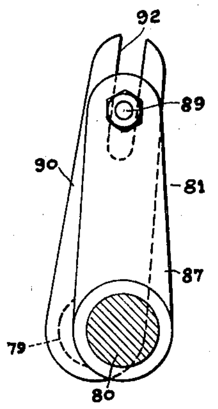
Figure 34:
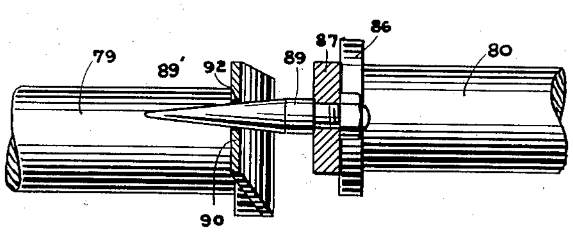
Figure 35:
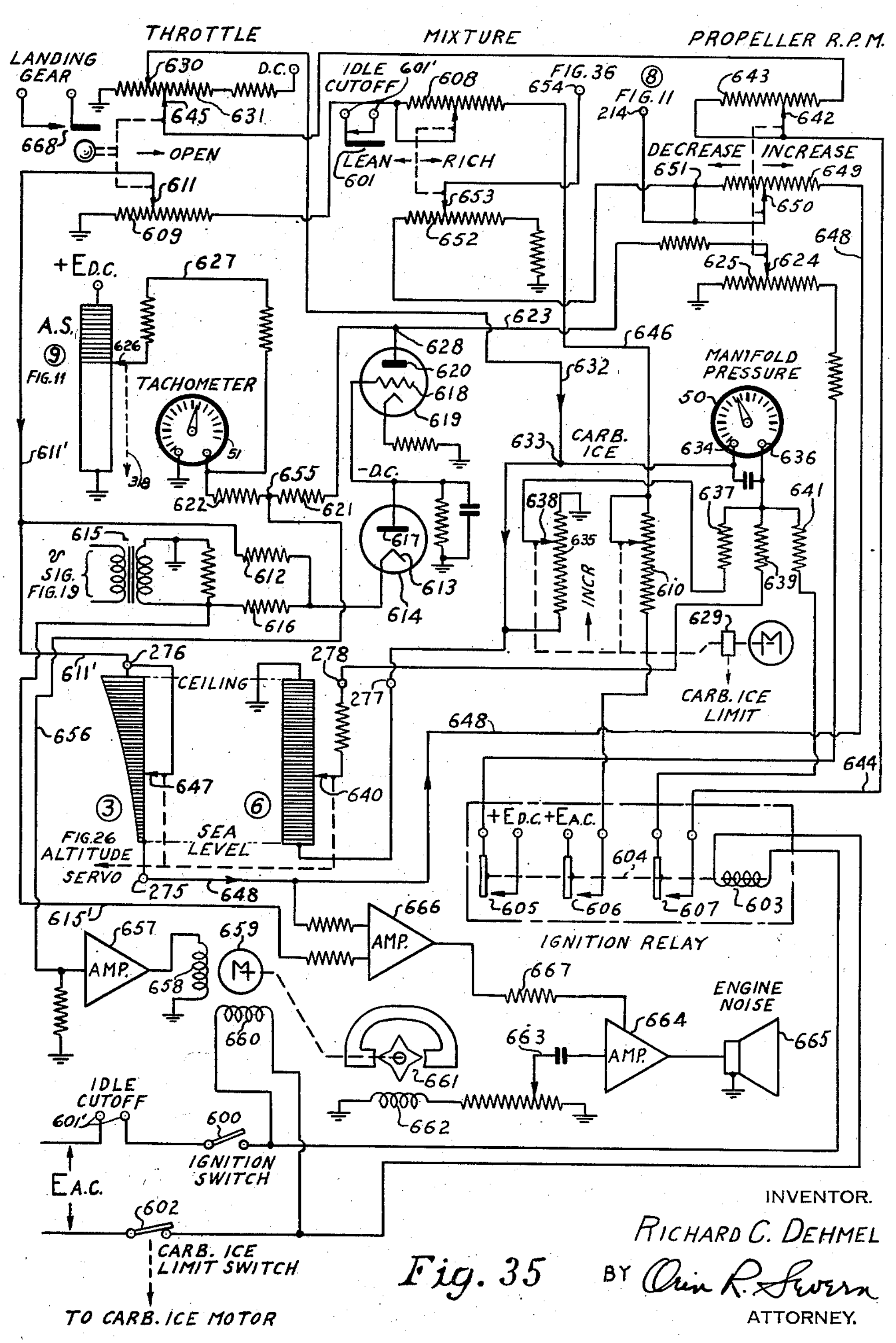
Figure 36:
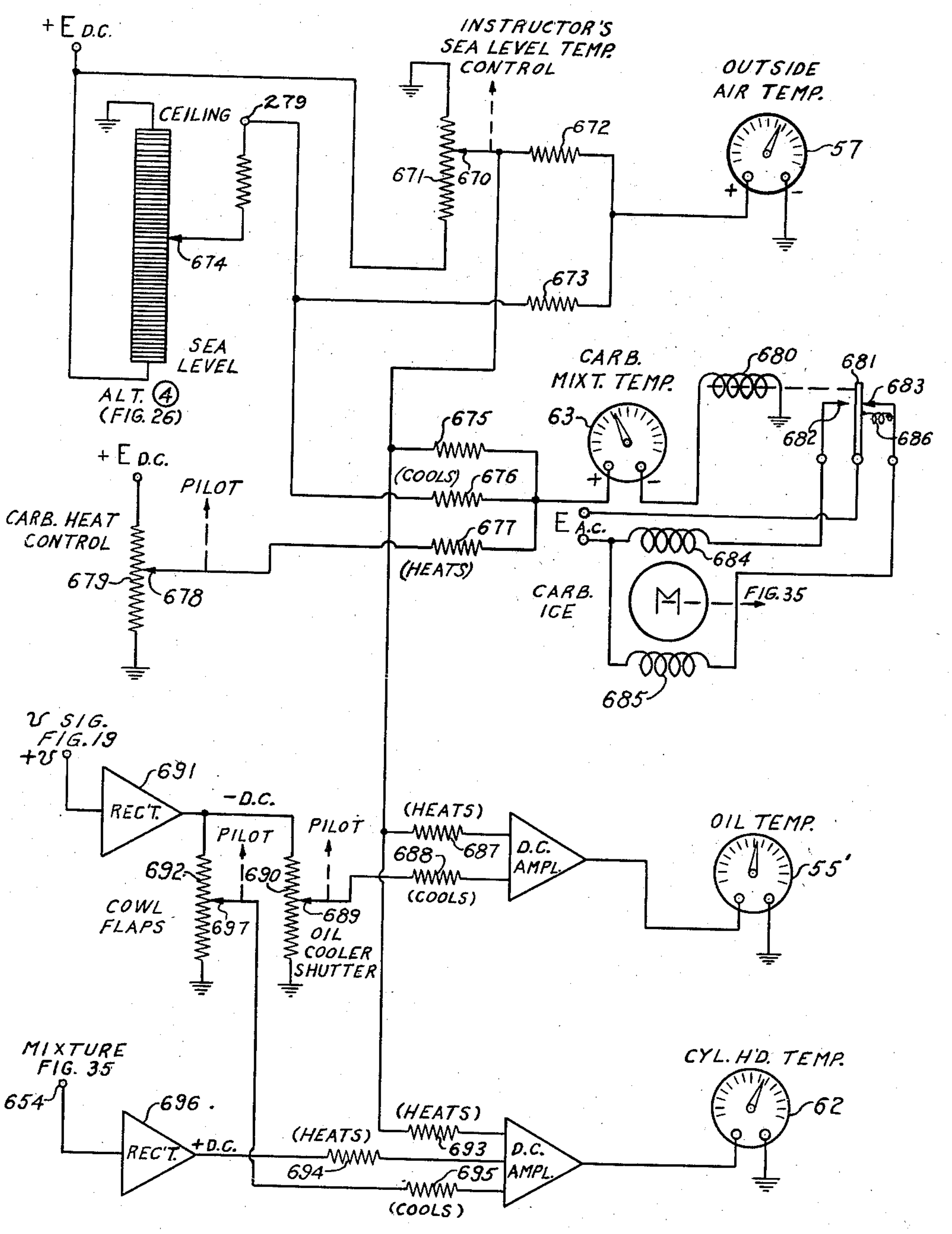
Figure 37:
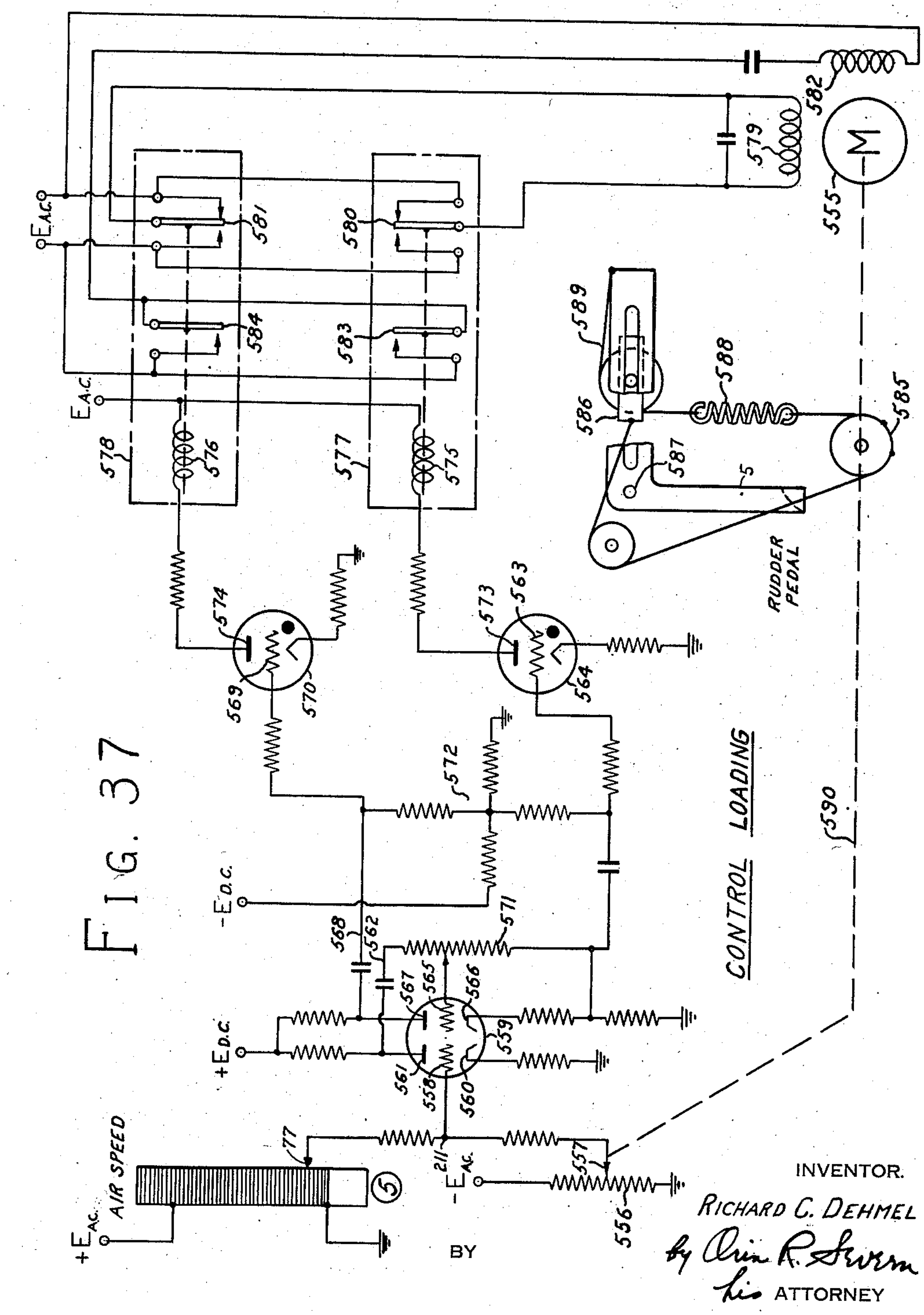
Figure 38:
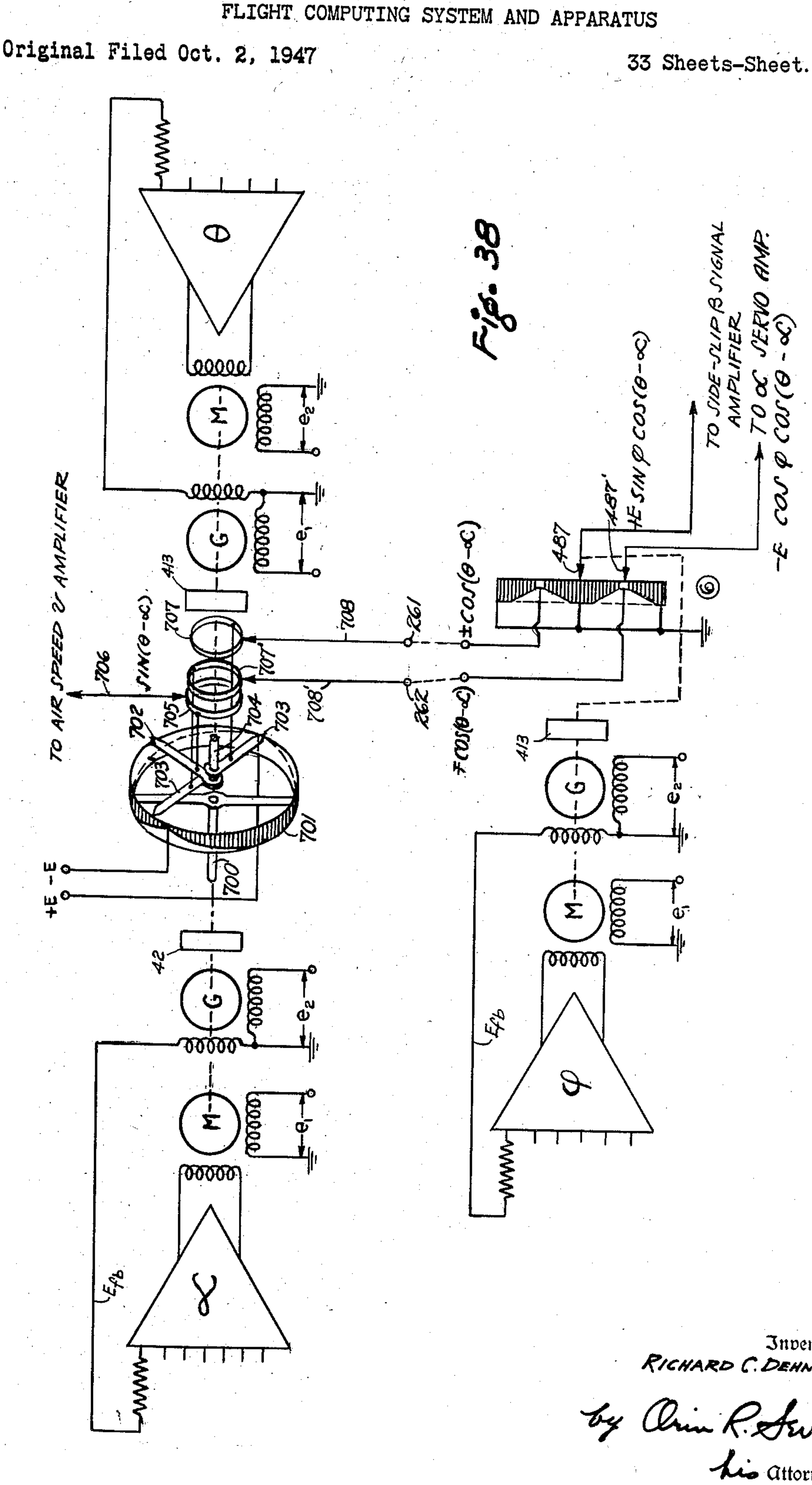
Figure 39:
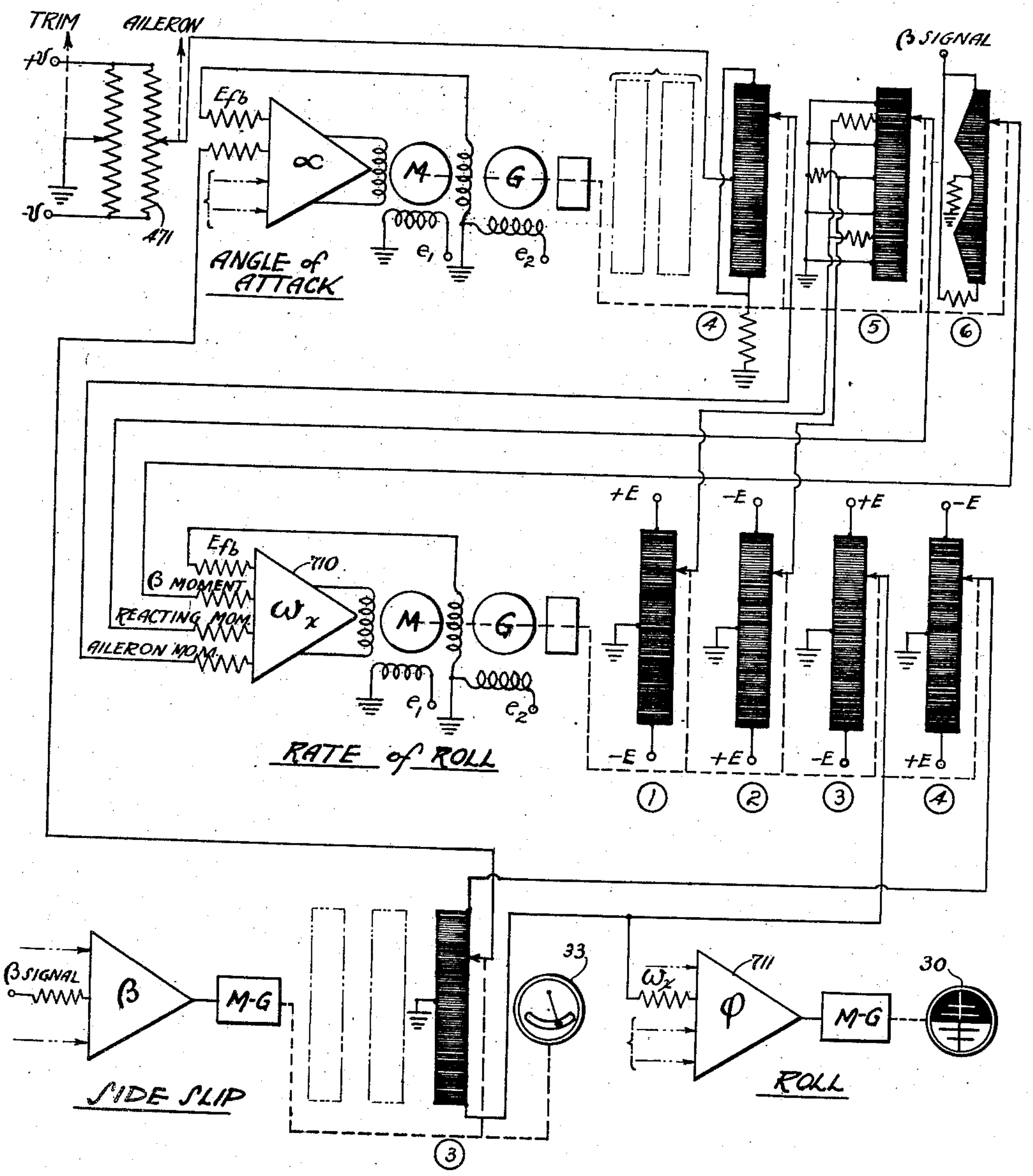
Figure 40:
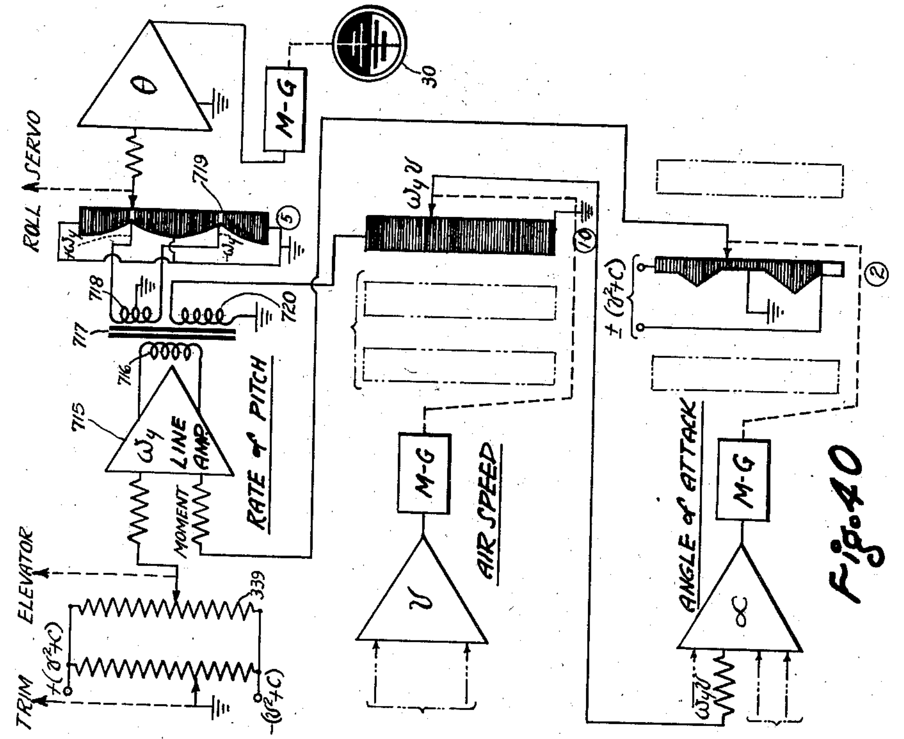
Figure 42:
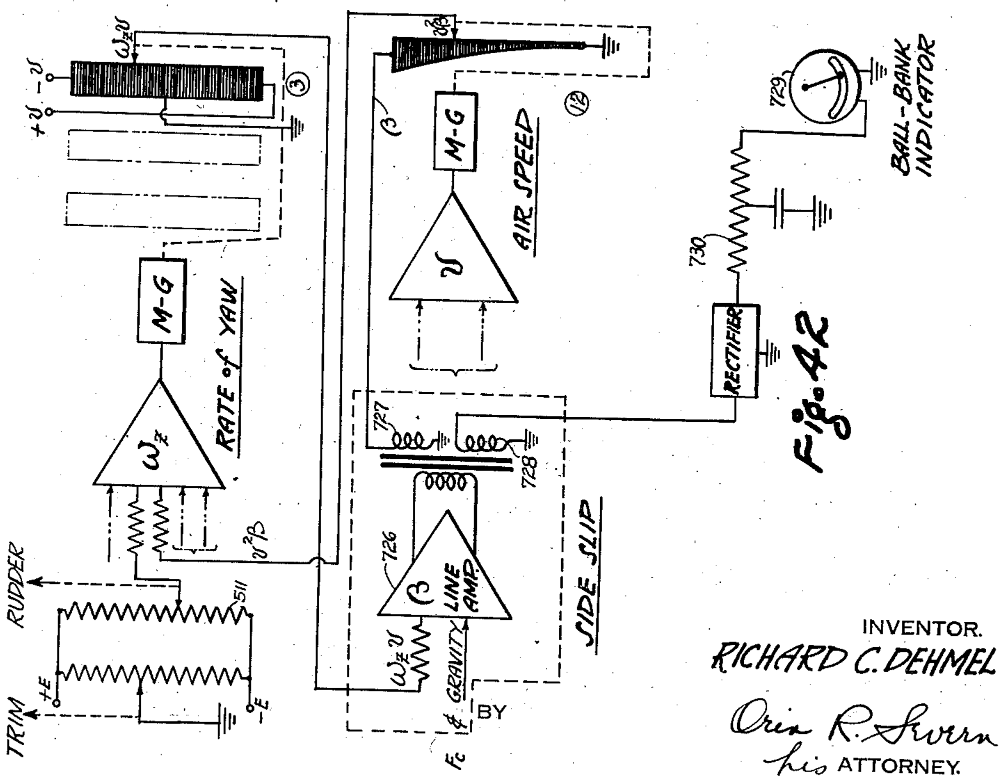
Figure 41:
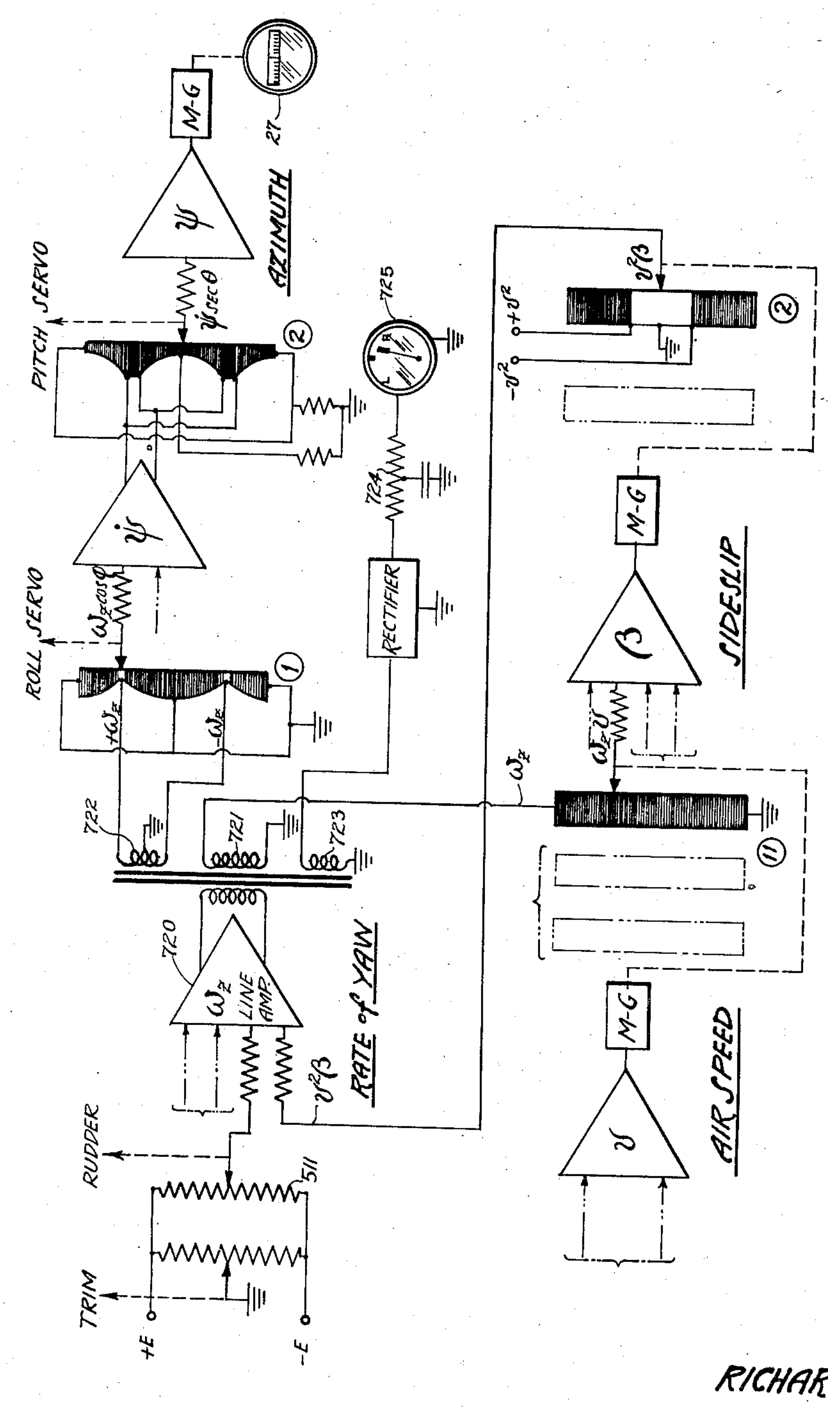

Fig. 12 in a similar manner illustrates the rate of pitch servo system together with two of the signal amplifiers;

Fig. 13 is an elevational view, partly in section of the operating means for the elevator potentiometer;

Fig. 14 is a side view of the apparatus shown in Fig. 13;

Fig. 15 is a schematic illustration of the angle of attack servo system, together with rough air, wing ice and flaps and landing gear control circuits;

Fig. 16 similarly illustrates the side-slip and azimuth servo systems including the side-slip signal amplifier and the control of the magnetic compass and gyro-compass;

Fig. 17 illustrates an alternative arrangement for controlling the magnetic compass;

Fig. 18 illustrates the pitch servo system together with the azimuth signal amplifier and the vertical air speed meter control;

Fig. 19 illustrates the roll servo system together with the air speed signal amplifier and the aileron potentiometer and attitude gyro control;

Fig. 20 is a perspective view of essential elements of the attitude gyro illustrating the general operation thereof;

Fig. 21 is an elevational view partly in section, of apparatus for controlling the aileron potentiometer;

Fig. 22 is an enlarged detail view of the aileron potentiometer;

Fig. 23 illustrates the rate of yaw servo amplifier together with the rudder potentiometer and rate of turn and ball-bank indicator control;

Fig. 24 is an enlarged detail view, partly in section illustrating the operating means for the rudder potentiometer;

Fig. 25 is a top view, partly broken away of the apparatus shown in Fig. 24;

Fig. 26 illustrates the altitude servo system together with the altimeter control;

Fig. 27 is a cross-sectional view of the air speed servo and potentiometer unit coupled to the air speed meter;

Fig. 28 is a similar view of the azimuth servo and potentiometer unit;

Fig. 29 is a similar view of the altitude servo and potentiometer unit;

Figs. 30 and 31 are opposite end views of the altitude unit of Fig. 29;

Figs. 32, 33 and 34 are detail views of a self-aligning coupling for a plurality of potentiometer or servo units or the like;

Fig. 35 is a schematic illustration of engine control and thrust circuits, including control of tachometer and manifold pressure meters and engine noise;

Fig. 36 illustrates the control of outside air temperature indication and various engine performance indicating meters including carburetor mixture, oil and cylinder head temperature meters;

Fig. 37 illustrates the control circuits for loading and unloading the simulated aircraft controls in accordance with air speed;

Fig. 38 illustrates a modified form of the angle of attack, pitch and roll servos for determining the flight angle and including it in the computing operation;

Fig. 39 schematically illustrates a modification of the present invention wherein a rate of roll servo system is used;

Fig. 40 similarly illustrates the use of a line amplifier instead of a servo mechanism for computing and obtaining voltages representing rate of pitch;

Fig. 41 similarly illustrates the use of a line amplifier instead of a servo mechanism for computing and obtaining voltages representing rate of yaw, and Fig. 42 similarly illustrates the use of a line amplifier instead of a servo mechanism for computing and obtaining voltages representing side-slip.

*Trainer fuselage*

Figure 1:
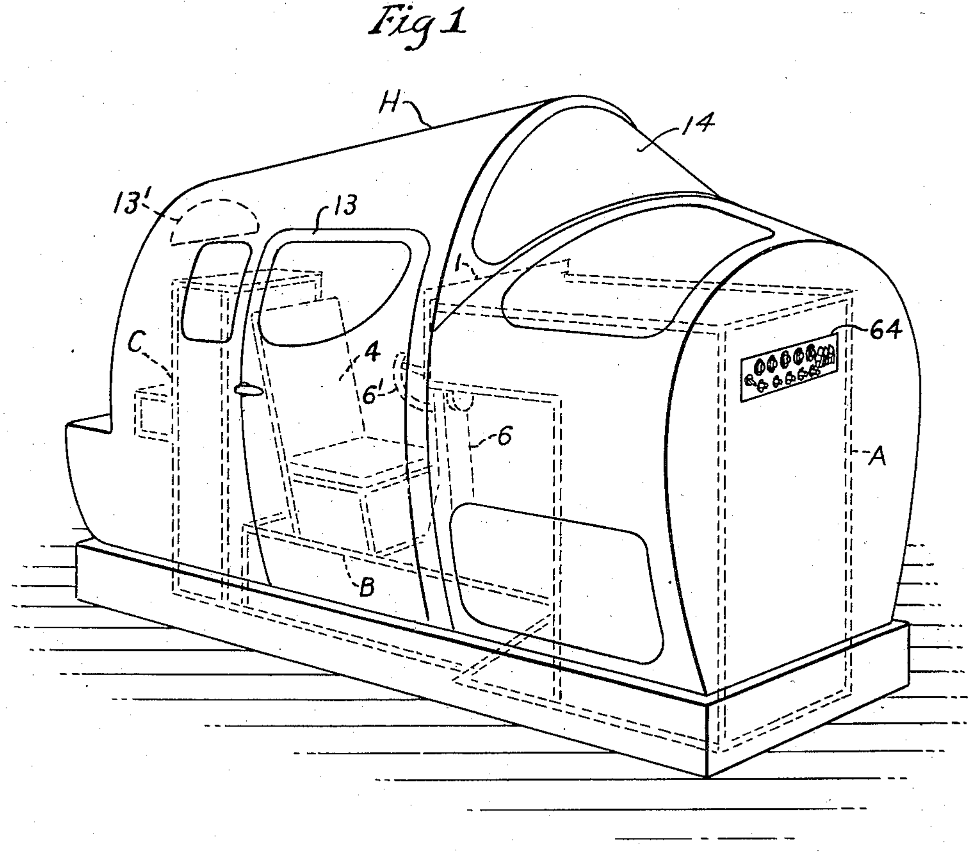
Figure 2:
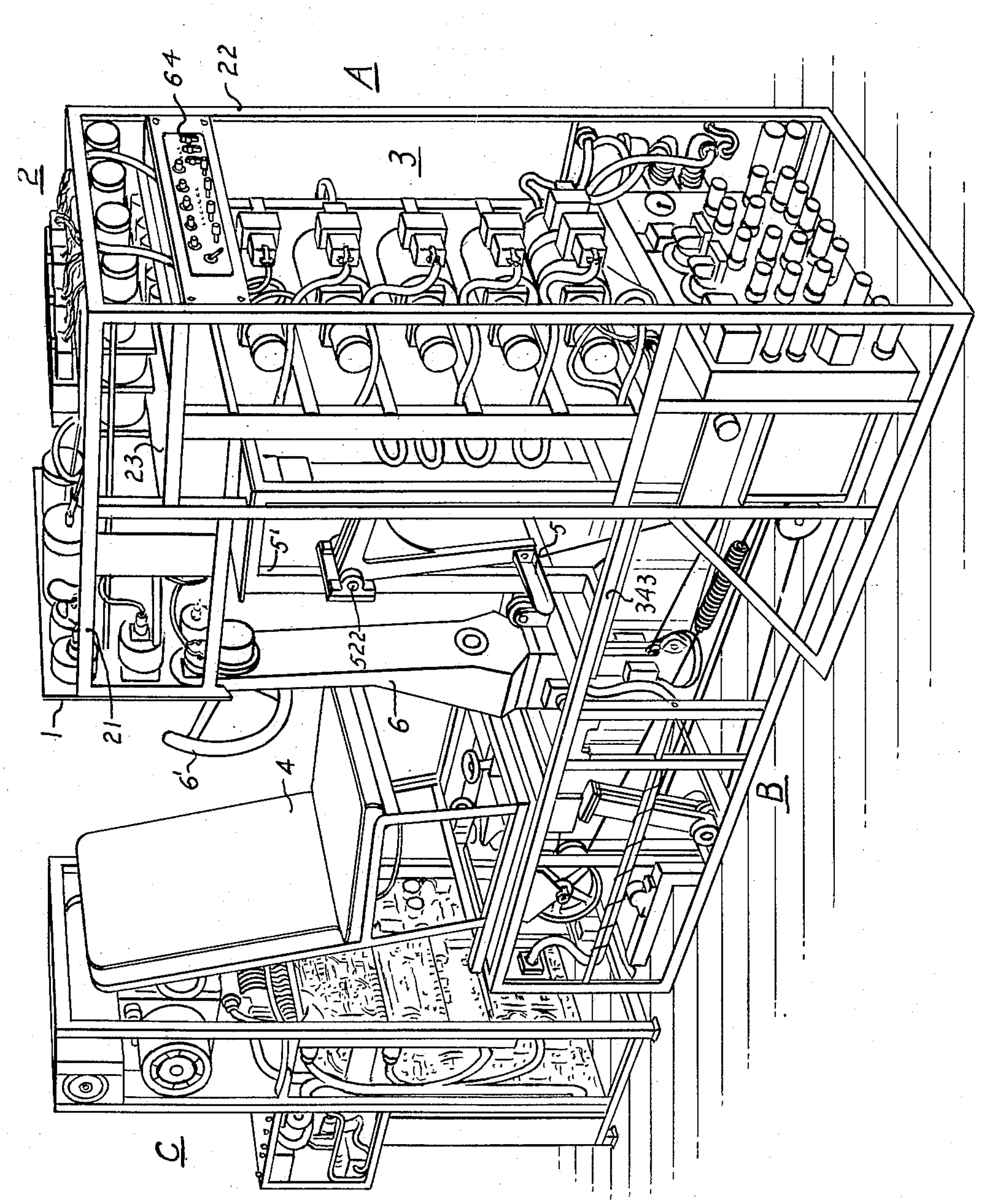
Fig. 2 is a general perspective view of the operating equipment of the flight trainer of Fig. 1 with the hood removed.

The physical embodiment of my invention in the trainer itself may assume various forms and there is illustrated by way of example one such arrangement in Figs. 1 and 2. In this arrangement the complete trainer equipment is conveniently grouped into three main units, A, B and C, which preferably are enclosed by a hood H, Fig. 1, so as to simulate an aircraft fuselage. Each unit is of generally block-like form so that it can be compactly grouped with respect to the others and is constructed of structural steel members and mounted on a common base. In the present instance the trainer is emplaced on a fixed base but it will be apparent the base may, if desired, be mounted for rotation in azimuth according to the direction of the simulated flight as in the manner of well-known flight trainers of the rotatable fuselage type.

Figure 3:
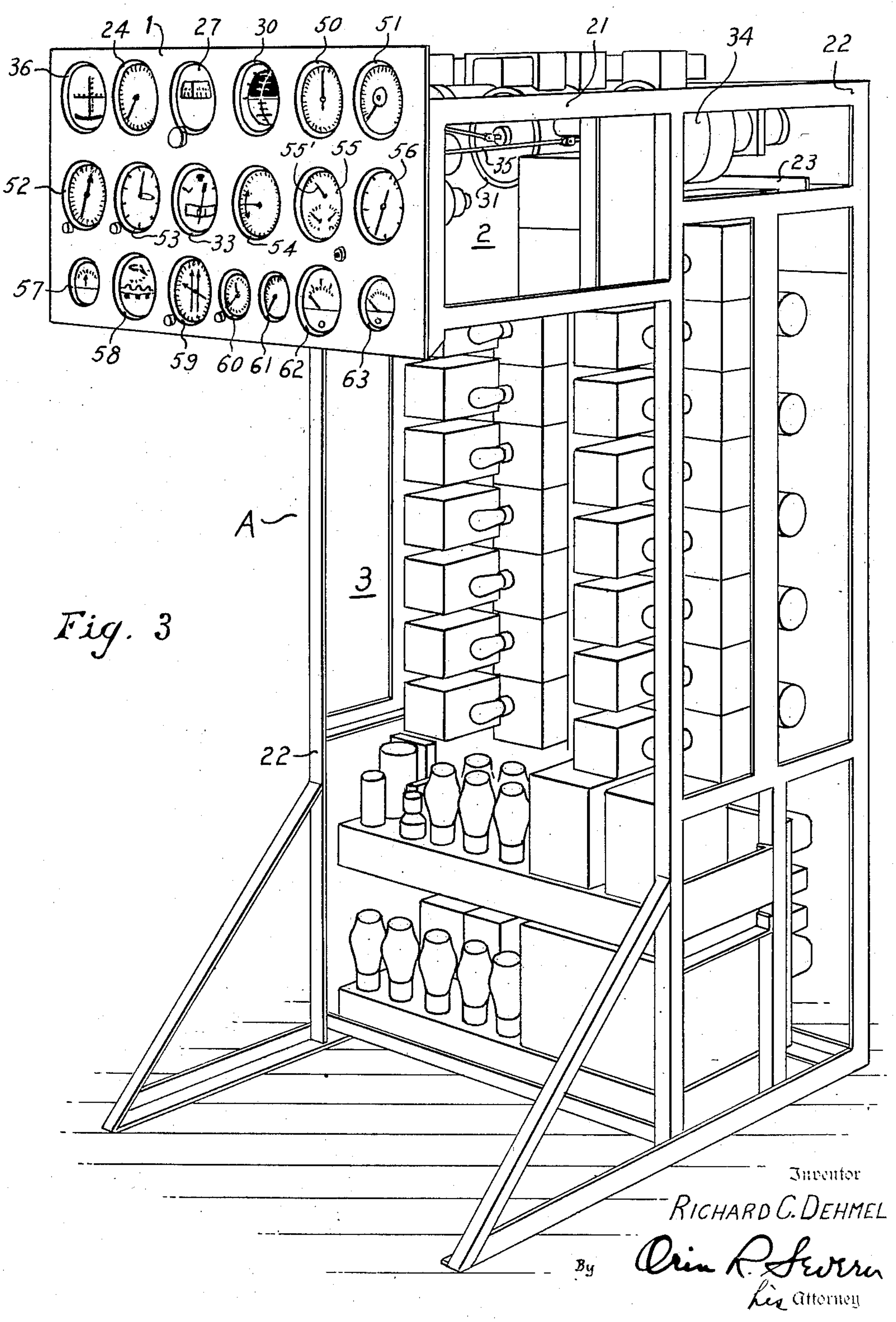
Fig. 3 is an enlarged perspective view of the forward unit including the instrument panel of the trainer apparatus shown in Fig. 2.
Figure 4:
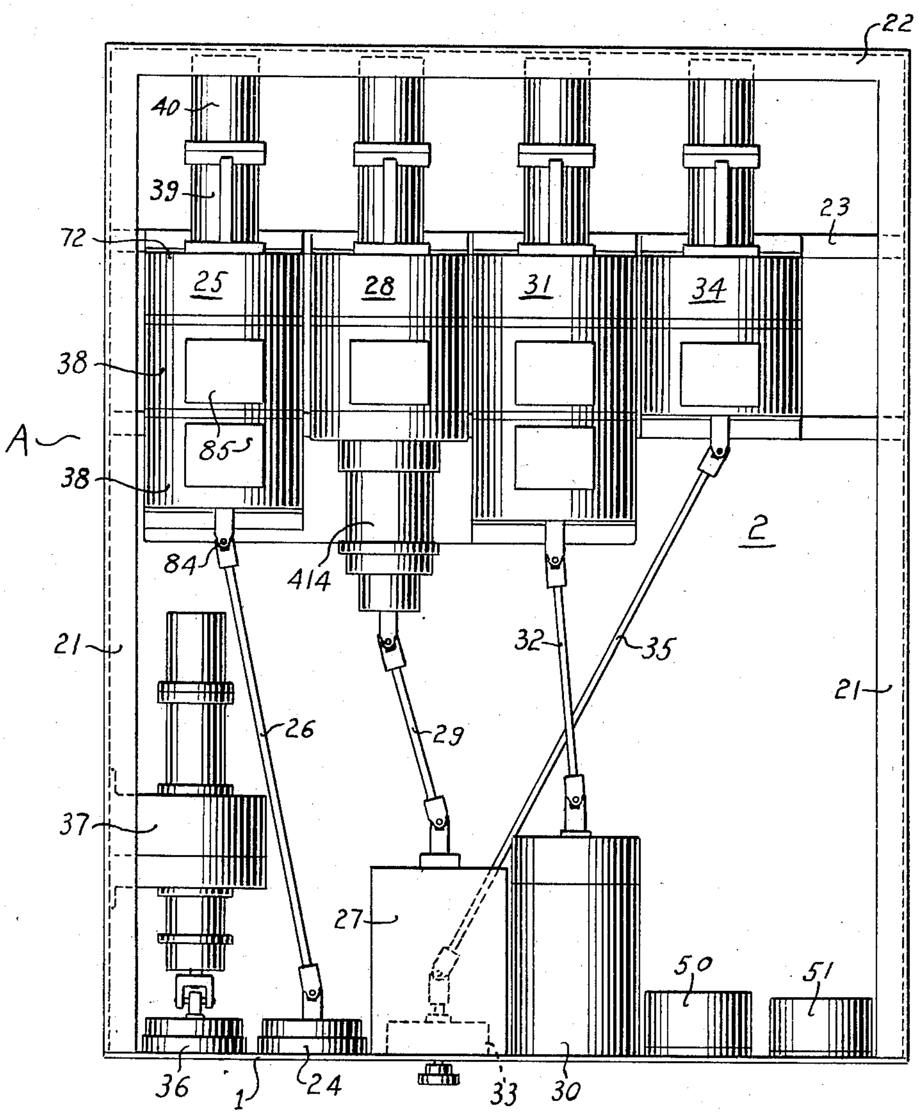
Fig. 4 is an enlarged plan view of Fig. 3 taken from above showing the servo arrangement for operating certain of the flight instruments on the instrument panel.
Figure 5:
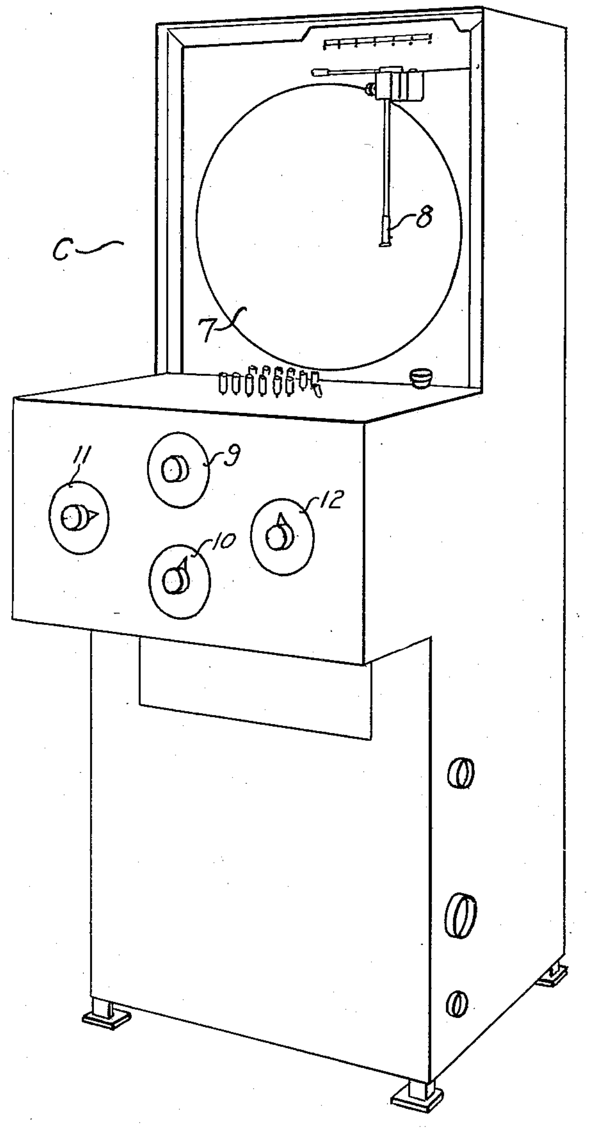
Fig. 5 is a general perspective view of the rearward unit of the trainer apparatus shown in Fig. 2 comprising a course recording chart and automatic radio range equipment.

In a convenient arrangement of the apparatus, the unit A, Figs. 2, 3 and 4, constitutes an upright structural steel frame in which the flight computing and indicating apparatus is mounted and includes the pilot's instrument panel 1, electrical servo equipment generally indicated at 2 for operating various flight indicating devices on the panel, and additional electronic computing and integrating equipment, power packs, etc. generally indicated at 3; the unit B, Fig. 2, includes the pilot's seat or station 4, simulated aircraft controls such as the rudder pedals 5 and control column 6, and equipment for simulating control loading and rough air disposed beneath the pilot's seat; and the unit C, Figs. 1, 2 and 5, includes a course recording chart 7 and cooperating pen 8 and radio range equipment for orientation and blind landing problems. The apparatus of units B and C will be described generally as to function and need not be illustrated and described in detail for a complete understanding of the present invention since they are specifically described in co-pending applications. The apparatus of unit B is disclosed in Richard V. Heller Patent No. 2,510,174, granted June 6, 1950, for "Control Loading System for Flight Training Apparatus," and in my Patents No. 2,463,602, granted March 8, 1949, for "Rough Air Simulating Means for Grounded Aircraft Trainers," and No. 2,522,434, granted September 12, 1950, for "Control Response Trainer for Aircraft Pilots." The apparatus of unit C is disclosed in my Patents No. 2,475,314, granted July 5, 1949, for "Navigation Apparatus for Aircraft and Training Devices," and No. 2,529,468, granted November 7, 1950, for "Radio Range Navigation Apparatus for Training Aircraft Personnel."

Referring more particularly to unit B, Fig. 2, the rudder pedals 5 and the control column 6 with wheel 6' are operatively connected in suitable manner to rudder, aileron and elevator potentiometers shown by Figs. 24, 21 and 13 respectively and diagrammatically illustrated as such as Figs. 23, 20 and 12 respectively, so that operation of the aircraft controls in the course of "flying" the trainer varies the respective potentiometer setting. A throttle control (not shown) also is arranged to vary the setting of a respective potentiometer. Accordingly, varying potentiometer voltages may be derived from operation of the controls and these voltages used in a manner hereinafter described to control the electronic flight computing system of the present invention.

The instrument panel of unit A overhangs the upright support 5' of unit B for the rudder pedals so that the student in operating the trainer from the seat 4 handles the controls and faces the flight instruments on the panel 1 in generally the same manner as a pilot in actual aircraft. Further realism is introduced by means of so-called control loading specifically described in Patents Nos. 2,510,174 and 2,522,434 above referred to wherein the rudder, aileron and elevator controls are loaded according to simulated air speed so that the resistance to movement of the controls varies with air speed as in actual flight. This apparatus is mounted in the lower part of unit B and includes a spring system controlled by a motor that is actuated according to values of simulated air speed.

Also, simulation of rough air is introduced by means of a rough air motor located in the lower part of unit B for moving in a random manner the pilot's seat 4 as described in my Patent No. 2,463,602 and for transmitting rough air potentials to the flight computing system.

In general, the automatic radio range and course charting apparatus of unit C comprises computing means for obtaining from factors representing air speed and trainer direction bearing and altitude the instant flight position of the trainer. The unit is provided with various exterior controls including dials 9 and 10 for introducing wind drift according to velocity and direction respectively, and dials 11 and 12 for initially establishing or resetting the flight position according to reference coordinates, as described in my aforesaid Patent No. 2,529,468.

All three units grouped as illustrated in Fig. 2 are enclosed by a hood or shell H, Fig. 1, that is open at the rear for receiving the radio range and charting unit C which also represents the instructor's position. The hood is provided with a side door 13 and a window or opening 13' at the rear so that the instructor without leaving his position can observe the pilot's instrument panel 1. The visor of the hood which is just above the instrument panel is indicated at 14.

*Instrument panel*

The instrument panel, referring to Figs. 3 and 4 is mounted on an overhanging extension 21 of the main frame 22 of unit A and includes instrument indicia or dials representing the more commonly used flight instruments including those for radio orientation and navigation. Some of these simulating flight instruments are driven directly by servos that are mounted on a shelf-like part 23 of the frame and controlled in a manner later described. For example, the air speed meter 24 is driven by the so-called air speed servo unit 25 through a universal connecting rod 26, Figs. 4 and 27; the gyro compass 27 is driven by the azimuth servo unit 28 through the universal connecting rod 29; the horizontally controlled or roll element of the attitude gyro 30 is driven by the roll servo unit 31 through a similar connection 32, and the bank element of the turn and bank indicator 33 is driven by the side-slip servo unit 34 through a similar connection 35. Also the indicating element of a simulated radio compass instrument 52 is driven by a servo unit 37 secured to the extension frame 21 adjacent to the instrument. Other instruments are electrically operated in any suitable manner, as by teletorque, galvanometer means or the like as described later in this specification and include a manifold pressure indicator 50, R. P. M. tachometer 51, cross pointer indicator 36, altimeter 53, vertical air speed meter 54, combined dial 55 for oil temperature (pointer 55') and oil and fuel pressure, fuel gage 56, outside air temperature indicator 57, flaps and landing gear position indicator 58, remote magnetic compass 59, clock 60, vacuum gage 61, cylinder head temperature indicator 62 and carburetor mixture indicator 63. A number of these instruments such as the fuel gage, engine temperature indicators and others generally associated with a pilot or flight engineer's duties are included for purposes of realistically simulating actual engine operation under flight conditions and the control thereof will be referred to later.

There is also mounted on the frame 22 at the front of the trainer an instructor's panel 64 having various signal lamps and control switches for indicating as desired the trainer operation and for introducing disturbing factors such as icing and rough air. Indicating lights (not shown) may be provided for ice, flaps, landing gear, rough air and engine noise, and the instructor by means of suitable switches may disable instruments on the pilot's panel at will for making the flight problem more difficult. The arrangement of the secondary circuits for such latter purposes is obvious to those skilled in the art and illustration thereof generally is omitted to avoid unnecessary detail.

*The servo system*

The individual servo units need not be described in detail at this time other than to point out that each unit comprises, taking the air speed servo unit 25 for example, one or more potentiometer assemblies 38, having a common driving shaft connected at one end to the servo motor 39 and at the other end to the coupling rod 26. The motor 39 is also connected to a feed-back generator 40 for a purpose later described.

Figure 10:
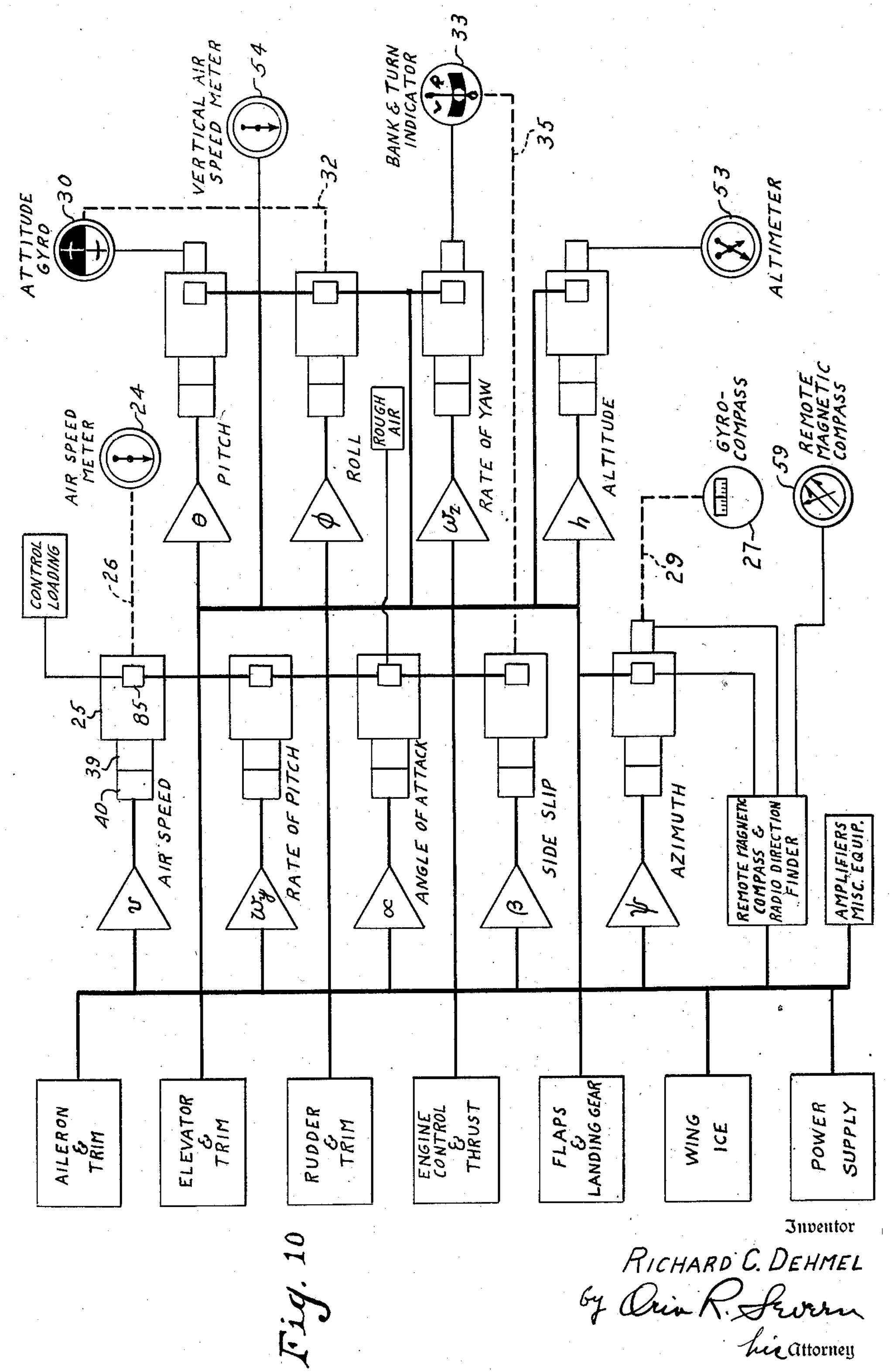
Fig. 10 is a block-schematic diagram of the complete flight computing system including principal flight indicating instruments.

These servo units, nine in all in the present instance, are interconnected in an involved interacting electromechanical network generally outlined in Fig. 10 so as to operate according to certain flight principles. That is, in the practice of this invention voltages are developed in accordance with operation of the simulated aircraft controls proportional to the various forces that produce motion or acceleration with respect to three reference axes according to fundamental aerodynamic principles. The three reference axes are (1) the longitudinal or $x$ axis of the aircraft, (2) an axis $y$ along the plane of the wings perpendicular to the longitudinal axis, and (3) an axis $z$ mutually perpendicular to the other two, and all axes intersecting the center of gravity of the aircraft.

Translation and rotation with respect to these axes and with respect to fixed axes mutually perpendicular and parallel to the horizon are determined by the servo systems. In one of these systems forces are computed to determine air speed, in another servo system moments are computed to produce rate of yaw, and in a third moments are computed to produce rate of pitch. A pair of auxiliary servos are provided to represent angle of attack and side-slip respectively, the angle of attack servo integrating forces at right angles to the flight path for the purpose of computing aerodynamic quantities of lift (weight plus centrifugal force), drag and pitching moment, and the side-slip servo computing the angle between the plane of symmetry of the aircraft and the plane of the flight path. The remaining four servos function to integrate motions, both linear and angular produced by the main three servos above referred to for representation of flight conditions such as altitude, roll, pitch and azimuth.

It will be understood that theoretical considerations may be compromised in certain instances where practical in order to avoid unnecessary complication and that additional servo systems may be added for further modification and refinement of control as desired.

By way of introduction the general fundamental relationship between the various servo and potentiometer systems in obtaining one or more integrated outputs such as for example readings of the air speed meter 24 and gyrocompass 27 will be illustrated first before describing in detail the complete flight computing circuits. It will be understood that these illustrations are simplified to a considerable extent for the purpose of a general outline and do not correspond exactly to the arrangement in the complete invention.

*Air speed with vertical control*

A so-called "vertical system" involving only elevator and throttle control for computing air speed will first be described. According to well-known principles of aerodynamics, air speed ($v$) is a function of engine thrust (T) which is always positive (except for propeller drag when idling in flight below about 1200 R. P. M.), gravity (G) which may be either positive or negative depending on whether the aircraft is in a dive or climb attitude, and drag which is of course negative. Drag may be considered as having two components, constant coefficient drag which varies as the square of the air speed $v^2$ ,and another drag expressed by the variable coefficient $C_D$ ($\alpha$) which varies with the angle of attack ($\alpha$), i. e. the angle between the chord of the wing and the air stream.

Figure 6:
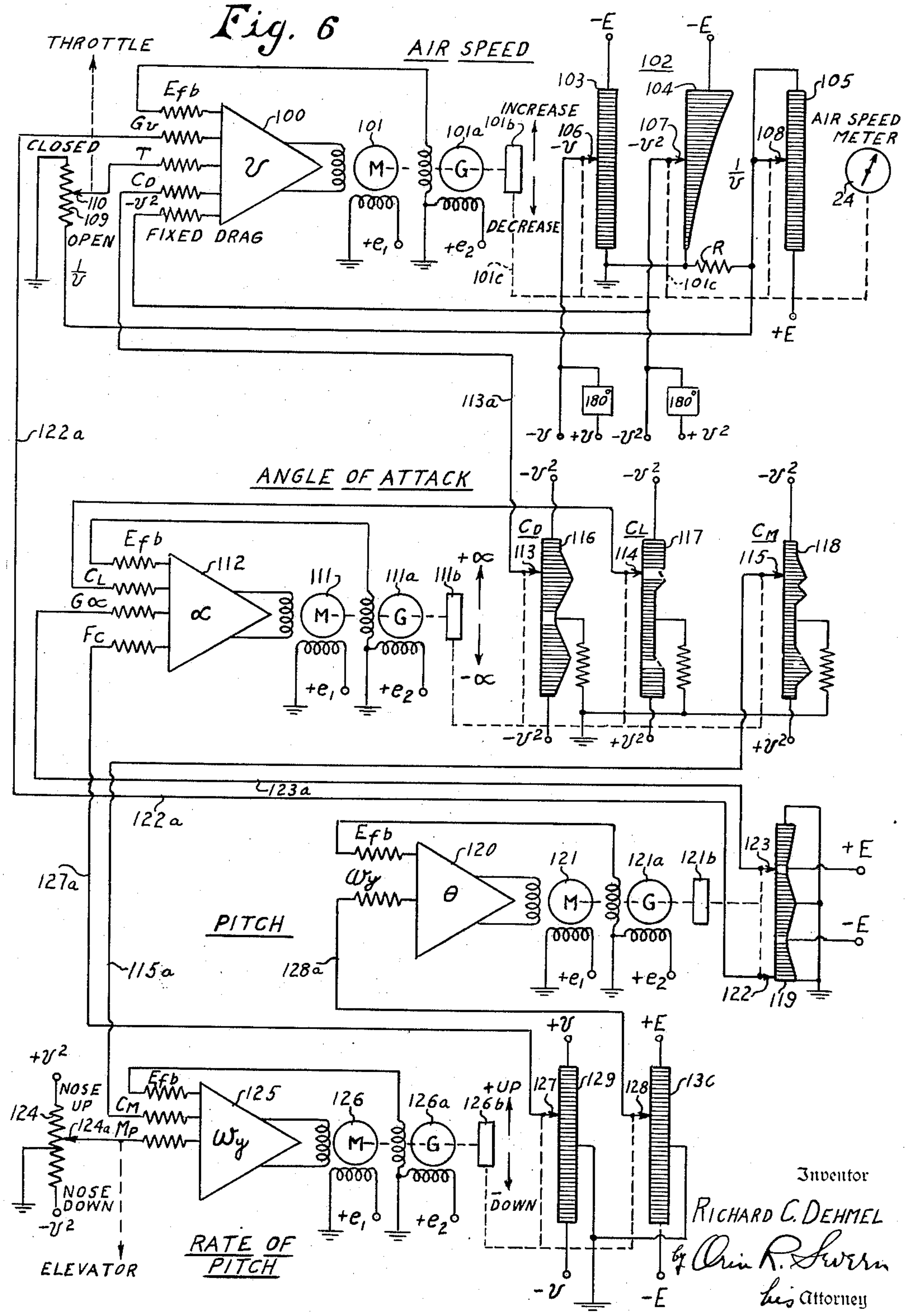
Fig. 6 is a schematic layout illustrating basic operation of the flight computing apparatus for computing air speed, angle of attack, rate of pitch and pitch attitude.

Referring now to Fig. 6, it will be assumed that a plurality of A. C. voltages representing various values of thrust, gravity and drag respectively, according to the instantaneous polarity and magnitude of the respective voltages are fed separately into a summing amplifier diagrammatically indicated at 100 included in a servo system designated "air speed." Such amplifiers are well known in the art for algebraically summing a plurality of separate A. C. voltages of varying magnitude and polarity, an example designated "air speed servo amplifier" being shown in Fig. 11. The output of the amplifier 100 is used to control an automatic balancing servo network including a two-phase motor 101, the control phase of which is energized by the amplifier output as illustrated and the other phase by a constant reference A. C. voltage $+e_1$. The operation of this type of motor is well known, the rotation being in one direction when the control and reference voltages in the respective phases have the same instantaneous polarity, and in the opposite direction when the instantaneous polarity of the control voltage is reversed with respect to the reference voltage, the rate of rotation in both cases depending on the magnitude of the control voltage. The motor drives a two-phase feed-back generator 101*a* also having one phase energized by an A. C. reference voltage $+e_2$, the other phase generating according to the motor speed a feed-back voltage $E_{fb}$ for purposes of rate control hereinafter described. The motor also serves to gang-operate through a gear reduction train **101*b* the contacts of a potentiometer system generally indicated at 102; also the pointer of the air speed meter 24 is directly positioned through the motor drive mechanism, suitable mechanical connections 101*c*** between the motor and the driven elements being indicated by dotted lines.

A structural arrangement that may be conveniently used for a servo motor and potentiometer combination of the character above referred to is shown by Fig. 27 which illustrates the air speed servo unit 25 of Fig. 4. This unit comprises a pair of cylindrical housing sections 70 suitably secured together by end sections 71 and 72 and enclosing two groups of potentiometers generally indicated at 73 and 74 respectively. The potentiometer resistance elements such as 75 are wrapped on cylindrical insulating members 76 which vary in diameter so that they can be nested in concentric relation on the mounting plates 78 about the centrally located shaft sections 79 and 80. These shaft sections carry insulating supports 77′ for the coacting potentiometer slider contacts 77. The mounting plates 78, which also form partitions in the housing serve as bearing supports for the contact carrying shafts 79 and 80 respectively, the shaft sections being coupled by a self-aligning connection 81 presently described for assuring comparatively accurate follow-up movement of the shaft 79.

The end section 72 supports a small motor-generator set, the motor 39 being indicated and connected to a flywheel 41 and reduction gear train 42 for positioning the potentiometer contacts 77. The driving connection between the drive gear 82 of the gear train and the contact operating shaft 80 includes a simple friction clutch 83 of the spring washer type arranged to permit motor over-travel as well as manual adjustment of the potentiometer contacts independently of the motor and gear train mechanism. The driven shaft section 79 extends through the end wall 71 and is provided with a universal coupling 84 that is connected to the rod 26 for operating the pointer 24 of the air speed meter 24.

The self aligning connection 81 for the potentiometer shafts 79 and 80 is shown in detail by Figs. 32 to 34, misalignment of the shafts being exaggerated for purposes of illustration. Although universal couplings are well known, it often happens that the shafts to be coupled are so closely spaced, due to requirements for very compact equipment, that conventional couplings cannot conveniently be used. The present coupling can be used in cases where the adjoining shafts practically touch each other, as in the compactly arranged potentiometer groups included in the servo units of the present invention so as positively to connect the shafts without back-lash. Furthermore accidental slight relative longitudinal displacements of the shafts are automatically compensated without interfering with the proper transmission of movement.

Referring to Fig. 32, the driving shaft section 80 is provided at its free end 86 with an offset arm 87 rigidly secured at 88 to the butt end of the shaft. The outer end of the arm carries an offset tapered pin 89 extending toward the driven shaft 79 and substantially parallel to the shaft line-up. The driven shaft 79 is also provided with an offset element, in this case a leaf spring or the like 90 secured at 91 to the adjoining butt end of the shaft 79. The leaf spring 90 is normally biased toward the arm 87 and is bifurcated at its outer free end to form a narrow slot 92, Figs. 33 and 34, in which the tapered end 89′ of the pin rides as the spring follows up any inequalities of movement between the parts 87 and 90. Accordingly, the leaf spring and pin combination constituting the aforesaid connection not only transmits comparatively accurate angular movement to the driven shaft 79, but also eliminates back-lash or other objectionable relative movement between the shafts.

It will therefore be apparent that operation of the motor 39 in either direction causes not only a corresponding change in air speed reading but also causes the potentiometer contacts to move to different precise angular positions on the respective potentiometer elements for deriving, i. e., picking off, potentiometer voltages corresponding to the contact position. The electrical connections for the terminals of each potentiometer and its associated contact are omitted in the interest of clearness. In practice they extend upwardly through the housing sections 70 to the terminal connector receptacles 85 for connection to the respective exterior circuits. The potentiometer unit above described is of the type that is limited to the 360° or less of angular movement of the contacts and hence the contacts can be provided with simple flexible "pigtail" connections (not shown) instead of slip-ring connections. A more detailed description of the structure features of the motor and potentiometer unit of Fig. 27 is not necessary for the purposes of this specification. A suitable motor and potentiometer arrangement is disclosed in Grant Patent 2,431,749, issued December 2, 1947, for "Potentiometer Housing and Positioning Structure."

The individual potentiometer resistance elements, referring now to Fig. 6, may be of the well-known wound card type and are of circular or band form but are diagrammatically illustrated in a plane development for clearness. Each potentiometer is shaped or contoured so that the value of the derived voltage at the potentiometer contact bears a certain relationship to the linear movement of the slider contact depending on the particular function of the potentiometer, and has a voltage impressed across its terminals depending in instantaneous polarity and magnitude also on the function of the potentiometer. According to the present invention the contour of all functional potentiometers represents the derivative of the function represented. For example, the potentiometers 103 and 105, Fig. 6, are of the linear type whereas the potentiometer 104 is contoured to represent a relationship $x=y^2$, where $x$ represents the linear movement of the contact and $y$ represents the derived potentiometer voltage, in the present instance air speed squared.

Stated more specifically, the contour of width variation of the various potentiometers used to derive voltages simulating aircraft characteristics is proportional to the derivative of the function of the respective characteristic with respect to the variable represented by the setting of the potentiometer. For example, let it be assumed that the function is a linear one as where a derived voltage is to be directly proportional to the distance that the servo operated potentiometer contact is from a zero position. The slope of the function curve then is the constant ratio of derived voltage to increase in the independent variable represented by the contact travel from the zero position. The derivative of this relationship is the same for all contact settings so that the width of the card is uniform, making it rectangular in shape. If now the function varies according to a square law such as $x=y^2$ the derivative of this equation $f(x)=2y$ determines the width of the potentiometer. Therefore the potentiometer has a straight line sloping edge giving it a wedge shape.

In another case where a cosine function is involved, the derivative or slope of the cosine curve may be expressed as $$\frac{d\,(\cos\theta)}{d\theta}=-\sin\theta$$

where $\theta$ is the angle measured in radians. Accordingly the contour of the potentiometer card for corresponding values of $\theta$ is sine shaped, the negative value being taken care of by corresponding selection of the polarity applied to the potentiometer. Conversely where a sine function is involved the potentiometer card for corresponding values of $\theta$ will have a cosine contour.

Referring again to Fig. 6, the potentiometer 104 is energized at its upper terminal representing maximum air speed by a negative voltage —E and is grounded at its lower end so that the derived voltage at the slider contact 107 represents $-v^2$ and therefore is also representative of the constant coefficient drag previously referred to. Accordingly, this voltage may be used as one of the inputs of the air speed summing amplifier 100 tending to oppose the positive thrust voltage (T), the arrangement being such that when the effect of all input voltages to the amplifier balance out, i. e. during a period of no change in air speed, the output of the amplifier is zero and the motor 101 is de-energized. Any change in the input voltages tending to unbalance the system, either in a positive or negative direction, such as for example in level flight during a change in throttle setting when the thrust and drag voltages are unequal, causes operation of the motor 101 in a corresponding direction to move the potentiometer contacts toward a new balance position wherein newly derived voltages tend to restore balance of the motor inputs.

For the purpose of deriving a voltage proportional to air speed $v$, the linear potentiometer 103 is energized by a voltage —E and the slider contact 106 is positioned according to the magnitude of air speed. This derived voltage is used in another part of the system to be described.

The thrust voltage is shown as derived from the setting of the engine throttle potentiometer 109, the contact 110 of which is directly adjusted by the pilot to simulate throttle control. This potentiometer is energized by a voltage taken from the contact 108 of potentiometer 105 that is also energized at its lower terminal by a voltage +E, the upper terminal being grounded through a resistance R and also directly connected to contact 108 for deriving a voltage proportional to the reciprocal of air speed $$\frac{1}{v}$$

so as to correspond with the relationship $$T=\frac{\text{H.P.}}{v}$$

which is simply the basic equation $$\text{H.P.}=\frac{\text{ft.-lb.}}{\text{sec.}}=vT$$

It will therefore be seen that the thrust input voltage corresponds generally to the delivered engine power as determined by throttle setting and air speed.

The drag coefficient input $C_D$ varies, as above indicated, with the angle of attack $\alpha$. Accordingly another servo system designated "angle of attack" is provided for deriving a set of voltages corresponding to certain factors variable with angle of attack. A two-phase motor 111 (similar to motor 101) of the angle of attack system is energized by the output of a summing amplifier 112 in the manner above described for driving a feedback generator **111*a* and for gang-operation of the contacts 113, 114 and 115 of potentiometers 116, 117 and 118 respectively. These potentiometers are for the purpose of calculating the drag coefficient $C_D$, the lift coefficient $C_L$ and the moment coefficient $C_M$ respectively. The inputs of the $\alpha$ amplifier 112** include voltages representing gravity, the lift force $C_L$ and centrifugal force $F_c$ due to pitching. These inputs will be explained shortly.

The drag as related to angle of attack may be expressed as $$D=C_D(\alpha)\rho\frac{v^2S}{2}$$

where D is the drag in pounds, $\rho$ is the density of air, $C_D$ ($\alpha$) is the drag coefficient and S is the projected wing area. Therefore drag is a function of $-v^2$, i. e., air speed squared. For representing this relationship the potentiometer 116 is appropriately contoured and energized at its opposite terminals by a voltage $-v^2$ taken from the potentiometer 104 of the air speed system. The mid-part of potentiometer 116 is grounded at the angle of attack where the drag coefficient $C_D$ ($\alpha$) is zero and contact 113 is connected by conductor **113*a* to the air speed amplifier 100. Accordingly, the derived voltage at contact 113**, since it varies with change in angle of attack generally according to the above relationship can be used as an input $C_D$ to the air speed amplifier. The gravity input G depending on the pitch of the aircraft involves additional servo systems that will be presently described.

The inputs to the angle of attack ($\alpha$) amplifier 112 will now be considered. The gravity factor which as above pointed out is affected by climb and dive attitudes may be divided into two components which are fed to the angle of attack and air speed amplifiers 112 and 100 respectively. In practice these gravity inputs are 90° components, i. e. the air speed component is along the flight path and the angle of attack component is perpendicular thereto. In the present illustration the $v$ and $\alpha$ gravity components are derived by a pair of contacts 122 and 123 from the potentiometer 119 of the "pitch" ($\theta$) servo system indicated, the pitch amplifier 120 in turn being energized to operate the motor 121, etc., from a "rate of pitch" system presently described. The pitch potentiometer 119 is suitably contoured (cosinusoidal in the present instance) and grounded at points 180° apart to represent both normal and inverted level flying, and the potentiometer is energized at points intermediate the grounded points by voltages —E and +E representing climb (negative) and dive (positive) gravity values respectively. The derived voltage at contact 122 represents the gravity component $-W \sin \theta$ which (at low angles of attack) represents the effect of aircraft weight in increasing or decreasing thrust and hence air speed, and is fed by conductor **122*a* to the $v$ amplifier 100. The derived voltage at the contact 123, which is spaced 90° from contact 122 represents the gravity component $W \cos \theta$ to be supported by lift derived through angle of attack and is fed by conductor 123*a* to the $\alpha$ amplifier 112**.

Referring again to the angle of attack system, the lift L (in pounds) may be expressed by the formula $$L=C_L(\alpha)\frac{v^2S}{2}$$

where $C_L$ ($\alpha$) is the coefficient of lift. Therefore lift also is a function of air speed squared and depends on the type of aircraft simulated. Accordingly the potentiometer 117 of the $\alpha$ system for determining lift coefficient is appropriately contoured for the coefficient $C_L$ ($\alpha$) of the particular airplane simulated and is grounded at its mid-portion at the value of angle of attack at which the lift coefficient is zero and energized at its upper and lower terminals by voltages $-v^2$ and $+v^2$ respectively derived from the air speed potentiometer 104. The instantaneous positive value of $v^2$ may be suitably obtained by means of a 180° phase shifter as indicated. Accordingly the contact 114 of the potentiometer 117 derives a lift force voltage which is applied as an input to the $\alpha$ amplifier 112. There is also an input to the angle of attack system representing centrifugal force and this input is derived from the servo system designated "rate of pitch" ($W_y$), centrifugal force corresponding to the product of $W_y$ and $v$.

The inputs to the rate of pitch system include a so-called pitching moment input derived from the potentiometer 118 of the angle of attack system. This pitching moment expressed as $$C_M(\alpha)\rho\frac{v^2S}{2}$$

is also a function of air speed squared. The potentiometer 118 is grounded at its mid-portion at the angle of attack where the pitch moment is zero and is energized by voltages $-v^2$ and $+v^2$ as in the case of potentiometer 117, and is also appropriately contoured so that the pitching moment voltage at the slider contact 115 varies according to the desired characteristics of the particular airplane. This voltage is fed by conductor 115*a* to amplifier 125. The other input $M_P$ of amplifier 125 indicated represents the pitching moment in ft.-lbs. produced by the pilot operated elevator control tending to cause pitch and is derived from the elevator potentiometer 124 that is in turn energized according to the square of air speed by voltages $+v^2$ and $-v^2$. The mid-portion of the potentiometer is grounded to represent approximately level flying or zero pitch. Accordingly the slider contact 124*a* of the elevator potentiometer selects a voltage that may be represented as the pitching moment ($M_P$) in foot-pounds and that is fed to the rate of pitch amplifier 125. It is to be noted that in the case of the foregoing circuits a positive (+) designated signal increases air speed, changes angle of attack, rate of pitch and pitch in the conventionally positive direction as may be seen from Fig. 8.

As in the previous servos, the output of amplifier 125 energizes a two-phase motor 126 for driving a feed-back generator 126*a* and the contacts 127 and 128 of potentiometers 129 and 130 through a suitable speed reducing mechanism 126*b*. The linear potentiometer 129 is used to derive an input voltage representing centrifugal force for the $\alpha$ amplifier and is therefore grounded at its mid-portion and energized according to air speed by voltages $+v$ and $-v$ so that the derived voltage at the slider contact 127 is determined as previously stated by the factors $v$ and $W_y$ and fed to the $\alpha$ amplifier by contactor 127*a*. Also the linear potentiometer 130 for supplying an input to the pitch ($\theta$) integrating system above referred to is energized by voltages +E and −E whereby the derived voltage at the slider contact 128 which is fed by conductor 128*a* to the $\theta$ amplifier is proportional to the rate of pitch, the time integrated value of which represents the pitch angle $\theta$ of the aircraft. This integrating operation is performed by means of the pitch motor 121 and feed-back generator 121*a*, the potentiometer 119 above described providing voltages at slider contacts 122 and 123 that not only represent the two gravity components above referred to but also the instant angle of pitch. Accordingly the pitch element of an attitude gyro can be directly operated from the pitch motor 121 if desired.

It is also to be noted that the variation in the various forces and moments such as gravity, lift, centrifugal force, thrust, drag, pitching moment and the like are accomplished by the change in contact brush position on the respective potentiometers together with variation in the potentiometer energizing voltage, whereas the relative magnitude of each of the aforesaid forces and moments is determined by the value of the input resistance to various amplifiers. As a specific example, the relative magnitude of lift is affected by the values of air density ($\rho$) and the constant factor $$\frac{S}{2}$$

In the present illustration $\rho$ is also considered a constant and hence these terms determine the resistance value of the input indicated at $C_L$ to the amplifier 112. Lowering the value of the resistance increases the relative magnitude of the above constant.

If it is desired to make the density $\rho$ variable according to altitude as in actual practice, this may be accomplished by making variable the input resistances in all circuits involving $\rho$ and changing these resistances according to changes in the value of $\rho$. It will however generally be found simpler to compute the term $\rho v^2$ by modifying the derived voltage $v^2$ in a servo system responsive to altitude. This may readily be accomplished by energizing an altitude servo card with the voltage $v^2$ at the zero-altitude terminal of the card and selecting a voltage according to the potentiometer contact position as the contact is moved toward the grounded terminal of the card with increase in altitude. Thus the derived voltage $v^2$ is modified and attenuated according to decrease in $\rho$ with altitude.

The use of the feed-back generators for rate control is particularly important, the pitch servo integrating system serving as an important example. If the motor 121 alone were relied upon to perform the pitch integrating operation the natural inertia of the driving mechanism would introduce such a large error that from a practical standpoint the system would not be useful. However, with the feed-back generator connected in the system as shown, the generated feed-back voltage $E_{fb}$ constitutes an input for the pitch amplifier and is of such phase relation to the summed or resultant input signal that it opposes the same, i. e. in the manner of degenerative or negative feed-back. With large gain in the control amplifier the speed of the motor according to well-known principles is therefore caused to have a linear speed response to the magnitude of the input signal, i. e. rate of pitch voltage, without lag or overshooting, thereby integrating both high and low rates of pitch with equal precision. It will be apparent that when the main input signal is reversed so as to operate the motor and generator in the opposite direction, the phase of the generated feed-back voltage is likewise reversed to oppose the input signal as before.

The operation of the interacting network of Fig. 6 in respect to the air speed meter reading will now be described. In actual level flying for example when the throttle is opened wider the air speed increases and the nose of the aircraft lifts, the converse taking place during closing of the throttle. Referring to Fig. 6, as the throttle potentiometer contact 110 is moved downward for example toward the open throttle position, the derived input thrust voltage T for the amplifier 100 increases thereby unbalancing the air speed servo system and causing the servomotor 101 to run in a direction moving the potentiometer contacts 106, 107 and 108 upward as shown toward increased air speed so that the following takes place in the air speed potentiometer system 102: (1) the derived air speed voltage $v$ increases, (2) the derived $v^2$ voltage increases as the square of air speed, (3) the derived voltage representing the reciprocal of air speed $$\frac{1}{v}$$

decreases and (4) the air speed meter 24 indicates a higher air speed value. However the air speed cannot increase indefinitely because the constant coefficient drag increases with $v^2$ as does the $C_D$ ($\alpha$) drag. Also at the same time the thrust, which varies with the reciprocal of air speed, decreases as the new equilibrium is reached.

Now, as the values of both $v$ and $v^2$ increase, the angle of attack system is in turn unbalanced since the inputs from the potentiometer 127 of the rate of pitch system and from the potentiometer 117 of the angle of attack system, both of which are dependent on $v$ and $v^2$ respectively, are now increased. Also the gravity input from the pitch system is changed as will presently be described. Accordingly, the $\alpha$ servo 111 starts running in a direction searching for the new balance position and finally moving the potentiometer contacts 113, 114 and 115 downward toward decreased angle of attack indication. As this operation progresses the derived voltages from the three $\alpha$ potentiometers 116, 117 and 118 are used as follows:

(1) The derived drag voltage (negative) from potentiometer 116 is used as an input ($C_D$) for the air speed amplifier and increases in magnitude so as to oppose the increased thrust voltage (positive) derived from the higher throttle setting above referred to.

(2) Since the wing lift of an aircraft must balance any centrifugal force and weight component acting perpendicular to the wing, the derived lift voltage ($C_L$) from potentiometer 117 must balance both the gravity factor $G_\alpha$ and the centrifugal force $F_c$. Assuming that the plane was initially in level flight, the centrifugal force is zero and hence the tendency of increased air speed is to reduce the angle of attack which will tend to become more negative. This tendency is opposed by a change in pitching moment.

(3) The derived moment voltage from potentiometer 118 which is an input ($C_M$) for the rate of pitch amplifier, becomes more positive with decreasing angle of attack and thereby causes an unbalance at the rate of pitch servo system in turn causing the contacts 127 and 128 to move upward to select at contact 127 a centrifugal force voltage $F_c$ for the amplifier 112 which produces an equilibrium restoring tendency at the $\alpha$ servo. Concurrently the upward movement of contact 128 results in an increased input voltage at the pitch integrating servo system $\theta$. Accordingly, all four servo systems are now functioning in a combined computing and integrating operation necessary to determine the new air speed reading and pitch attitude.

As the pitch system is unbalanced toward a position of more positive pitch, i. e. climb, the derived voltages at contacts 122 and 123 representing the gravity (weight) input components for the $\nu$ and $\alpha$ amplifiers respectively vary in magnitude, the $\nu$ component increasing and the $\alpha$ component decreasing in the present instance as it will be apparent that if the aircraft nose were pointed toward the zenith the weight component in the direction of aircraft movement would then represent $-W$ and the weight component perpendicular to the wings, i. e. the $\alpha$ servo component, would be zero. At intermediate aircraft attitudes the components are vectorially resolved.

The negative weight component ($-W \sin \theta$) to the air speed servo tends to reduce the maximum velocity the aircraft will reach with the increased throttle setting. At the same time the wing lift required is decreased due to decrease of the $W \cos \theta$ value ($G_\alpha$) at the $\alpha$ amplifier 112. This allows a further reduction in angle of attack and additional reduction in the negative pitching moment voltage ($C_M$) to the rate of pitch amplifier 125 which in turn produces a still greater upward movement of the contacts 127 and 128, thus increasing the effect on the pitch and angle of attack servos until finally these servos have overrun and have produced too great a change in the weight components for equilibrium. Consequently there is dropping off of air speed. This in turn results in a decreased lift voltage ($C_L$) at the $\alpha$ amplifier 112 so that the angle of attack is increased and a larger negative pitching moment voltage is produced at potentiometer 118 for the $W_y$ amplifier 125. The $W_y$ contacts 127 and 128 now move downward to control the pitch integrating servo so as to reduce the pitch attitude until it finally becomes negative. The $W \sin \theta$ component ($G_v$) to the air speed servo has now become positive, thereby aiding thrust so that the air speed once more increases and the cycle reverses eventually damping itself to a final equilibrium position consistent with the new throttle setting.

In the foregoing manner the true damped wave path for vertical oscillation of an aircraft is accurately reproduced so that the simulation achieved is highly realistic. The degree of damping of the wave path is dependent on the choice of the circuit constants including percentage of velocity feed-back, gear ratios, relative input magnitudes and the positions of potentiometer center taps.

It has been assumed during the above explanation that the throttle setting only has been changed and that the elevator control remained in normal level flight or neutral position. When the elevator control is adjusted, a derived voltage corresponding to the turning moment is used for controlling a rate servo, i. e. the rate of pitch servo from which is derived a voltage corresponding to centrifugal force. This force voltage is an input controlling the angle of attack servo for deriving a rate input voltage of opposite sense but equal in magnitude to the first moment voltage. Also, this same force voltage controls the derivation of another $\alpha$ input force voltage representing lift which has a polarity of opposite sense and builds up to offset the effect of the original force voltage. This illustrates in general how a balance is established between rate of pitch and angle of attack.

An elevator control operation will now be described in particular. When the elevator is moved toward a dive position for example, the contact 124*a* is lowered and the derived elevator potentiometer voltage representing pitching moment, assuming for example that the contact 124*a* was originally in a climb position, first decreases in magnitude to the level flight indication and then reverses in polarity and increases in opposite magnitude thereby unbalancing the rate of pitch system and causing the motor 126 to operate in a direction to lower the contacts 127 and 128 as the system searches for a new balance position. When the contacts pass below the center or zero rate of pitch position indicating level flight, the derived voltages are of opposite instantaneous polarity from those in the climb position and the servo 121 of the pitch system which is energized from potentiometer 130, rotates now in the direction toward negative pitch (dive) thereby increasing the derived voltage at contact 122, i. e. the weight component ($-W \sin \theta$) to the $\nu$ system becomes positive and acts to increase air speed. The motor 111 of the $\alpha$ system, which receives a control signal from the companion potentiometer 129 now also rotates in the opposite direction toward negative $\alpha$. This last operation causes the $C_M$ voltage fed to the rate of pitch system to become more positive thereby tending to stabilize said system. Concurrently, the movement of the $\alpha$ servo has changed the $C_D$ potentiometer derived voltage at contact 113, thereby changing the drag input at the $\nu$ system tending to modify the air speed reading. Consequently there is a repetition of the interaction above described among the four servo systems until the air speed, angle of attack and dive attitude correspond to the aircraft power and elevator condition.

During the above described dive control operation the $\alpha$ system seeks a balance depending on the inputs representing respectively centrifugal force from the rate of pitch system and the gravity component from the pitch system on the one hand, and the lift coefficient from the changed angle of attack on the other hand, the resultant of these inputs operating the motor 111 in the positive or negative direction as the case may be and becoming balanced when the rate of pitch and the pitch systems become stabilized.

It will therefore be seen that aside from essential supply voltages the controlling inputs to the above interconnected servo system are from the throttle and elevator potentiometers, thereby controlling movement in a vertical plane and defining a "vertical" system, as contrasted with an azimuth or yaw system involving turning moments and yawing. The above description of the operation of the air speed servo system, including operation of the air speed meter is intentionally simplified for the purpose of illustrating the interaction of the servo systems, each of which represents a certain flight condition or a system rotatable about a definite axis of the aircraft, such as the pitch axis for example.

In brief, the air speed meter reading and hence the vertical air speed and altitude readings, in the system above described depends not only on the engine thrust component but also on retarding or modifying components that depend in turn on the angle of attack, rate of pitch and angle of pitch involving also the elevator control. A change in any one of the above factors or components necessarily affects the related systems generally tending to unbalance them so that in practice the complete system is continuously searching for a position of balance, thereby simulating the inherent aerodynamic equilibrium of aircraft.

*Yaw control system*

As previously indicated the flight computing system of this invention can be roughly broken down into a "vertical" system described above, a roll system and a "yaw" system involving turning or change in azimuthal position. As in the case of the vertical system, the yaw system shown by Fig. 7 is illustrated by way of introduction to the complete flight computing network.

Figure 7:
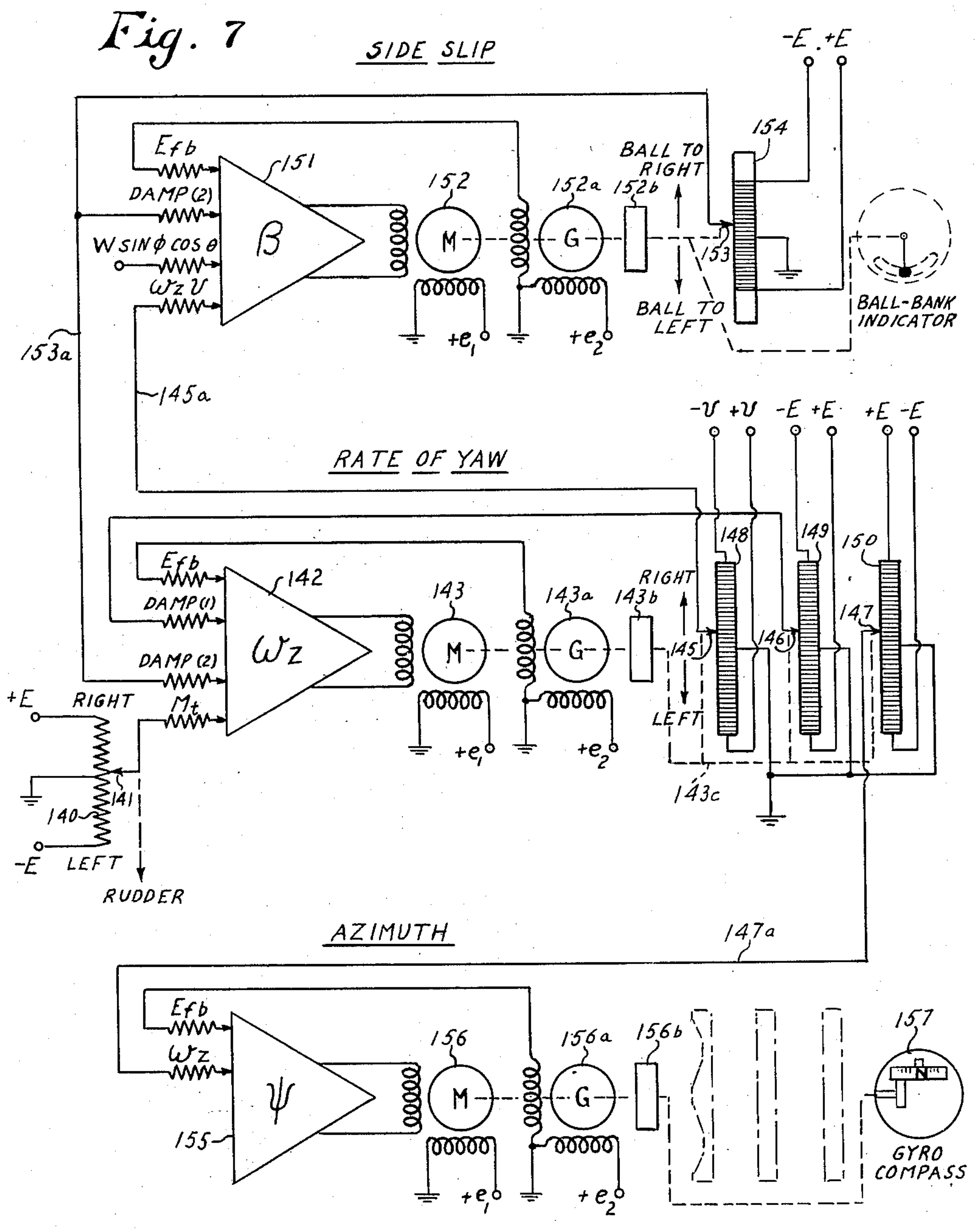
Fig. 7 is a schematic layout generally similar to Fig. 6, for illustrating computation of direction bearing in a yaw system.

Referring now to Fig. 7, a rate of yaw ($W_z$) servo system designated as such is supplied with a number of inputs including an A. C. voltage representing turning moment ($M_t$) from the rudder potentiometer 140. This potentiometer is grounded at its mid-portion to represent straight line flight and is energized by an A. C. voltage having instantaneous values +E and −E at the upper and lower terminals respectively. Accordingly the derived voltage at the rudder controlled contact 141 corresponds to the yawing effect or turning moment produced by right or left rudder and represents the input $M_t$ for the $W_z$ amplifier. A change in the rudder voltage unbalances the $W_z$ system, assuming that there is no compensating change in the other inputs, so that the output of amplifier 142 causes the two-phase motor 143 to operate the potentiometer contacts 145, 146 and 147 toward a new position of balance on the respective potentiometers 148, 149 and 150, i. e. upward in case of a right rudder for example. As in the previously described servo systems the motor drives a feed-back generator **143*a* and operates the potentiometer contacts through a gear box 143*b* and mechanical connections indicated at 143*c***.

The other inputs for the amplifier 142 include the feed-back voltage $E_{fb}$ from the generator **143*a* for insuring operation of the motor 143 at the proper rate, a voltage representing a damping factor (1) opposing an increasing yawing, said voltage being derived at contact 146 of potentiometer 149** which is grounded at its mid-portion and energized by fixed potentials −E and +E at its upper and lower terminals respectively, and a voltage representing a second damping factor (2), i. e. the reaction force of the fuselage to yawing, that is derived from a side-slip (B) servo system so indicated.

The B system comprises a servo amplifier 151, the output of which operates the two-phase servo motor 152 and connected feed-back generator **152*a* to displace through the gear box 153*b* and mechanical connections the slider contact 153 on the potentiometer 154. The inputs for the B amplifier 151 include the feed-back voltage $E_{fb}$, and a voltage representing the aforesaid damping factor (2) derived at potentiometer contact 153. The potentiometer 153 is grounded at its mid-portion and energized at its upper and lower terminals by potentials −E and +E respectively so that as B increases or decreases the derived voltage representing the aforesaid reaction force of the fuselage or damping factor (2) varies accordingly. This voltage is directed by conductor 153*a*** to both the B amplifier and the $W_z$ amplifier.

Another voltage input for the B amplifier represents a gravity factor which is resolved as $W \sin \phi \cos \theta$, where $\phi$ is the angle of roll and $\theta$ is the angle of pitch. This input depends on a roll servo system which has been omitted in the present illustration to avoid complication and it is sufficient for the present to state that this factor represents the component of gravity acting in the conventional X—Y plane of the aircraft, Fig. 8, in the direction of sideslip.

Finally an input for the B amplifier representing centrifugal force is derived from the potentiometer 148 of the $W_z$ system, this potentiometer being grounded at its midportion and energized at its upper and lower terminals by potentials $-v$ and $+v$ respectively, in turn derived from the air speed system of Fig. 6 so that the voltage at contact 145 which is directed by the conductor **145*a*** to the B amplifier corresponds to the product of $W_z$ and $v$, i. e. centrifugal force.

It will therefore be seen that the B system involves as in practice the essential factors of gravity, centrifugal force and fuselage reaction or damping, and the $W_z$ system involves the factors of turning moment due to rudder control and fuselage reaction or damping components.

It will now be apparent that the bearing or azimuth angle can be obtained by integration of the rate of yaw with respect to time. This is obtained by means of the azimuth ($\psi$) servo system that includes a simulated gyro-compass adapted to be oriented according to the integrated azimuth angle. The $\psi$ amplifier 155 is arranged as in the previous instances to energize the motor generator set 155—**156*a* so as to operate through the gear box 156*b* a direction indicating element 157 of the simulated gyro-compass. The main input for the amplifier 155 is derived from the linear potentiometer 150 of the $W_z$ system which is grounded at its mid-point and energized at its upper and lower terminals by potentials +E and −E respectively. Accordingly the voltage derived at contact 147 and directed by conductor 147*a* to amplifier 155 corresponds to a rate of yaw in either the right or left direction so that the azimuth motor 156 rotates in a corresponding direction to orient the compass until the rudder is centered and a straight line flight is resumed, at which time the $W_z$ system is balanced and de-energized at the position of zero rate of yaw and the derived voltage at contact 147** is zero. Consequently the $\psi$ system is de-energized giving a steady reading of the compass.

Now if it be assumed that the pilot puts the rudder hard to the right for example, the rudder moment input for the $W_z$ amplifier increases the maximum amount, thereby unbalancing the $W_z$ system and causing the motor 143 to move the potentiometer contacts 145, 146 and 147 upward as the system searches for a new balance position corresponding to the proper rate of yaw. As the derived potentiometer voltages change in magnitude both the B and $\psi$ systems now become responsive, the B system being unbalanced by the increasing centrifugal force factor and $\psi$ system being operated according to the increasing yaw rate. Accordingly the B system, assuming for the present that the roll angle $\phi$ has not changed operates to indicate side-slip, the motor 152 in this instance moving the contact 153 downward in the direction corresponding to a "ball to left" position of the well-known ball-bank indicator, i. e. a "skidding" indication due to insufficient banking. This condition can be corrected by increasing the roll angle $\phi$ thereby increasing the magnitude of the gravity component input $W \sin \phi \cos \theta$ so as to counter-balance the "skidding" centrifugal force input $W_z \times v$. When these two inputs are in proper relation the B system is balanced for the condition of no side-slip with the contact 153 at the center or no voltage position and the ball of the ball-bank indicator centered. The voltage derived at contact 153 is used as previously described as an input representing damping for the B amplifier tending to damp side-slip and to center the contact 153.

Figure 8:
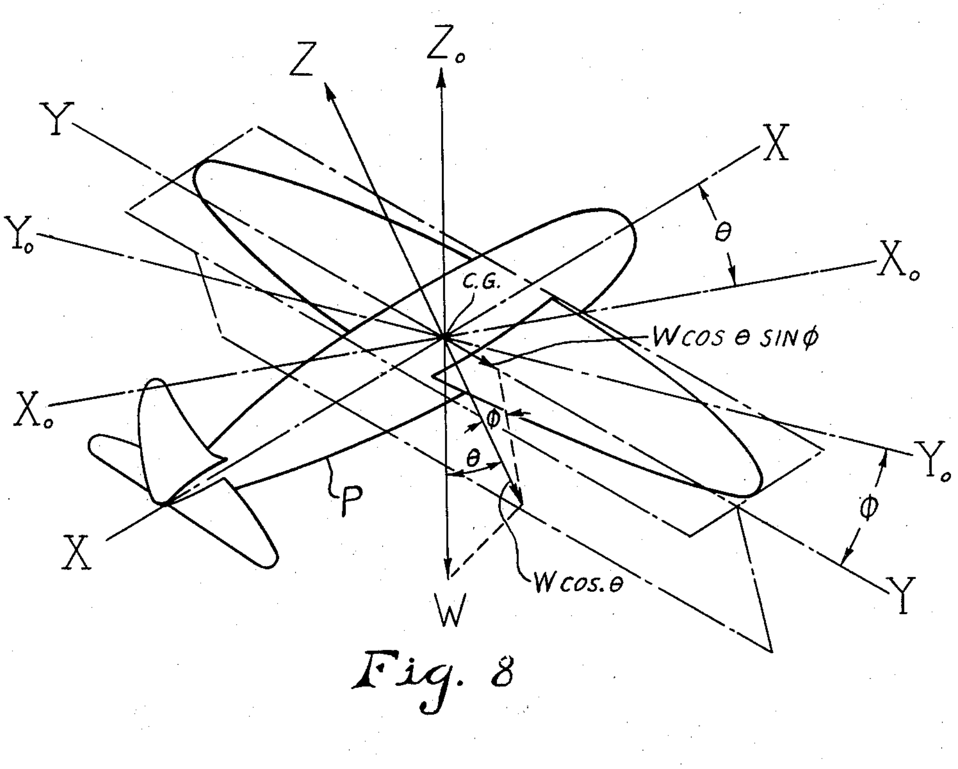
Fig. 8 is a vector diagram for an aircraft in pitch and roll attitudes illustrating aircraft axes and the resolution of the force of gravity into side-slip components.

The gravity components affecting side-slip according to the pitch and roll angles above referred to are diagrammatically illustrated by Fig. 8 wherein an airplane P is shown in a combined climb and right roll attitude, the pitch angle $\theta$ and roll angle $\phi$ being measured between a horizontal plane defined by the fixed axes $X_0$ and $Y_0$ and the X and Y axes of the aircraft respectively. The vertical gravity or weight vector W from the center of mass can therefore be projected on the Y—Z plane of the aircraft as $W \cos \theta$, and this component in turn can be projected on the X—Y plane as $W \cos\theta \sin\phi$. This last component therefore represents the gravity component acting along the wing tending to cause side-slip. If this component exceeds the centrifugal force and damping components, falling off or slide-slip results; if it is less than those components, the side-slip takes the form of "skidding."

It is to be noted that for any given rate of turning the centrifugal force $W_z v$ becomes a direct function of air speed. Accordingly, to execute a turn without side-slipping, the bank angle must be increased with increased air speed to have the term $W \cos\theta \sin\phi$ balance $W_z v$. This is an important simulation of actual aircraft.

By proper choice of damping input resistances, the feed-back inputs at the B and $W_z$ servos and gear ratios, the computing system may be made to oscillate as desired to represent lateral oscillation and damping of an aircraft.

*System schematic*

Before proceeding with a detailed description of the servo systems involved in the present invention, the block-schematic illustration of the system, Fig. 10, will be briefly considered. In general the inputs to the complete system comprise not only the main control potentials, such as those from the aileron, elevator, rudder and engine controls, but also include trim control and certain factors involving changes in drag, lift and pitching moments as may be introduced separately or in combination by such controls as flaps, landing gear and wing ice. The input power is taken from a source of commercial A. C., such as 60 cycle, 110 volts, and voltage regulation, phase shifting, rectification, etc. where required are accomplished by conventional means.

The schematic illustration is intended to show only in a general way the relationship of the various servo systems and associated equipment in the complete system, the electrical connections being indicated by solid trunk lines and the mechanical connections being indicated by dotted lines. For example the air speed servo unit 25 previously described, Figs. 4 and 27, is connected to the air speed meter 24 through the shaft connection 26, and the servo motor 39 is indicated as energized from the air speed amplifier $v$, the control of which in turn is dependent upon a number of factors derived from the system at large as explained in connection with Fig. 6.

The nine servo systems shown represent respectively air speed $v$, rate of pitch $W_y$, angle of attack $\alpha$, side-slip B, azimuth $\psi$, pitch $\theta$ roll $\phi$, rate of yaw $W_z$, and altitude, all of which are electrically connected in a single computing and integrating system. The useful output of the system is primarily the flight indications at the various instruments which, in addition to the air speed meter above referred to include the attitude gyro 30, the pitch element of which is electrically operated by "teletorque" from the pitch servo and the roll element by a direct mechanical connection 32 from the roll servo, the vertical air speed meter 54 that is electrically operated from the system, the bank and turn indicator 33, the ball-bank element of which is mechanically operated through connection 35 from the side-slip servo and the turn indicator by teletorque from the rate of yaw servo, the altimeter 53 which is electrically operated by teletorque from the altitude servo, the gyro-compass 27 which is mechanically operated through connection 29 from the azimuth servo and the remote magnetic compass 59 which may be electrically operated by teletorque from the system.

In addition to the flight indications, the useful output includes simulation of certain flight conditions such as rough air and air resistance on the controls, the former being also related to the angle of attack servo so that rough air conditions are automatically introduced in case of a "stall," and the latter or control loading being related to the air speed servo so that the air resistance loading may vary with air speed. Under the subject "Engine Control and Thrust" a number of factors concerned with the engine control and operation are also introduced such as throttle, mixture and propeller R. P. M. control for simulating constant speed, variable pitch propeller operation, the resulting thrust component from this system being delivered to the air speed servo. In the engine control system which is illustrated in Fig. 35, carburetor ice, idle cut-off, engine tachometer and engine noise and manifold pressure indication are some of the factors simulated.

In order to keep the schematic illustration of Fig. 10 sufficiently clear for ready reference, only those connections and parts essential to a general understanding of the relationship between the controls, servo systems and indicating instruments are shown.

*Legends and reference characters*

Figure 11:
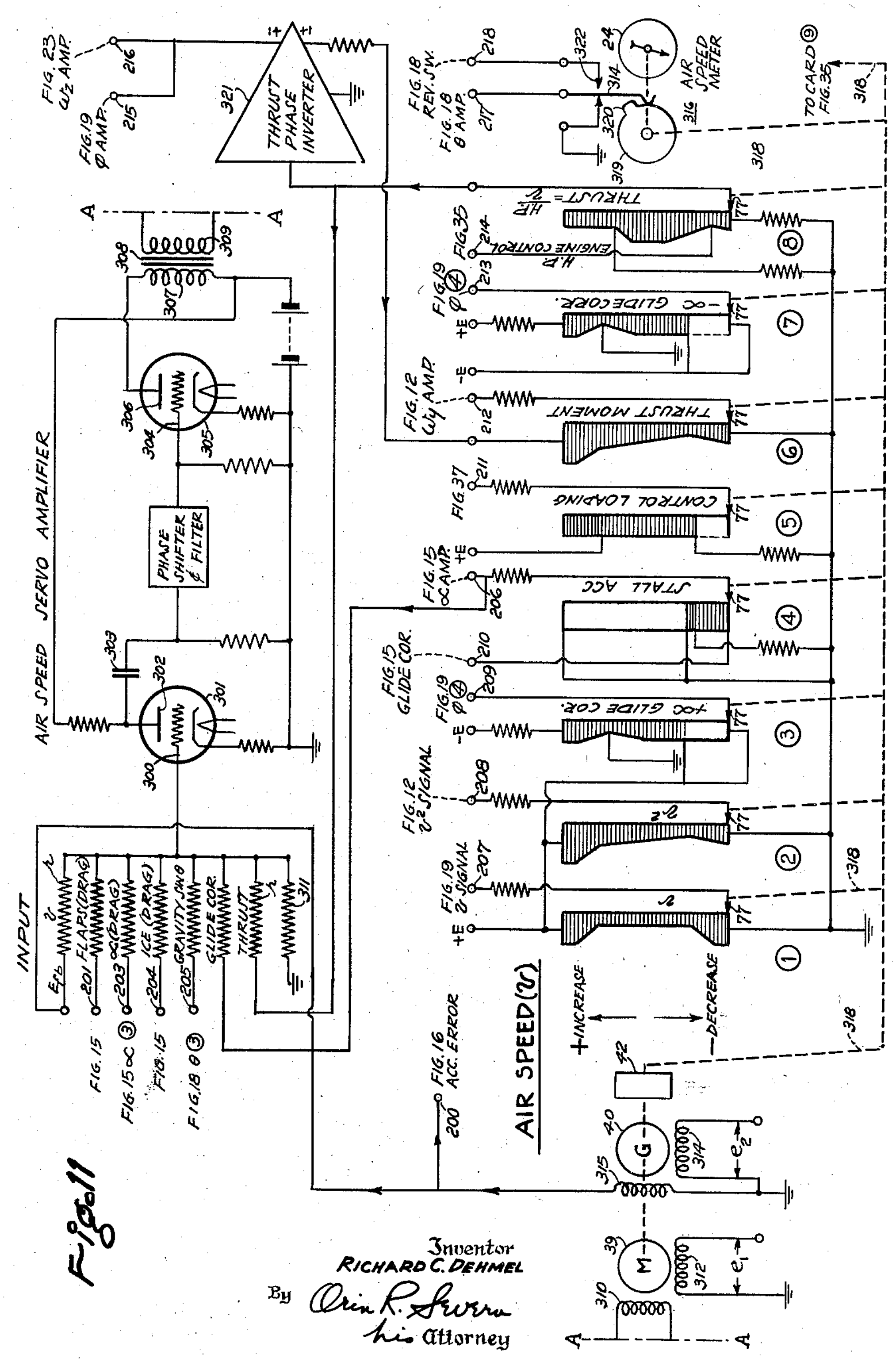
Fig. 11 is a schematic illustration of the air speed servo system including the air speed servo amplifier.

Since the interconnected separate parts of the flight computing system cannot well be shown on a single drawing, a reference character system and self-explanatory legends are used so that the drawings can be quickly and easily read with reference to each other. For example, the input terminal 201 of the air speed ($v$) summing amplifier of Fig. 11 corresponds to the "flaps" terminal 201 of Fig. 15, the legend "flaps" referring to that part of the flight simulating circuits so designated in Fig. 15. The corresponding terminal 201 of Fig. 15 refers back to "$v$ AMP.," i. e. the air speed amplifier, of Fig. 11. Also, since the potentiometers comprise a major and essential part of the system and since a large number of them are involved the potentiometer cards of each servo are individually and distinctively numbered for easy recognition. For example, in Fig. 11 the third card of the air speed servo (reading from the left) is labeled ⑧ and the slider contact thereof is indicated as connected to terminal 209 of card ④ of Fig. 19. Referring now to Fig. 19 it will be noted that terminal 209 of card No. 4 refers back to terminal 209 of card No. 3, Fig. 11. Finally, the terminals of other apparatus of the system such as switches, etc. are indicated in the same manner; for example, the terminals 217 and 218 of the cam-operated switch of Fig. 11 are indicated as connected to corresponding terminals 217 and 218, Fig. 18 of the $\theta$ (pitch) amplifier and the reversing switch (REV. SW.) respectively, and these terminals of Fig. 18 refer back to the switch (SW.) of Fig. 11. Reading of the drawings and following through the various circuits, keeping in mind the descriptive legends of the various servos previously listed is therefore facilitated.

*The air speed servo system*

Referring specifically to a preferred form of my invention, Fig. 11 illustrates the air speed ($v$) servo including the servo summing amplifier for the various inputs previously indicated. In the present instance, they include as indicated at "input," potentials representing thrust, gravity, various drag components relating to angle of attack, flaps and landing gear, and icing, a glide correction factor introduced at low and very high air speeds and finally a negative velocity feed-back voltage from the air speed servo generator affecting the response of the air speed servo in correct simulation of aircraft inertia.

The summing amplifiers for supplying power to and controlling the various servos are similar and may be of conventional design so that a single description thereof will suffice. In the remaining servo systems the servo amplifiers are simply indicated in the conventional block schematic form as a triangle. The aforesaid inputs to be algebraically summed are represented by A. C. voltages originally derived from a 60 cycle source which is used as a reference for the complete system and are jointly connected as indicated through respective summing resistances $r$ to the control grid 300 of the triode vacuum tube 301. The control grid is also grounded through resistance 311. The plate 302 of this tube is connected through a condenser 303 and a 90° phase shifter and filter circuit as indicated to the control grid 304 of another triode 305. The plate 306 of this tube is connected to the primary winding 307 of a transformer 308, the secondary winding 309 of which is arranged to energize the control winding 310 of the air speed servo motor 39. It will be apparent that the number of amplification stages may be increased as desired to suit power and sensitivity requirements. As previously stated the servo motors are of the two-phase type, the winding 312 being energized from a 60 cycle reference source $e_1$ and the control winding 310 by a variable control voltage, i. e. output of servo amplifier also of the same frequency as $e_1$ but displaced in phase 90° by reason of the phase shifter above referred to. It should be kept in mind that all A. C. voltages used in the present system are taken or derived from the same 60 cycle source although the magnitude and instant polarity or phase may be varied where required.

Accordingly when the motor winding 310 is energized the motor is rotated at a speed dependent on the magnitude of the amplified signal from the air speed amplifier and in a direction indicating increase or decrease in air speed depending on whether the control voltage lags or leads the reference voltage by 90°. The motor drives the feed-back generator 40 (also of the two-phase type as previously described), one winding 314 being energized by a 60 cycle voltage $e_2$ taken from the reference source. The feed-back winding 315 generates a voltage $E_{fb}$ as a velocity input for the servo amplifier. This voltage stabilizes the servo according to the well-known principle of negative velocity feed-back and by suitably selecting the amount of input resistance *r*, the gear ratio in gear box 42, and the inertia of the motor armature the inertia of the aircraft may be simulated by slowing down the rotational response of the servo. These means are also used in a similar manner in other servos for like effect.

The motor also gang-operates the respective slider contacts 77 of the potentiometer cards Nos. 1 to 8 inclusive, a cam operated switch 316 and the air speed meter 24, all through a suitable gear reducer 42 and mechanical connections indicated by the dotted lines 318, the general structure being shown by Fig. 27 previously described. The movable contact 314 of the cam switch 316 is operated directly from the servo shaft by cam 319 having a contact operating portion 320 corresponding to approximately the air speed range between zero and forty miles per hour for affecting pitch $\theta$ at low air speeds, Fig. 18.

The circular potentiometer cards as in Figs. 6 and 7 are illustrated in the developed plan view for clarity and are indicated as wound by resistance wire in the conventional manner by shaded lines, the blank portions indicating short-circuited sections and the air speed being represented as zero when the slider contacts are at the bottom of the cards and a maximum when at the top. All cards are contoured for the function they are to develop and further modified in accordance with the meter scale which is contracted at the low and high ends of the scale. The functions of the eight potentiometer cards are generally as follows: Card No. 1 is energized by a constant A. C. voltage and the servo derives a voltage proportional to air speed for use after amplification as the air speed or *v* signal; card No. 2 is similarly energized for deriving a voltage generally proportional to air speed squared for use after amplification as the $v^2$ signal; card No. 3 is energized by an A. C. voltage of opposite instant polarity for deriving a glide correction voltage that is a function of air speed for use in the roll ($\phi$) and pitch ($\theta$) systems for modifying vertical air speed, Fig. 18; card No. 4 is energized according to a glide correction factor for deriving an air speed modifying voltage for the *v* servo above referred to; this voltage may also be a stall reaction voltage, if desired, for the $\alpha$ servo, Fig. 15; card No. 5 is energized by an A. C. voltage similar to cards 1 and 2 for deriving a voltage proportional to air speed within a practical range for use in controlling the resistance to movement of the controls, i. e. control loading, Fig. 37; card No. 6 is energized according to thrust for deriving a thrust moment voltage for the rate of pitch servo, Fig. 12; card No. 7 complements the function of card No. 3 and card No. 8 is energized according to engine control, Fig. 35, by a voltage representing horsepower for deriving a thrust voltage $$\frac{\text{H.P.}}{v}\left(\text{proportional to } \frac{1}{v}\right)$$

for use as an input to (1) the air speed servo amplifier, and (2) a 180° phase shifter or inverter 321 for supplying opposite phase thrust voltages to the $\theta$ and $W_z$ servo amplifiers and to air speed card No. 6.

It will be understood that the design of the various potentiometers need not always follow precisely theoretical considerations and that satisfactory results can often be obtained by simplifying or modifying the potentiometer design depending on the type and characteristics of the aircraft to be simulated.

*Rate of pitch servo and elevator control*

The rate of pitch ($W_y$) servo system in addition to the pilot controlled elevator potentiometer and two of the signal amplifiers is shown by Fig. 12. Since the derived potentiometer signals are in most cases comparatively weak, it is desirable that certain important and frequently used signals, such as *v*, and $v^2$ for example be initially amplified. The form of amplifier may be of conventional design and is similar in each case so that a single description, such as of the $v^2$ signal amplifier will suffice. The $v^2$ signal from card No. 2 of the *v* servo system, Fig. 11, is fed to the control grid 325 of the triode vacuum tube 326, the plate 327 of which is connected to the primary winding 328 of a transformer 329. The secondary of the transformer comprises a plurality of individual windings 330, 331 and 332 which supply the amplified $v^2$ signal to card No. 2 of the B servo, Fig. 16, the "flaps" circuit Fig. 15, and card No. 1 of the $\alpha$ servo Fig. 15, respectively for purposes hereinafter described. The windings 330 and 332 are provided with grounded center taps and a connection 333 supplies a negative feed-back voltage from winding 330 to the grid 325 to insure accurate signal reproduction in well-known manner.

In simulation of the combined effect of air speed and propeller slip stream another amplifier 334 is used in the computing system which has as input signals a voltage representing air speed squared ($v^2$) from winding 330 of the $v^2$ signal amplifier and a constant voltage E representing a constant C. The summed signal so amplified representing ($v^2+C$) is fed to the primary winding 335 of transformer 336, the secondary of which comprises two windings 337 and 38 for energizing card No. 2 of the $\alpha$ servo Fig. 15, and the elevator control potentiometer 339 respectively. The winding 337 is provided with a grounded center tap and a negative feed-back connection *fb* to the amplifier and the winding 338 provides potential for the parallel connected elevator and elevator trim potentiometers 339 and 340 respectively. The trim slider contact 341 is grounded and is provided with a suitable mechanical connection (not shown) for operation by the pilot from the seat 4, Fig. 1, and the elevator slider contact 342 is operated by the pilot through the trainer control column, Figs. 2, 13 and 14.

Referring particularly to Figs. 13 and 14 the control column 6 is provided with a trunnion-like mounting for forward and rearward movement in the frame 343 of unit B, Fig. 2, in the usual manner to govern dive and climb. A sleeve-like bearing housing 344 Fig. 13, forming a part of the column 6 is supported on the ball bearings 345 which in turn are mounted on the fixed shaft 346 secured at opposite ends by clamps 347 to the trainer frame 343. The control column is therefore free to rock forward and backward on the ball bearing support for controlling the elevator potentiometer. To this end, the potentiometer 339 is of arcuate form and is secured to a plate-like member 348 in turn secured to the frame 343. The slider contact 342 is insulated from and carried by an arm 349 secured to the rotatable bearing housing 344 so as to make sliding engagement with the inner edge of the potentiometer 339 as the control column is operated. An insulating terminal block 350 is mounted on the fixed plate 348 and is provided with terminals 351 for the leads 352 from the potentiometer terminals. The slider contact is connected to terminal 353 by a flexible lead 354 so that a voltage can be derived from the potentiometer 339 according to the climb-dive position of the control column.

This derived potential representing pitching moment is one of the main controlling inputs for the rate of pitch amplifier, Fig. 12, the slider 342 being connected by conductor 355 to the $W_y$ amplifier. Other inputs to the $W_y$ amplifier, in addition to the negative velocity feed-back voltage $E_{fb}$ from the motor generator set, comprise at terminal 221, a potential that is a function of both $v$ and $W_y$ representing centrifugal force subject to cancellation according to concurrently computed values of $\alpha$, at terminal 222 a potential representing a pitching moment from the $\alpha$ servo, at terminal 223 a potential representing a rough air condition, at terminal 224 a potential representing a pitching moment from the flaps, at terminal 212 a potential representing pitching moment due to thrust and derived from the air speed servo, and finally, at terminal 233, a pitch stabilizer potential representing a damping factor from the pitch servo. The thrust moment voltage at terminal 212 tends to operate the $\theta$ servo in a direction of positive pitch since in the aircraft simulated the line of thrust is below the center of gravity (C. G.) of the aircraft.

The summed $W_y$ signal operates the M–G set of the servo in the manner above described to position the slider contacts of the four $W_y$ linear characteristic potentiometers, the first and second of which provide oppositely phased potentials representing rate of pitch according to $W_y$ to be resolved in the roll servo system, Fig. 19, for use in actuating the pitch servo and the third and fourth cards being energized by the $v$ signal for also supplying oppositely phased centrifugal force potentials $vW_y$ for the angle of attack system, Fig. 15. The third card also provides potential for the acceleration error system of Fig. 16. All $W_y$ cards are grounded at the mid-section between the oppositely energized terminals to represent zero rate of pitch.

The structural arrangement of the $W_y$ servo unit is generally similar to that of the air speed unit illustrated by Fig. 27 and described previously in connection with Fig. 6 since rotation of the servo shaft is within a range of 360°.

*Angle of attack servo, rough air, wing ice and flaps control*

The angle of attack ($\alpha$) servo system shown by Fig. 15, as in the case of Fig. 6, is primarily affected by lift, centrifugal force and gravity factors. The system includes three potentiometer cards energized from the $v^2$ and $(v^2+C)$ signal amplifiers, Fig. 12, and a pair of cam switches 360 and 361 that are operated in accordance with $\alpha$ for controlling rough air operation and the rate of pitch system respectively when a stalling angle is reached. For purposes of more precise control, the ratio of angular movement of the servo shaft to the actual change in angle of attack may exceed unity, such as a 4:1 ratio of example. The structural arrangement of the $\alpha$ unit may be generally similar to the air speed unit of Fig. 27 previously described as the servo shaft moves through approximately 330°.

Card No. 1 is energized at approximtely 165° spaced terminals according to $v^2$, this potential being modified by angle of attack to represent lift ($C_L$) for input to the $\alpha$ amplifier. It will be noted that the slider 238 in neutral position is about 10° (actually 2½°) above (toward $+\alpha$) the intermediate ground tap to simulate the normal condition of positive lift, i. e. $+\alpha$, during level flight. Card No. 2 is energized according to $(v^2+C)$, the derived potential thereof representing pitching moment ($C_M$) being an input to the $W_y$ amplifier. The varying contour of this card provides for simulation of the aircraft's characteristics (pitching moment coefficient) particularly at critical values of $\alpha$. Mathematically, the contour of the card may be expressed as the derivative of pitching moment as plotted against $\alpha$. Abrupt changes in slope as at the stall point may be simulated by connecting resistances such as modifying resistance 398 in the potentiometer circuit. In card 2 the slider 239 in neutral position is about 4° (actually 1°) below (toward $-\alpha$) the intermediate group tap to simulate a small negative pitching moment, i. e. where the C. G. of the aircraft is slightly in advance of the center of pressure (C. P.). Card 3 is energized at opposite terminals according to $-v^2$ and the derived voltage representing drag ($C_D$) is used as a negative input to the $v$ amplifier. Accordingly the rate of pitch and air speed servos are controlled according to change in angle of attack generally as explained in Fig. 6. That is, the derived lift voltage from card 1 is used to balance both the centrifugal force voltage input to the $\alpha$ servo from $W_y$ card 3, and the gravity voltage from the $\theta$ servo; and the derived moment voltage from card 2 is used to balance the elevator moment voltage to the $W_y$ servo.

The $\alpha$ inputs in addition to the modified $v^2$ voltage from card 1 includes a negative velocity feed-back voltage $E_{fb}$, a positive voltage to increase angle of attack when wing ice is simulated, a stall acceleration voltage at terminal 206 (if desired) from the air speed servo for causing a "stall" condition to develop more rapidly, a voltage at terminal 229 from the $W_y$ servo $vW_y$ representing vertical centrifugal force, a gravity voltage $E \cos \theta$ at terminal 235, a gravity loading factor voltage $E \cos \theta \cos \phi$ at terminal 236 representing loss of lift due to roll, and a lift component voltage from the flaps.

The input representing "wing ice" is derived from a potentiometer 362 that is energized by positive voltage +E tending to require $\alpha$ more positive. The potentiometer slider contact 362′ is operated by a reversible motor 363 through a gear reducer as diagrammatically illustrated so that the wing ice input may vary between zero and the maximum positive voltage. The wing ice motor is suitably controlled for the simulated icing and de-icing operations, such as for example by a pilot's de-icing or wing heating switch 364 connected in series with the motor winding 365 which when energized causes rotation of the motor in a direction to decrease the derived voltage, and an instructor's switch 366 that is connected is series with the reversing winding 367 and also in series with a switch 368. This latter switch is mechanically coupled as indicated at 369 to the pilot's switch 365 so that when one switch is "on" the other switch is "off." Accordingly the pilot's control is dominant and "icing" can only occur when the pilot's switch is off. The motor windings therefore may be selectively energized from a supply voltage $E_{ac}$ by the pilot, or by the instructor under predetermined conditions, for the icing and de-icing control.

The wing ice motor also is used to derive a negative voltage from potentiometer 370 for decreasing air speed, Fig. 11, by simulating increased drag as the wing ice effect increases. Slider contact 371 selects the negative voltage for this purpose according to the amount of wing ice.

The rough air (R. A.) system may operate both automatically as when a "stall" occurs, and at the option of the instructor. It is sufficient insofar as the present invention is concerned to show rough air as primarily affecting the rate of pitch and yaw systems since it will be obvious that the effects of rough air disturbances may be introduced elsewhere if desired, and by affecting the pilot physically. The disturbances are intermittently introduced, preferably in a random manner by means of suitably contoured motor operated cams 372 and 373, the operating motor 374 being energized from its supply source E either by the $\alpha$ switch 360, or by the instructor's switch 375 which is connected in parallel therewith. The instructor's switch is connected in parallel therewith. The instructor's switch is controlled by a knob 376 on the instructor's panel that is also arranged, after closing the switch 375 to increase as desired the intensity of the rough air disturbances. To this end the instructor's knob 376 is mechanically connected as indicated through the gearing 377 and 378 to a pair of rotatable slider contacts 379 and 380 of potentiometers 381 and 382 respectively. Each potentiometer is arranged to be intermittently and alternately energized as illustrated by opposite voltages through a corresponding cam switch. For example, the cam switch 372 applies both a positive and a negative potential $+E$ and $-E$ to the respective potentiometer 382 for each cam revolution so that the energizing voltage on each potentiometer can be intermittently varied through a wide range. The rough air potentials from the potentiometer slider contacts 379 and 380 which are modified according to intensity as desired by the instructor appear as inputs to the rate of yaw and rate of pitch servos respectively for affecting these systems including the instruments influenced thereby in a realistic manner. The reason for operating the R. A. motor from the $\alpha$ servo is to simulate shaking or "bumping" of the airplane during stall.

The simulation of the use of flaps is accomplished by three potentiometers 383, 384 and 385 representing drag, pitching moment and lift respectively. The three flap potentiometers are energized at the common terminal 220 by a voltage representing $v^2$, Fig. 12, and the various flap position voltages at the slider contacts 386, 387 and 388 are used as inputs to the $v$ servo, $W_y$ servo and $\alpha$ servo respectively. The slider contacts are connected to a common operating shaft indicated at 389 for positioning in accordance with the pilot's operation of the flap control handle 390. Accordingly it will be noted that the simulated position of the flaps influences through the drag potentiometer 380 the air speed, through the moment potentiometer 384 the rate of pitch, and through the lift potentiometer 385 the angle of attack. The drag potentiometer 383 also is connected at its low voltage terminal to ground through a resistance 391 that is arranged to be shunted by the pilot's switch 392 for simulating the raised and lowered positions of the landing gear. When the switch 392 is in the "up" position the low voltage terminal of potentiometer 383 is directly grounded to represent zero drag at the landing gear, and in the "down" position of the switch as shown the resistance 391 now inserted in the circuit serves to increase the voltage at the slider contact 386 to represent the increased drag when the landing gear is down.

For the purpose of visually indicating the position of the flaps, either for the information of pilot or instructor, a switch contact 393 may be mounted on the flaps controlling shaft 389 for energizing and de-energizing the signal lamp 394. If desired, a signal lamp may be similarly controlled by the landing gear switch. Also a switch 395 controlled by shaft 389 is provided for purposes of glide correction for the "up" or "down" position of the flaps. In the "up" position a roll-modified angle of attack potential from terminal 257 is normally directed to the air speed servo, Fig. 11, whereas in the "flaps down" position the terminal 257 is grounded through resistance 396 thereby cutting out the glide correction voltage for the air speed servo.

*Side-slip servo, B signal amplifier and ball-bank control*

Referring to Fig. 16 the side-slip (B) servo system which is primarily affected by centrifugal force, gravity and damping factors includes two potentiometer cards, linear card No. 1 being energized at opposite terminals by voltages $+E$ and $-E$ from which a voltage is selected according to B for input to the roll servo, Fig. 19, and linear card No. 2 being similarly energized according to air speed squared and the derived voltage $v^2B$ used as an "answer" input to the rate of yaw ($W_z$) servo, Fig. 23. Both potentiometers are provided with grounded mid-taps which establish the condition of no side-slip i. e. when for a given air speed, centrifugal force and gravity along the Y axis are balanced indicating either level flight or perfect banking. The B servo motor is adapted to operate directly through a mechanical connection 400 the ball-bank element of the rate of turn and ball-bank indicator, Fig. 23. Structurally, the B servo unit is generally similar to the air speed servo unit, Fig. 27 previously described since it can operate within a range of less than 360°.

The inputs to the B servo motor amplifier comprise a velocity feed-back voltage $E_{fb}$, a B signal voltage and a return voltage from card No. 1 which corresponds to the lateral damping term of an aircraft. The feed-back circuit of the servo generator in the present case includes an auxiliary low voltage transformer circuit 401 for "bucking" the residual field of the generator feed-back coil so as to prevent "creeping" of the motor when the input signal is zero. This is very important in the case of the more sensitive integrating servos, including the azimuth and altitude servos.

The B signal voltage from the B signal amplifier is obtained in the following manner. The inputs to this amplifier are potentials representing Y-axis components of gravity and centrifugal force acting along the wing so as to affect side-slip. The gravity component $E \cos \theta \sin \phi$, Fig. 8, is derived from card No. 6 of the roll servo, Fig. 19 and the centrifugal force component $vW_z$ is derived from card No. 3 of the rate of yaw servo, Fig. 23. The roll angle $\phi$, Fig. 8, is shown as positive (right wing down) and is measured between the horizontal fixed axis $Y_0$ and the aircraft Y axis. Also the pitch angle $\theta$ is shown as positive (up) and is measured between the fixed horizontal axis $X_0$ and the aircraft X axis.

The resultant output $E \cos \theta \sin \phi - vW_z$ of the B signal amplifier energizes the primary winding 402 of the transformer 403, the two secondary windings 404 and 405 being connected so as to supply potentials to card No. 3 of the roll servo, Fig. 19, and the B amplifier respectively. As above indicated the output potential of the B signal amplifier represents the difference between the opposing factors of gravity and centrifugal force.

*Azimuth servo, gyro-compass and magnetic compass with turning error*

The azimuth ($\psi$) servo, Fig. 16, controls both the gyro-compass 27 through a direct mechanical connection with the servo motor, and the remote magnetic compass (RMC) 59 through an electric synchronous transmitting and receiving system known generally as "teletorque" or "selsyn." The operation of the RMC is also affected in accordance with acceleration and north turning maneuvers so as to simulate the well-known turning and acceleration errors in the compass reading.

The structural arrangement of the azimuth servo unit is shown by Fig. 28 and although similar in most basic respects to the air speed unit of Fig. 27 differs therefrom in that the azimuth servo operating shaft 406 must be adapted for continuous rotation in either direction. For this purpose the rotatable contact holder 407 mounted on the shaft 406 is provided with an offset brush holder 408 having secured thereto individual brushes 409 that are electrically connected to the respective slider contacts 77 and arranged to engage corresponding slip-rings 411 suitably mounted on and insulated from the fixed hub support 412. The servo motor M operates the potentiometer contacts through the driving connection and gearing generally indicated at 413 in the manner previously described in connection with Fig. 27, other similar structural parts being designated by the same reference numerals as Fig. 27.

A synchronous transmitter 414 is suitably secured to the end wall 415 of the azimuth servo housing, the rotatable coil (not shown) of the transmitter being directly connected through a coupling 416 to the servo shaft 406. The electrical connections of the transmitter are diagrammatically illustrated in Fig. 16. The servo shaft 406 also through the rotating member of the transmitter is mechanically connected at the coupling 417 to the operating shaft 29 of the gyro-compass 27, Figs. 4 and 16.

Referring again to Fig. 16, the inputs to the azimuth servo amplifier comprise a negative velocity feedback voltage $E_{fb}$ and a signal voltage $\dot{\psi}$ sec $\theta$, i. e.

$$\frac{d\psi}{dt} \sec \theta$$

that represents the angular velocity of the aircraft about a fixed vertical axis $Z_0$, Fig. 8. Therefore when the azimuth signal is zero, the azimuthal position of the aircraft is steady. This signal voltage is obtained in the following manner. The azimuth signal $\dot{\psi}$ amplifier, Fig. 18, is supplied with input voltages from the roll servo representing turning rate components $\pm W_y \sin \phi$ and $\pm W_z \cos \phi$ and the summed output of the signal amplifier representing $$\frac{d\psi}{dt}$$

or $\dot{\psi}$ energizes the primary winding 454 of the transformer 455, the secondary winding 456 of which is provided with a grounded center tap and connected at its voltage terminals to the separate quadrants of the secant card No. 2 as explained. Accordingly this $\dot{\psi}$ signal is modified by the secant card 2 of the $\theta$ servo for deriving the aforesaid azimuth signal voltage corresponding to $$\frac{d\psi}{dt} \sec \theta$$

i. e. $\dot{\psi} \sec \theta$, or $(W_z \cos \phi + W_y \sin \phi) \sec \theta$. Accordingly the azimuth servo functions as an integrating device for computing changes in the heading of the aircraft, the azimuth servomotor being directly mechanically connected at 29 as previously indicated to the gyro-compass 27. The azimuth generator feed-back circuit, Fig. 18, is provided with a low voltage bucking circuit 418 as in the case of the B servo above described.

There are three azimuth potentiometers, the cosinusoidal card No. 1 being energized by a pair of voltages $-v \cos \theta$ and $+v \cos \theta$ from card No. 1 of the pitch servo, Fig. 18. Two derived voltages $v \cos \theta \sin \psi$ and $v \cos \theta \cos \psi$ are taken from this card at contacts 431 and 432 respectively spaced 90° apart along the card and these voltages may be used in the charting system described in my aforesaid Patent No. 2,529,468, Fig. 5, for indicating the aircraft position. Linear card No. 2 is for determining north turning error and is energized by voltages of opposite polarity representing centrifugal force $vW_z$. The centrifugal force voltage from the $W_z$ servo, Fig. 23, used as an input to the B signal amplifier is also separately directed (conductor 433) to and amplified by the north turning error amplifier 419 for energizing card No. 2 at points spaced 180° apart representing the north and south azimuth positions the mid-points of the card also spaced 180° apart are grounded to represent the east and west azimuth positions at which no north turning error occurs. The voltage derived from card No. 2 therefore may represent north turning error. Linear card No. 3 is for introducing acceleration error, this card also being energized at points spaced 180° apart from the output of the acceleration error amplifier 420. The maximum voltage and grounded portions of card No. 3 are in alignment with those of card No. 2 but the slider contact of card No. 3 is spaced 90° from that of card No. 2 since in the case of acceleration error, maximum error occurs in the east and west directions, there being no acceleration error when flying in the north and south directions. The acceleration error amplifier has two inputs, one being from the generator feedback circuit of the air speed servo, Fig. 11, representing $$\pm\frac{dv}{dt}$$

i. e. acceleration, and the other representing centrifugal force $\pm vW_y$ due to pitching.

The azimuth servo motor in addition to operating the gyro-compass 27 also operates the rotatable coil 421 of the synchronous transmitter 414. Coil 421 is energized by a suitable voltage E through a slip-ring connection as indicated. The stationary winding of the transmitter comprises the two coils 422 and 423 arranged in quadrature and electrically connected through slip-rings as illustrated to quadrature coils 424 and 425 respectively of the rotatable element of the synchronous receiver 426. A fixed coil 427 is energized by voltage E as in the case of the transmitter coil 421 and is inductively related to the repeater quadrature winding for causing the latter to follow the angular movement of the transmitter coil. The indicating element of the RMC 59 is mechanically connected as indicated for movement with the receiver quadrature windings 424 and 425 and a suitable damping device, such as a magnetic damper 428 is secured to the common shaft for damping the RMC pointer in realistic manner, particularly when the transmitter calls for a sudden change in direction bearing.

The turning and acceleration errors above referred to are introduced by means of a disturbing coil 429 that is energized according to the magnitude and sense of the output voltage of the compass error amplifier 439 which is jointly supplied with the turning and acceleration potentials from cards 2 and 3. The disturbing coil arrangement for introducing compass error together with means for simulating turning error on north-south courses and acceleration error on east-west courses are described and claimed in my Patent No. 2,506,998, granted May 9, 1950, for "Flight Navigation Training Apparatus."

An alternative arrangement for operating the RMC 59 is shown by Fig. 17 wherein an additional servo system is used for the purpose of providing greater operating torque for positioning the compass pointer. In this arrangement the azimuth servo system is essentially the same as the one above described except that a different form of synchronous transmitter is used. The servo shaft 406 operates the movable coil 435, Fig. 17, of the transmitter 441 and also the gyro-compass 27. In the present case, the coil 435 is energized through slip-rings 435' and a reversing switch, Fig. 18, of the pitch servo from a suitable source of voltage ±E so that the instantaneous potential on the coil 435 can be reversed in the case of pitching between 90° and 270°. In other words reversal of the compass reading is simulated as in the case of executing a loop when the nose of the plane passes the zenith and the plane is headed in the opposite direction and again reversing upon passing the nadir. The Y-connected stationary winding 436 of the transmitter is connected to a corresponding winding 437 of the receiver 442, the movable coil 438 of which is connected to the RMC servo shaft 439 for operating the servo system by a known null control method. The coil 438 is connected through slip-rings 438' as illustrated to the input side of the RMC amplifier which is provided with inputs from the north turning and acceleration error cards 2 and 3, and from the RMC generator feed-back circuit. The voltage induced in the coil 438 is of such sense that it tends to cause rotation of the properly polarized servo motor M in a direction to reduce the voltage in coil 438. Accordingly when the angular position of coil 438 corresponds with that of the transmitter coil 435, the induced voltage in coil 438 is zero and the RMC servo is deenergized, except of course for the variations introduced by turning error. Accordingly it will be apparent that since the gear reduction device 440 may be designed for any convenient ratio and since any desired effect of velocity feed-back voltage may be introduced, the RMC indicating element may follow the positioning of the transmitter coil 435 with appropriate lag.

*Pitch servo and vertical air speed indication*

The pitch ($\theta$) servo system, together with the azimuth signal amplifier and amplifiers for the vertical air speed meter are shown in Fig. 18. Basically, the system functions to integrate rate of pitch $W_y$ and to control the pitch element of the attitude gyro. The pitch servo unit is generally similar in structure to the azimuth unit, Fig. 28, previously described since rotation of the potentiometer shaft exceeds 360° necessitating the use of slip-rings. A synchronous transmitter 459 is controlled by the servo in the manner of transmitter 414 of Fig. 28; also a cam operated switch 445 is controlled from the servo shaft in the manner of switch 316 of Fig. 27.

The $\theta$ servomotor control amplifier inputs include a voltage at terminal 217 representing a pitching moment for causing "nosing-down," this voltage being introduced by the air speed switch 317, Fig. 11, when $v$ is approximately 40 M. P. H. or less and its instant polarity determined by the $\theta$ cam switch 445, a roll-modified yaw rate voltage $W_z \sin \phi$ at terminal 250 representing a vertical pitching component due to yaw around the $z$ axis, and a roll-modified rate of pitch voltage $W_y \cos \phi$ at terminal 251 also representing the vertical pitching component due to pitch around the $y$ axis. The resultant of the summed inputs above identified represents the time derivative value of $\theta$ and causes operation of the pitch servo including the four potentiometer cards of the pitch system. With a negative feed-back voltage $E_{fb}$ applied to the servomotor amplifier in proportion to the velocity of the servomotor, the latter moves the four potentiometer card slider brushes according to the integrated value of said summed inputs.

The function of the four potentiometers is as follows: Card No. 1 is contoured for sin-cos derivation and is energized according to the air speed signal and modified according to $\theta$ for ($a$) deriving a voltage at contact 446 corresponding to $v \sin \theta$ for the summing amplifier of the vertical air speed indicating circuit, and ($b$) deriving voltages $-v \cos \theta$ and $+v \cos \theta$ at contacts 447 and 448 respectively. These ($b$) voltages are further modified by the azimuth servo system, Fig. 16, for use if desired in Cartesian coordinate integrators of a course charting system of the type disclosed in my aforesaid Patent No. 2,529,468. It will be noted that $\theta$ card No. 1 is energized by potentials representing $+v$ and $-v$ at points 180° apart, each voltage terminal being 90° from the mid-position of zero pitch, and is also grounded at points 90° from the voltage terminals to represent level flight for both normal and inverted positions. Characteristic modifying resistances 449 and 450 may be connected in the potentiometer circuit as shown. Card No. 2 is contoured for secant derivation and is energized according to the $\dot{\psi}$ signal and the derived value $\dot{\psi} \sec \theta$ at contact 219 input to the integrating azimuth servo, Fig. 16, as previously described in connection with that servo. It will be noted the $a+\dot{\psi}$ signal and $a-\dot{\psi}$ signal are separately applied to adjacent quadrants respectively of each insulated half of the potentiometer for correcting the azimuth reading when $\theta$ proceeds through 90° and 270°. This condition occurs when an aircraft is in level flight on a north course and then executes a loop so that the azimuth bearing reverses to south and during recovery in the maneuver again returns to north. Cosinusoidal card No. 3 is energized by voltages $-$E and $+$E, one derived voltage $-E \sin \theta$ at contact 451 being an input to the air speed amplifier and corresponding to gravitational force acting in the manner of thrust to accelerate the airplane; and another pair of potentials derived at the 180° spaced contacts 452 and 453 serving to (1) energize card 6 of the $\phi$ servo system and, (2) as inputs to the $\alpha$ amplifier representing gravitational components $+E \sin \theta$ and $-E \sin \theta$ affecting lift, subject to the $\phi$ selector switch, Fig. 19.

With the $\theta$ servo positioned at zero pitch as illustrated, the air speed input from slider 451 representing the gravity component perpendicular to the plane of the Y—Z, Fig. 8, axes is zero and the potential at slider contact 452 or 453 selected by the roll servo switch 489, Fig. 19, and modified in turn by the roll servo to represent the gravity component perpendicular to the X—Y plane is a maximum. Linear card No. 4 is used for deriving a pitch voltage for stabilizing the $W_y$ servo and representing the longitudinal damping of the aircraft and in part determining the "fugoid" characteristics of the trainer, i. e. the damped wave of vertical oscillation.

The $\theta$ servo also controls through a mechanical connection 457 the angular position of the rotor coil 458 of a synchronous transmitter 459 that is electrically connected to a repeater unit 460, Fig. 19, for controlling the pitch element 493 of the attitude gyro, Figs. 19 and 20.

The pitch controlled switch cam 445 is arranged to operate a plurality of switch contacts according to conditions of normal and inverted flight, the position shown illustrating normal level flight. This switch in combination with the $\phi$ switch 485 maintains a correct and proper relationship of the trigonometric signs with separate or combined reversals of pitch and roll attitudes as occur in loops, split-S, Immelmann and similar maneuvers. The cam follower 461 operates simultaneously the switches 462 and 463, and the opposite cam follower 464 operates simultaneously the switches 465 and 466, the arrangement being such that the switches 463 and 465 together constitute a reversing switch for reversing the potential at the terminals 263 and 264 of the magnetic compass transmitter coil 435, Fig. 17. The selector switch 462 supplies either $+$E or $-$E potential to the air speed selector switch 316, Fig. 11, to be used as an input to the $\theta$ servo, this voltage representing as above explained a pitching moment for simulated air speeds of approximately 40 M. P. H. or less; also the selector switch 466 selects an $\alpha$ potential modified according to roll for in turn modifying the output of the summing amplifier 467 of the vertical air speed circuit for a glide correction according to angle of attack. To this end, the switch 466 is connected by conductor 444 to a 180° phase shifter as indicated, the output of which is fed to the input of summing amplifier 467.

In addition to the $\alpha$ glide correction potential, there are two other inputs to the vertical air speed summing amplifier 467 representing respectively $\pm v \sin \theta$, which is the vertical component of air speed, and a roll-modified side-slip potential $B \sin \phi$, Fig. 19, the latter being a glide correction voltage for B. The vertical air speed meter 54 may conveniently be a voltmeter energized by the output of the series connected amplifiers 467 and 469. The output of amplifier 467 is also normally used as an input to the altitude servo, Fig. 26, for integrating the vertical air speed for altitude indication.

Finally, a switch 468 controlled by the cam 445 is normally arranged to ground the output circuit of the vertical air speed summing amplifier 467, Fig. 18, contingent on a negative pitch angle and a predetermined position representing sea level or zero altitude of the altitude servo cam 533, Fig. 26. Thus, since the input to the vertical speed amplifier 469 in such a case is zero there can be no further downward operation of the altimeter nor will there then be any negative indication on the vertical air speed meter 54 to represent further loss of altitude.

*Roll servo, aileron control and attitude gyro*

Referring to Fig. 19, there is illustrated the roll ($\phi$) servo system including the pilot controlled aileron potentiometer and air speed $v$ signal amplifier. The roll system is primarily influenced by rolling moment from the aileron control and engine torque, and also by side-slip and rate of yaw. The roll servo unit is structurally similar to the azimuth unit, Fig. 28, in that the servo shaft is adapted for continuous rotation in either direction and therefore is provided with electrical slip-ring connections.

The inputs to the roll servo amplifier comprise a negative velocity feed-back voltage $E_{fb}$ for making the rate of roll proportional to the rolling moment, a pair of voltages representing the aerodynamic coupling between roll and yaw, one of said voltages being proportional to rate of yaw $\pm W_z$ and the other (at terminal 241) proportional to B, a voltage from card No. 2 representing the roll stabilizing moment of the airplane, a voltage derived from the slider contact 470 of the aileron potentiometer 471 representing main rolling moment incident to operation of the aileron control, and finally an engine torque voltage at terminal 215, Figs. 11 and 35.

The aileron potentiometer 471 is energized from the $v$ signal amplifier so that the aileron moment voltage derived at contact 470 is a function of air speed $v$, and this relationship is explained by the fact that although the lift on the aileron is proportional to $v^2$, the helix angle of the aircraft incident to the roll is generated according to $$\frac{1}{v}$$

That is, the helix angle which may be expressed as the ratio of the wing tip tangential velocity during a roll to the forward air speed $v$ is proportional to $$\frac{1}{v}$$

the rate of roll attained by the plane for a given roll moment being determined by a damping factor. Therefore it may be readily shown that the roll velocity for a given aileron deflection is according to $v$ instead of $v^2$. Accordingly, by energizing the aileron potentiometer according to $v$, the damping factor is automatically included in the computed roll velocity, thereby simplifying the computing operation. By varying the position of the ground contact 472 of the shunt-connected trim potentiometer 473 the aileron input may be further modified in simulation of the "trim" desired.

The $v$ signal voltage energizing the aileron and trim potentiometers is obtained from the $v$ signal amplifier, Fig. 19. This amplifier is in turn supplied with a $v$ signal, Fig. 11, which is amplified for energizing the primary winding 474 of transformer 475 having two secondary windings. One secondary winding 476 having a grounded center tap is connected to potentiometers in other servo systems, and the other (non-tapped) secondary winding 477 energizes the aileron and trim potentiometers.

Operation of the aileron potentiometer from the trainer control column 6, Fig. 2, is illustrated by Figs. 21 and 22. The wheel 6' carried by the control column for aileron control is provided with a shaft 500 supported by ball bearings 501 and having an extension 502 to which the operating shaft 503 of the aileron slider contact 470 is suitably secured and insulated therefrom. The shaft 500 is also connected through a sprocket wheel and chain arrangement 500' to a spring loading system explained later. The aileron potentiometer comprises a cylindrical insulating support 504 suitably secured to a base plate 505 encircling the shaft extension 502. The potentiometer card or resistance element 471 is mounted on the supporting member 504 for engagement with the slider contact 470 in the manner previously described so that a variable voltage can be derived at the contact 470 in accordance with the operation of the aileron control wheel 6'. Suitable electrical conductors 506 and 507 interconnect the potentiometer terminals and slider contact, Fig. 22, with the control circuits of Fig. 19. The aileron potentiometer assembly is housed by a cover member 508 secured as at 509 to the control column.

Returning to Fig. 19, the potentiometers of the roll system function as follows: Card No. 1 which is contoured for deriving sin-cos functions and has two sliders spaced 90° apart is energized at 180° spaced terminals according to rate of yaw, and the voltages derived at the 90° spaced sliders are used as inputs to the $\psi$ signal and $\theta$ servo amplifiers. One derived voltage $+W_z \cos \phi$ from contact 478 is a $\psi$ signal amplifier (Fig. 18) input and the other from contact 479 is an input $-W_z \sin \phi$ to the $\theta$ servo, Fig. 18. The card is grounded at points 90° from the voltage terminals to represent zero roll for both level and inverted flying. Card No. 2 having a linear characteristic is energized by a voltage E and functions as a stabilizing potentiometer to provide a voltage corresponding to the characteristic damping and roll stabilization of an aircraft. Card No. 3 of generally sin-cos contour is energized generally in the manner of card No. 1 by the B signal voltage and the derived potential $B \sin \phi$ is an input to the summing amplifier 467 of the vertical air speed circuit to introduce the vertical component of side-slip velocity into the vertical speed indicating system. Card No. 4 of generally sin-cos contour has two sliders and is similarly energized according to $\alpha$, the derived voltage at one contact 480 being used in the vertical air speed circuit subject to polarity reversal according to the position of the contact 466 of the $\theta$ selector switch 445, Fig. 18, and the voltage at the other 180° spaced contact 481 being used, also subject to polarity reversal at contact 466 of the $\theta$ selector switch, in both the vertical air speed circuit and in the flaps circuit, Fig. 15, for glide correction. Card No. 5 of sin-cos contour has three sliders and is similarly energized according to the rate of pitch. The derived voltage $W_y \cos \phi$ at contact 482 is an input to the $\theta$ servo amplifier, and the voltage $+W_y \sin \theta$ at 90° spaced contact 483 is both an input to the azimuth signal amplifier and an input to the $W_z$ servo amplifier subject to the $\phi$ selector switch 484 which is controlled by a cam 485 mechanically actuated from the $\phi$ servo shaft as indicated. A third derived voltage $-W_y \sin \phi$ at contact 486 spaced 180° from contact 483 of card No. 5 is also used as an input to the $W_z$ servo subject to the alternate position of the selector switch 484, i. e. when the roll angle exceeds 90° indicating inverted flight and is in the region between 90° and 270°. Card No. 6 of generally sin-cos contour has two sliders spaced 270° apart and is energized according to $\theta$, Fig. 18. The derived voltage $+E \cos \theta \sin \phi$ at contact 487 is a gravity component input to the B signal amplifier, Fig. 16, and the derived voltage $+E \cos \theta \cos \phi$ at contact 488 is a gravity loading factor input to the $\alpha$ amplifier.

The cam 485 above referred to also controls a switch 489 that determines the positive or negative sense of the gravity potential $E \cos \theta$ used as an input to the $\alpha$ servo. This switching is necessary to correct the direction of gravitational force with angle-of-roll which reverses at 90° and 270° roll positions.

It will be noted that the position of the roll servo shaft corresponds to the roll attitude of the aircraft. Accordingly the roll element of the attitude gyro 30 can be mechanically operated as indicated at 490. The pitch element of the attitude gyro as previously indicated in connection with Fig. 18 is actuated through a mechanical connection 491 with the rotor winding 492 of the $\theta$ synchronous repeater 460.

One form of simulated attitude gyro that may be operated in this manner is illustrated by Fig. 20. The indicating element comprises a hollow ball-like member 493 having the usual earth, sky and horizon indicia on its outer surface as shown. The ball is provided with an opening at one end and it is secured at its opposite end to a shaft 491 of the synchronous repeater 460 so as to rotate with the said shaft to represent pitch attitude. The ball and repeater assembly is in turn rotatable as a unit by the roll servo as indicated to represent roll attitude. Simulated attitude gyro apparatus of this character is disclosed and claimed in my Patent No. 2,458,982, granted January 11, 1949, for "Aircraft Training Instrument."

*Rate of yaw servo, rudder control and turn and bank indicator*

Fig. 23 illustrates the pilot controlled rudder and trim potentiometers and the rate of yaw ($W_z$) servo system which operates the rate of turn indicating element through a synchronous transmitting system. The rate of yaw system is primarily influenced by the rudder turning moment and engine torque, other modifying factors including damping due to side-slip, rough air, etc. The structural arrangement of the servo unit is generally similar to that of the altitude servo unit, Fig. 29, in that a synchronous transmitter is used and the rotation of the servo shaft is within a range of less than 360°.

The $W_z$ inputs comprise the following: A negative velocity feed-back voltage $E_{fb}$ for causing the speed of the servo motor to have a linear response to the amplifier output or control voltage; a yaw stabilizing voltage from card No. 1; an engine torque voltage at terminal 216, Figs. 11 and 35; a rough air voltage at terminal 237, Fig. 15; a voltage $v^2B$ serving as an opposing or damping force to the rudder moment at terminal 242, Fig. 16; a voltage $W_y \sin \phi$ at terminal 267, Fig. 19, representing the elevator effect on yaw, i. e. the effect of rate of pitch during banking on the turning rate of the aircraft; and a main rudder moment voltage from the slider contact 510 of the rudder potentiometer 511. It is sufficient in the present instance that the terminals of the rudder potentiometer are energized by a voltage $\pm E$ since more realistic control is thereby obtained at low air speeds where use of the rudder is important. A rudder trim potentiometer 512 is connected in shunt therewith, the trim slider contact 513 being grounded and adjustable to represent trimming of the rudder control.

The pilot control for the rudder potentiometer is illustrated by Figs. 2, 24 and 25. A rudder pedal 5 is pivotally mounted at 522 on a supporting bracket 523 secured to the frame 5' and is provided with a laterally extending arm 524 that is arranged to carry the slider contact 510, Fig. 24. The contact is secured to an insulating block 525 mounted on the arm 524 so that it is insulated from the arm. The rudder potentiometer is mounted on an extension 526 of the fixed bracket support and comprises an arcuate supporting member 527 along the curved outer edge of which the potentiometer card 511 is positioned and secured for engagement in the usual manner by the slider 510. The arc of the card 511 is substantially concentric with the pivot 522 so that the derived potentials at slider 510 correspond to the degree of angular movement of the rudder and the card may be contoured to produce any desired function of rudder moment with rudder displacement.

Referring again to Fig. 23, the $W_z$ cards which have linear characteristics function as follows: Card No. 1 which is energized by a suitable voltage $\pm KE$ at terminals equally spaced from the grounded mid-tap is the answer potentiometer for balancing the servo when the answer voltage is balanced by the sum of the other inputs so as to correspond to lateral stability moment and yaw damping moment. Card No. 2 is similarly energized in opposite sense to that of card No. 1 and the derived voltages from both cards 1 and 2 energize card No. 1 of the roll servo with voltages respectively representing $+W_z$ and $-W_y$, namely rate of yaw. The resolved rate of yaw for horizontal position, namely $W_z \cos \phi$ is the rate of turning of the aircraft in the horizontal plane of the ground, i. e. with respect to axis $Z_0$, Fig. 8. The derived voltage from card No. 2 is also an input to the roll amplifier and represents the well-known aerodynamic coupling term between yaw and roll. Card No. 3 is similarly energized according to the $v$ signal and the derived voltage $vW_z$ is the acceleration due to centrifugal force and is an input to the B signal amplifier and also to the north turning error circuit, Fig. 16.

The $W_z$ servo shaft operates through a mechanical connection 514 the rotary winding 515 of the synchronous transmitter 516, the corresponding rotary coil 517 of the synchronous repeater 518 being mechanically connected at 519 to the rate of turn pointer 520 of the turn and bank indicator 33. As previously described the ball 521 is operated from the B servo, Fig. 16.

The characteristic damping of the horizontal oscillation of an aircraft or the so-called "snaking" effect is simulated in novel manner by the proper selection of the gear ratios in the $W_z$ and B servos, in the inertia of the moving parts, particularly the motors, and in large measure by the relative magnitudes of the B amplifier resistor $r$, Fig. 16, and the input resistors to the $W_z$ amplifier, Fig. 23, indicated at $W_z$, $v^2B$ and $r$ respectively, the latter resistor $r$ being a shunting resistance to ground of the other inputs at their amplifier junction and having a major effect on the "snaking" tendency.

*Altitude servo and altimeter*

Fig. 26 illustrates the altitude servo, synchronous transmitter for operating the altimeter, and an altimeter resetting circuit which enables the instructor to energize the servo so as automatically to bring the altimeter reading to zero or any other predetermined value such as where a preceding "flight" has been discontinued without landing. The altitude servo system is essentially an integrator for vertical air speed.

The structural arrangement of the servo unit is illustrated by Figs. 29 to 31 and since basically the design is similar to that of the air speed unit, Fig. 27, with corresponding parts designated by the same reference numbers, a brief description will suffice. The motor M in this case operates both the synchronous transmitter 530 which is suitably mounted on an offset plate 530' secured to the end section 72, and the coupled potentiometer shafts 80 and 79 through a gear train generally indicated at 531, the gear reduction ratios being such that the potentiometer shafts and the rotor of the transmitter have the same proportional angular movement, the latter making one revolution per 1000 feet altitude. Backlash error between the motor and transmitter is minimized by using a gear take-off from the main reduction gearing 531, certain details of which are omitted for clearness. Since the servo shafts rotate within a range of less than 360° the slider contacts 77 can be electrically connected by pigtail connections as indicated at 532 with the external circuits as can also the stationary potentiometer cards, through the terminal blocks 85. A cam 533 is connected to the shaft 79 for operating the switch 534 of the resetting control. Also connected to the shaft are a knob 535 for assembly adjustment and a pointer 536 for indicating the shaft position in degree on a transparent dial 537.

Referring again to Fig. 26, the altitude servo inputs comprise normally a negative velocity feed-back voltage $E_{fb}$ of such relative magnitude to any control voltage as to cause the motor to operate at a speed precisely horizontal linearly to such control voltage; and a voltage representing the vertical component of air speed derived from the pitch system, Fig. 18. For running the servo to the reset or zero position an A. C. voltage input at 552 is subject to the "altitude reset" control. The feedback winding of the generator is in this case connected to an auxiliary transformer circuit 540 of the character previously described for bucking residual field and zero rate setting.

The functions of the altitude potentiometers are as follows: Card No. 1 is designed for deriving a voltage for optional use in a glide path system of the character shown in my Patent 2,366,603; card Nos. 2 and 5 may be used for modifying an azimuth resolved air speed voltage for computing true air speed for optional use in and X—Y position coordinate integrating system of the character shown in my aforesaid Patent No. 2,529,468; card No. 3 is contoured so as to modify the thrust voltage according to altitude; card No. 4 derives a voltage for varying the outside air temperature indication with altitude, Fig. 36; and card No. 6 derives a voltage for varying the manifold pressure reading with altitude, Fig. 35.

The altimeter 53 is operated from the rotary winding 541 of the synchronous repeater 542 in accordance with the angular position of the servo driven rotary winding 543 of the transmitter 530. The repeater operates the altimeter through a mechanical connection 544 and a plurality of gear reducers 545, 546 and 547 for driving respectively the various pointers of the altimeter, i. e. for separate indication in units, hundreds and thousands, as in practice.

The "altitude reset" is controlled by an instructor's switch 548 that is normally in the "flight" position for grounding the resetting input circuit to the altitude amplifier. For resetting, the switch is moved to "down" and the servo energizing circuit from voltage source $E_{ac}$ is then completed through the limit switch 549 and contact 549'. When zero or other ground altitude is reached the cam projection 550 opens switch 549 as shown, thereby grounding the amplifier input. At the same time a switch 551 is closed grounding the vertical air speed circuit, Fig. 18, through the pitch operated switch contact 468, Fig. 18, which closes to ground in horizontal and negative pitch attitudes so that the altitude servo is then completely de-energized and the vertical air speed meter also registers zero.

The operative position of switch 534, Figs. 26 and 29, may be adjusted at any desired altitude value by simply angularly rotating it about the altitude servo shaft.

*Control loading*

The control loading feature previously referred to involves a motor that is energized according to change in air speed and arranged to rotate a cable drum or winch connected to springs for varying in a realistic manner the loading, i. e., resistance to movement, of the aileron, elevator and rudder controls. A preferred specific mechanical arrangement of the winch, cables and springs for the controls is disclosed in the aforesaid Heller Patent No. 2,510,174 and is not claimed in the present application, a simplified diagram thereof as applied to the rudder control being sufficient for present purposes.

The electrical circuit is shown in Fig. 37 for controlling the loading motor 555. A voltage varying with air speed is taken from card No. 5 of the air speed servo, Fig. 11, at the slider contact 77 and it will be noted that for a range of low air speeds the "loading" is a minimum as in practice. Controlled by the motor is an "answer" potentiometer 556 which produces a voltage at contact 557 proportional to cable drum rotation or control loading. This potentiometer is energized by an A. C. voltage −E while the air speed card is energized by an A. C. voltage +E of equal magnitude, so that the two derived signals applied to the control grid 558 of the twin-triode tube 559 oppose each other, the resultant grid signal being equal to the difference between them. The difference signal is amplified in the twin-triode at the "A" side thereof which includes cathode 560 and anode 561, and the amplified signal is then fed by circuit 562 to the grid 563 of a thyratron tube 564 and also to the grid 565 of the "B" side of the twin tube which includes cathode 566 and anode 567. The "B" side amplified signal is fed by circuit 568 to the grid 569 of the other thyratron 570, this latter signal being equal and opposite in phase to the signal on the first thyratron 564; i. e., since the potential at anode 561 decreases as the plate current increases there will be a 180° phase displacement of the signals at grids 558 and 565 of the twin-triode. A potentiometer 571 is provided at the "B" grid 565 interconnecting the "A" anode 561 and the "B" cathode 566 to adjust these two signal voltages so that they will be equal.

Each thyratron grid has a negative bias from the circuit 572 according to common practice to prevent it from operating when no signal is applied and each plate 573 and 574 is connected in series with a respective relay coil 575 and 576 across an A. C. supply line. It will be noted that when the signal applied to the grid of one thyratron is in phase with the anode voltage and is of sufficient magnitude to decrease the bias so that the tube "fires," the signal applied to the grid of the other thyratron is reversed in phase and therefore swings the grid of that tube still more negative and prevents the tube from conducting.

The relays 577 and 578 function to energize and de-energize the motor and also to reverse the connections to one winding 579 through switches 580 and 581 so as to reverse the direction of motor rotation. The winding 582 is energized through switches 583 and 584 whenever either relay operates and the instant polarity of the voltage applied to the reversing winding 579 depends on which relay operates. A two-phase motor as illustrated is used for the loading drum and since both motor windings are supplied from the same A. C. line a condenser is used in series with one winding and a similar condenser is used in parallel with the other winding to produce a substantially 90° phase difference. Operation of the motor in one direction for example rotates the winch 585 to move the spring slider 586 toward the rudder pedal pivot 587 to decrease the lever arm through which the spring 588 can act on the rudder pedal, and hence the rudder loading, and in the opposite direction causes the slider to move away from the pivot and increase the lever arm and the rudder loading. As the winch varies the position of the slider pulley the spring tension is not materially changed due to the compensating connection 589. During the winch operation the slider contact of the "answer" potentiometer is also adjusted toward a new balance position.

To review the operation; when the air speed increases for example, the voltage derived from the air speed card increases accordingly so that it is in excess of the "answer" voltage and the resultant instant signal at the grid 558 swings positive and that at the grid 565 swings negative. Assuming that the instant polarity at the thyratron anodes 573 and 574 is positive the positive signal at the grid 569 of thyratron 570 starts the tube conducting. This energizes the relay coil 576 which in turn applies through contacts 584 and 581 the line voltage to the motor 555 causing rotation of the winch shaft in a clockwise direction to increase the spring lever arm for simulating increased air speed resistance. This operation also moves the brush 557 on the "answer" potentiometer through a mechanical connection 590 in a direction of increasing voltage until the voltage from this potentiometer equals the voltage from the air speed card. The resultant signal at grid 558 is now zero so that thyratron 570 stops conducting, and the relay 578 is de-energized to stop the motor. This whole process has moved the slider pulley of the loading spring farther away from the rudder pedal pivot thereby increasing the rudder load to correspond to the new air speed.

When the air speed decreases, the voltage from the air speed card also decreases allowing the voltage from the "answer" potentiometer 556 to take over and start the operation in reverse. In this case the other thyratron 564 is "fired," since the instantaneous polarities at the respective thyratron grids are now reversed with respect to the anode or reference polarity $E_{ac}$, and relay coil 575 is energized to apply through contacts 583 and 580 the line voltage to the motor to operate it in the opposite direction. Since it requires a certain definite grid voltage to "fire" a thyratron there will be a sufficient null in the system to prevent the motor from hunting while enabling the motor to adjust the loading for minute changes in air speed. An electrical braking mechanism energized by auxiliary contacts of relays 577 and 578 may be used to stop the motor quickly and still further reduce hunting and the null interval in the system.

It is a feature of this device that any desired loading function with respect to air speed may be derived by contouring either the air speed or answer card, or both, or by moving slider 577 non-linearly with drum rotation.

*Engine control, tachometer and manifold pressure indication, and engine noise*

Fig. 35 illustrated schematically the functioning of the engine control potentiometers designated "throttle," "mixture," and "propeller R. P. M.," respectively. Each potentiometer group is pilot-operated, the arrangement shown representing a constant speed, variable pitch propeller system wherein the pilot selects by governor control an appropriate propeller R. P. M. and then simply operates the throttle to provide for variations in power requirements. The mixture setting affects efficiency and economy of operation as well as to stop the engine in "idle cut-off" position by simulation of fuel cut-off. The tachometer indication is normally determined by the governor or propeller R. P. M. setting within the range of propeller pitch variation. Beyond this range it is determined by other factors including air speed and horsepower. For example the tachometer reading is higher than the governor setting when the throttle setting calls for power in excess of full pitch, and also during a dive when the air speed is in excess of that corresponding to full pitch causing "wind-milling." Also the tachometer reading drops off when horsepower and air speed together drop below the limit of minimum pitch. Manifold pressure indication is determined primarily by the throttle and propeller R. P. M. settings and is further modified by flight conditions such as altitude and carburetor ice. Engine noise is simulated by a sound amplifying system controlled in accordance with the throttle and propeller R. P. M. settings.

The tachometer indicating system now will be described. The system is controlled through the "ignition relay" that is initially energized from an A. C. source $E_{ac}$ by closing the ignition switch 600, assuming that the idle cut-off switch 601 and the carburetor ice limit switch 602 in the circuit of the relay coil 603 are in normally closed positions respectively. The idle cut-off switch is controlled by the setting of the "mixture" potentiometers as diagrammatically illustrated so that when the mixture control is moved to "idle cut-off" in the extreme "lean" position the idle cut-off switch 601 is opened and the ignition circuit de-energized. Closing of the ignition circuit energizes the ignition relay coil 603 that gang-operates through a mechanical connection 604 the switches 605, 606, and 607 of the ignition relay. The fixed contact terminal of switch 605 is energized by a suitable voltage $+E_{dc}$, and the movable contact terminal of switch 606 is energized by a voltage $+E_{ac}$. Closing of the relay switch 606 energized the mixture potentiometer 608 and the throttle potentiometer 609 through the carburetor ice potentiometer 610. Accordingly the derived voltage at the throttle slider contact 611 may represent horsepower, the throttle energizing voltage having been modified by the mixture setting and by the presence, if any, of carburetor ice.

The derived A. C. throttle voltage from conductor 611′ is an input at resistance 612 to the cathode 613 of a diode rectifier tube 614 jointly with an air speed signal input at resistance 616 through transformer circuit 615. The rectified output is negative D. C. The diode plate 617 which is grounded through the R-C circuit as shown, is connected to the control grid 618 of a triode 619, the plate 620 of which is connected through resistances 621 and 622 to one terminal of a voltmeter 51 simulating a tachometer. Potential is supplied to the triode plate by conductor 623 from the slider 624 of the propeller R. P. M. potentiometer 625 and this potentiometer is energized directly from the source $+E_{dc}$ through the ignition relay switch 605.

Normally the tachometer reading is determined by the derived voltage at slider 624. That is, during normal operation within the range of propeller pitch variation as determined by air speed and horsepower (throttle) the plate potential is determined by the derived R. P. M. voltage at slider 624 rather than by operation of the triode which is normally biased to cut-off. When the air speed exceeds a predetermined value whether or not resulting from throttle setting as in a dive, a modifying factor may be introduced in the voltmeter circuit at its live terminal for simulating tachometer over-speed. For this purpose the air speed servo is provided with an additional card No. 9 (not shown in Fig. 11) that is energized by a D. C. voltage $+E_{dc}$. The opposite terminal is grounded and the card is short-circuited except for an upper predetermined range of comparatively high air speed within which the tachometer reading is no longer controlled by the R. P. M. setting. In case of over-speed the derived positive voltage at slider 626 of card No. 9 is fed to the live terminal of the tachometer by conductor 627 producing a higher reading of the tachometer.

Also it will be noted that a joint decrease in the horsepower and air speed inputs to the rectifier 614 decreases the negative D. C. output voltage at the diode plate and therefore lessens the bias on the control grid 618 of the triode tending to start the tube conducting. When this occurs the resulting increase in the plate current causes decrease of the plate potential at point 628, thus causing a lower tachometer reading simulating the throttled down condition wherein H. P. is not sufficient to maintain cruising R. P. M. at minimum pitch of the propeller. If now the throttle is opened the air speed increases and tube 619 is biased to cut-off. The plate potential at junction 628 accordingly increases to the normal value to increase the tachometer reading to normal R. P. M.

The manifold pressure indicator circuits, Figs. 35 and 35*a*, are energized from the fixed terminal 630 and slider 645 of the throttle potentiometer 631. The D. C. potential from terminal 630 is led by conductor 632 Fig. 35 to the common junction 633 that is connected respectively to the low voltage terminal 634 of a voltmeter 50 simulating the manifold pressure meter, to the carburetor ice potentiometer 635 and to the altitude servo card No. 6 through terminal 277. The sliders of the carburetor ice potentiometers are jointly operated as indicated through a gear reducer 629 by a motor M, the control of which is shown in Fig. 36.

The high voltage terminal 636 of the voltmeter is connected jointly to three variable inputs representing respectively carburetor ice, altitude, and horsepower. The principal input is horsepower from slider 645, the other inputs actually being negative and subtracting from the horsepower potential. The carburetor ice input at resistance 637 is derived from the slider 638 of the potentiometer 635 which is energized at one terminal from the D. C. terminal 630 (junction 633) and is grounded at its other terminal to represent a maximum icing condition. It will be readily seen referring to the segregated circuit diagram, Fig. 35*a*, that the potential derived from slider 638 is of lower value than that at terminal 630. Therefore the voltage at "+" terminal 636 is either lowered or is unaffected by icing and non-icing conditions respectively and the meter indicates lower pressure when icing exists.

The altitude input at resistance 639 is derived from the slider 640 through terminal 278 of the altitude card No. 6, Fig. 26. This card is energized at its lower terminal from the D. C. source, junction 633, to represent sea level air conditions, and is grounded at its upper terminal to represent ceiling conditions so that the potential difference at the meter terminals is unaffected at sea level and is decreased at higher altitudes at the rate of approximately 0.9 inch per 1000 feet because of the negative voltage at slider 640. Thus the pressure reading at meter 50 becomes lower as altitude increases. In simulation of actual conditions, the manifold pressure meter 50 is calibrated so that it reads 30 inches, i. e. atmospheric pressure, when de-energized and is deflected from this reading according to variation of the R. P. M. and throttle potentiometer settings, air speed, etc.

The horsepower input at resistance 641 is derived from the slider 642 of R. P. M. potentiometer 643 through the conductor 644 and ignition relay switch 607 since the R. P. M. potentiometer 643 is in turn energized by the derived voltage from slider 645 of the throttle potentiometer 631. This input voltage representing power is of course always positive. The derived voltage from R. P. M. potentiometer 643 it will be noted represents the product of H. P. and the reciprocal of R. P. M. For a constant R. P. M. therefore, opening of the throttle for example increases the manifold input voltage at resistance 641 tending to increase the manifold pressure reading; i. e. by increasing the potential difference between terminals 634 and 636. Conversely an increase in the amount of carburetor ice as the slider 638 moves further in the negative direction produces an increased negative input at resistance 637 also tending to reduce the meter terminal voltage and hence the manifold pressure indication. In the same manner an increase in the altitude negative input at resistance 639 by reason of high altitude causes a decrease of meter terminal voltage and hence a decrease in the manifold pressure reading.

Accordingly it is seen that the variation in potential between the voltmeter terminals causes realistic variations in manifold pressure indication with individual or joint changes in altitude, carburetor ice and horsepower including the effect of changes in propeller pitch setting.

The engine control circuit for energizing the air speed thrust card No. 8, Fig. 11, is energized from an A. C. source $+E_{ac}$ through the ignition relay switch 606. This circuit includes as previously described the carburetor ice potentiometer 610, conductor 646, mixture potentiometer 608, throttle potentiometer 609 and conductor 611' which is connected to the terminal 276 of the altitude servo card No. 3. The altitude slider 647 is connected to the terminal 276 for shunting part of the card resistance, and the lower terminal 275 is connected by a conductor 648 to both the engine noise circuit hereinafter described and the R. P. M. potentiometer 649. The derived voltage at the slider 650 of this R. P. M. potentiometer represents the engine horsepower as determined by the modifying throttle, mixture, R. P. M. and carburetor ice factors, and this voltage energizes both the mixture potentiometer 652 as hereinafter described and the horsepower output terminal 214 that is connected to air speed card 8, Fig. 11. Therefore, referring now to Fig. 11 the air speed card 8 is energized by a voltage representing horsepower H. P. and since this card is designed for deriving voltages according to the reciprocal of air speed $$\frac{1}{v}$$

the derived voltage from card 8 represents thrust according to the relationship $$\frac{\text{H. P.}}{v}$$

For the purpose of simulating the cylinder head temperature, the mixture potentiometer 652 is energized by the horsepower potential from terminal 651 (slider 650) of the aforesaid R. P. M. potentiometer and the derived voltage at slider 653 is fed to terminal 654, Fig. 36, of the cylinder head temperature circuit so that the heating effect increases as the mixture is made more lean, the propeller pitch is increased, the altitude decreased and the throttle opened. Other factors effecting cylinder head temperature are described hereinafter.

The engine noise circuit is controlled by three inputs from the above described circuits, one being from the resistance junction 655 in the tachometer input circuit for tone control and the others from the air speed signal and H. P. circuits for volume control. Junction 655 is connected by a conductor 656 to an amplifier 657 which energizes a control winding 658 of the tone motor 659. The fixed potential winding 660 of the motor is controlled by the ignition switch and energized from the main source $E_{ac}$. The motor drives a magnetic pulsing device 661 of well-known character that induces in the winding 662 voltage pulses corresponding in frequency to the speed of the motor which, it will be noted is energized according to energization of the tachometer. The induced potential in coil 662 is fed by circuit 663 to a variable gain engine noise amplifier 664 connected to a loud speaker 665. The tone vibrations at the loud speaker 665 therefore correspond to the tachometer reading for both normal and offspeed conditions. Additional realism is introduced by adding joint inputs including a horsepower input from conductor 648 and an air speed input from the transformer circuit 615 (conductor 615'), through amplifier 666 and an input resistance 667 to the tone amplifier 664 so as to vary the tone volume with variation in air speed and horsepower by increasing the gain of amplifier 664 with increase in output signal from amplifier 666 through use of well-known variable gain circuit.

For simulating landing procedure a landing gear switch 668 is arranged to be closed when the throttle is closed for energizing a horn signal circuit (not shown) which may include a series-connected landing gear switch that is closed when the "landing gear" is up and open when it is down.

*Outside air and engine temperatures and carburetor ice control*

Fig. 36 illustrates the control circuit for the indicating meters for outside air temperature, carburetor mixture temperature, oil temperature and cylinder head temperature. Since outside air temperature is a factor in each case, the control for the outside air temperature meter 57 will first be described. The inputs to the voltmeter representing the outside air temperature meter are derived potentiometer voltages representing respectively the arbitrarily selected sea level temperature and the air temperature at the altitude of the simulated flight. The voltage representing sea level temperature is derived at slider 670 of potentiometer 671 that is grounded at its upper terminal and energized at its lower terminal from a D. C. source $+E_{dc}$. The slider is positioned by the instructor as indicated and the derived voltage is an input at resistance 672 to the positive terminal of meter 57. The other joint input at resistance 673 is derived from the altitude card No. 4, Fig. 26, in accordance with altitude servo operation of the slider 674. Card No. 4 is likewise energized at its lower terminal by the aforesaid D. C. source $+E_{dc}$ and is grounded at its upper terminal to represent decrease in temperature with altitude according to the standard inversion rate. It will therefore be noted that the sea level temperature voltage is in effect a reference datum from which the resultant outside air temperature is determined.

The carburetor mixture temperature indicator 63 is controlled jointly by two factors, namely outside air temperature as explained above, and carburetor heat control. The outside air temperature input resistances 675 and 676 are connected to the sliders of the instructors sea level control and altitude card No. 4 respectively, and the other input resistance 677 is connected to the pilot controlled slider 678 of the carburetor heat potentiometer 679 which is energized at its upper terminal by a D. C. voltage $+E_{dc}$ and is grounded at its opposite terminal to represent the "off" position for carburetor heat. Accordingly as the carburetor mixture temperature decreases due to lower voltage at the altitude input resistance 676, the pilot may be introducing a positive D. C. voltage at input resistance 677 to increase the mixture temperature to simulate carburetor heat control. In addition to temperature indication of carburetor mixture, the energizing potential for the meter 63 is also utilized to control the carburetor ice motor, Fig. 35. For this purpose the negative terminal of the meter is connected to a relay comprising a solenoid coil 680 and switch 681 having oppositely disposed contacts 682 and 683. The relay is arranged as illustrated for selective energization of the windings 684 and 685 of the reversible carburetor ice motor from a suitable A. C. source $E_{ac}$. When the mixture temperature decreases so that icing conditions may be present the coil 680 is insufficiently energized to attract the movable contact of the relay 681 against the bias of spring 686. In this position the motor winding 685 is energized through contact 683 tending to move the sliders of the carburetor ice potentiometers, Fig. 35, upward toward increased icing. When more carburetor heat is introduced by the pilot, the solenoid 680 is finally energized sufficiently to close the circuit at contact 682, thereby de-energizing motor coil 685 and energizing coil 684 to reverse the direction of the motor and to start the de-icing operation. It will be apparent that in practice an additional sensitive relay controlled by the mixture temperature voltage may be used for energizing the relay coil 680 and that conventional limit switches may be provided for de-energizing the carburetor ice motor at the limits of slider travel.

The oil temperature indicator 55' is controlled in accordance with an air temperature reference voltage and a voltage representing the cooling effect from the oil cooler shutter. The reference voltage from the instructor's potentiometer 671, Fig. 36, is applied at input resistance 687 to a D. C. amplifier for energizing one terminal of the meter 55' and the cooling voltage is introduced at input resistance 688 to the D. C. amplifier from the pilot controlled slider 689 of the oil cooler shutter potentiometer 690. The potentiometer 690 is energized at its upper terminal by a negative D. C. voltage representing the rectified air speed signal voltage from rectifier 691 for energizing both the potentiometer 690 and a cowl flaps potentiometer 692 presently described. It will therefore be noted that if the oil temperature indication is high the pilot can introduce a negative D. C. voltage opposing that of the positive D. C. voltage from potentiometer 671 to decrease the oil temperature by simulating opening the oil cooler shutter, i. e. raising the slider 689. Also increased air speed has this same cooling effect since it increases the negative D. C. voltage on the potentiometer 690. If the oil temperature is too low, the oil cooler shutter is closed, i. e. slider 689 lowered so that less negative voltage is fed to the D. C. amplifier with the result that the temperature indication increases.

In addition to factors previously described the cylinder head temperature indicator 62, Fig. 36, is controlled by a reference air temperature above referred to and the cowl flaps adjustment. As in the case of the oil temperature indicator, the reference temperature voltage is applied at input resistance 693 to a D. C. amplifier for energizing one terminal of the meter 62. The other joint inputs at resistances 694 and 695 comprise respectively a positive D. C. voltage from terminal 654 of the mixture potentiometer 652, Fig. 35, through rectifier 696, and a negative D. C. voltage from slider 697 of the cowl flaps potentiometer 692. Accordingly in simulation of opening of the cowl flaps to induce more cooling air, the slider 697 is raised and the negative voltage at resistance 695 is increased to lower the cylinder head temperature indication, and as the mixture setting is moved toward the "lean" position the increased positive voltage from the mixture voltage rectifier 696 tends to increase the temperature reading of indicator 62. Also the cooling effect of increased air speed is introduced since the cowl flaps potentiometer 692 is energized according to air speed.

It is sufficient for the purposes of the present invention that the oil and cylinder head temperature indicators are supplied with a voltage representing sea level temperature rather than outside air temperature as it is within the scope of my invention to add further refinements for controlling any or all of the above described temperature indicators, depending on the degree of accuracy required.

Figure 9:
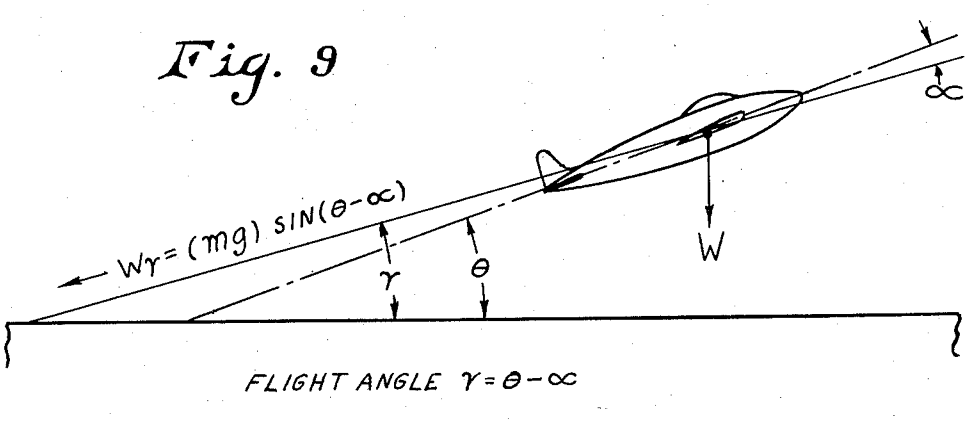
Fig. 9 is a diagram illustrating the relationship of certain important flight angles to each other.

The remaining instruments on the pilot's panel, such as the fuel and suction gages may be controlled in any convenient manner, such as for example connecting the fuel gage to a clock driven mechanism for indicating fuel consumption according to the length of time of trainer operation.

Where it is desired to include the actual flight angle $\gamma$ in the computations, the modification illustrated by Fig. 38 may be used. The flight angle, referring to Fig. 9 is measured from the horizontal and is determined by the path of movement of the aircraft rather than its attitude or pitch angle. Accordingly the flight angle represents the difference between pitch and angle of attack or, $\gamma$ equals $\theta-\alpha$. It will also be noted that the gravity or weight vector acting along the flight path can be expressed as $(mg) \sin (\theta-\alpha)$.

The $\alpha$ and $\theta$ servos may be arranged automatically to compute the flight angle in the manner shown in Fig. 38. The $\alpha$ servomotor through a direct mechanical connection 700 positions the cosinusoidal potentiometer card 701 in accordance with changes in angle of attack. This card is energized at 180° spaced terminals by oppositely phased voltages $+E$ and $-E$. The $\theta$ servomotor independently positions the potentiometer contacts 702, 703, and 703' through a mechanical connection 704, the contacts 703 and 703' being positioned 180° apart and in 90° relation to the contact 702. The voltage derived at contact 702 representing $\sin (\theta-\alpha)$ is connected through a slip-ring connection 705 to the outgoing conductor 706 for input to the air speed amplifier thus taking the place of input $\sin \theta$ at terminal 205, Fig. 11. Likewise the oppositely phased gravity component voltages $+\cos (\theta-\alpha)$ and $-\cos (\theta-\alpha)$ derived at contacts 703' and 703 are connected respectively through slip-rings 707' and 707 to conductors 708' and 708 for energizing the $\phi$ servo potentiometer card 6 which resolves according to roll the aforesaid gravity component voltages. The derived voltage $+E \sin \phi \cos (\theta-\alpha)$ from contact 487 of $\phi$ card 6 is an input to the slide-slip amplifier, Fig. 16, for determining the side-slip gravity vector and represents the component of gravity along the $y$ axis resolved for flight angle $(\theta-\alpha)$. The other component $-E\cos\phi\cos(\theta-\alpha)$ from 90° spaced contact 487' is an input (236) to the angle of attack servo, Fig. 15, for determining gravity loading factor.

*Operation*

The general operation of the system will now be apparent from the above description, taken in connection with the detailed explanation of Figs. 6 and 7 and it will be sufficient to outline briefly several typical control operations.

Starting and takeoff are simulated by setting the mixture and R. P. M. potentiometers, Fig. 35, in conventional positions and closing the ignition switch that controls the power supply and energizes the ignition relay. The throttle is then opened to increase the thrust input to the $v$ servo so that the air speed begins to increase. If it be assumed that the throttle is opened wide under sea level conditions with no carburetor ice, it will be noted that the H. P. voltage for take off derived from potentiometer 649 (terminal 214) is comparatively large since the throttle, altitude and carburetor ice resistances are cut out.

The air speed must reach a predetermined value, i. e. well above the stalling speed, before sufficient lift is developed; otherwise the craft is not "airborne." When the airspeed is sufficiently high for takeoff a small backward movement of the elevator control column 6, Figs. 2 and 14, supplies an elevator moment voltage to the $W_y$ servo, Fig. 12, for increasing the pitch angle $\theta$ and causing the craft to "climb" and show vertical air speed at meter 54 as will be presently pointed out in more detail.

For a condition of cruising speed at level flight, referring to Fig. 35, an increase in throttle setting for example increases the derived voltage from the A. C. potentiometer 609 which is used to energize R. P. M. potentiometer 649 (through conductor 611', altitude card 3 and conductor 648) with the result that the horsepower voltage from R. P. M. potentiometer 649 for energizing the thrust card No. 8 of the air speed servo, Fig. 11, also increases. This voltage may as described be modified by altitude, carburetor mixture and carburetor ice for simulating practical conditions. The derived thrust voltage from air speed card 8 is an input to the $v$ servo for increasing air speed following the relationship of thrust to air speed indicated by the connections and contour of card No. 8, i. e. for a given horsepower thrust is a maximum at a comparatively low air speed and then decreases as the air speed increases to a comparatively high air speed value.

For controlling other servo systems the thrust voltage is amplified and provided in both like and reversed phase by means of the thrust phase inverter 321, Fig. 11. The in-phase voltage therefrom energizes the thrust moment $v$ card No. 6 for controlling the rate of pitch servo according to engine thrust and the reversed phase voltage is used for controlling both the roll and rate of yaw servo to simulate the effect of engine torque on roll and rate of yaw. It will be noted that the reversed phase thrust voltage is used to represent engine torque since for a given propeller R. P. M. engine torque is proportional to thrust.

Increased air speed as the result of increased throttle or other factors increases the control loading, Fig. 37, to simulate increased air resistance on the controls and also increases the drag inputs generally according to $v^2$ depending on the angle of attack, Fig. 15, card No. 3, and the position of the flaps and landing gear, Fig. 15. Additional results of increased air speed include (*a*) increased cooling as indicated by the oil and cylinder head meters, Fig. 36, (*b*) an over-speed condition wherein an overspeed voltage from air speed card No. 9, Fig. 35, increases the reading of tachometer 51, (*c*) increased intensity of engine noise due to an increased air speed signal voltage, and of course the unbalance of related servo systems, such as the $\alpha$, $W_y$ and $W_z$ systems, and these servo systems and all others affected automatically start to search for a new position of balance corresponding with the increased horsepower in the manner previously described.

An increased throttle setting also increases the derived voltage from potentiometer 631, Fig. 35, modified in turn by the R. P. M. potentiometer 643 for increasing the reading of the manifold pressure meter 50. This reading is further modified by altitude and carburetor ice as described.

In opposition to the cooling effect of air speed at the cylinder head meter 62, Fig. 36, a heating voltage from the mixture potentiometer 652 is used, the heating effect increasing as the mixture is leaned and as the H. P. is increased by opening of the throttle. An increase in carburetor ice has generally the same effect as closing the throttle thus tending toward decreased manifold pressure and H. P. and less cylinder head heating. It will be noted that two mixture potentiometers are used in the same series circuit, one, 608, energizing the throttle potentiometer 609 for modifying the horsepower according to mixture and the other, 652, energized according to H. P. for controlling cylinder head heating.

Within the limits of air speed certain aircraft characteristics are simulated, for example referring to Fig. 11, card Nos. 3 and 7 a glide correction is provided for the $\alpha$ servo except at an optimum air speed represented by the ground tap where the angle of attack is minimum and no glide correction is necessary to correct for the flight path of the aircraft; also as previously pointed out provision is made for both a greater tendency to stall and to nose down when the air speed is comparatively low. The stall factor is introduced by air speed card No. 4 and the "nosing down" by cam 320 of air speed switch 316, Fig. 11, which closes a circuit at contact 322 connecting the $\theta$ servo input to a source of negative or positive voltage depending on the pitch angle, when the air speed is about 40 M. P. H. or less. The $\theta$ input circuit is normally grounded by the switch 316 so as to be ineffective except under conditions above described.

Pitch control by means of the elevator and elevator trim potentiometers 339 and 340 is shown in Fig. 12. The derived pitch moment voltage from these potentiometers is an input to the rate of pitch system and tends to operate the servo in a direction of either positive or negative rate of pitch, depending on whether the elevator is set for a climb or dive. The elevator pitching moment may be opposed or aided, depending on whether $W_y$ is positive or negative by other pitching moments including the engine thrust moment and a moment from the flaps system, Fig. 15. Also random positive and negative pitching moments from the rough air system, Fig. 15, may be introduced as previously explained. Opposing the resultant pitching moment and tending to balance the $W_y$ servo are a moment voltage depending on angle of attack from $\alpha$ card 2 and the pitch stabilizing or damping voltage from $\theta$ card 4, Fig. 18. A centrifugal force damping voltage $-vW_y$ from $W_y$ card 4 (normally through $\alpha$ switch 361) also tends to oppose the resultant pitching moment.

Assuming now that the elevator is held in a dive position for example, the derived pitch moment voltage at slider 342 causes the $W_y$ servo to operate toward a negative rate of pitch. This causes the $\alpha$ servo to respond to the centrifugal force voltage derived from $W_y$ card 3 to simulate a new decreased or negative angle of attack. Also the $\phi$ servo card 5, Fig. 19, is energized from $W_y$ cards 1 and 2 for deriving at slider 482 an integrating voltage $W_y\cos\phi$ for controlling the integrating pitch servo and consequently the pitch element of the attitude gyro 30, Figs. 18 and 19, and also for producing a yaw component if the roll angle is other than zero. Furthermore if roll is involved the yaw component from $W_y$ card 3 is used in the acceleration turning error circuit, Fig. 16.

As the angle of attack decreases, the pitching moment voltage from $\alpha$ card 2 decreases and in the case of a full dive opposes the elevator moment voltage at the $W_y$ input with less effect. Therefore unless the elevator is returned to neutral and the elevator pitching moment voltage removed from the $W_y$ servo, the air speed and negative pitch angle will tend to increase thus simulating the beginning of an outside loop. For such a maneuver to be carried through successfully, full throttle must be applied in the inverted position so that the air speed is sufficient to carry through the loop without permitting the angle of attack servo, Fig. 15, to reach the negative "stall" position. This involves simulation of the inertia of an aircraft which is accomplished by the various gear reducers and motors of the servo systems in question, in combination with the electrical characteristics thereof. An inside loop involves essentially the same factors since full throttle and a sufficiently high initial air speed are required for carrying through at the top of the loop without stalling. As the pitch angle changes between positive and negative pitch during the loop, the $\theta$ switch 445 controls the polarity of the voltages in question so that they have the proper sign for the attitude of the aircraft. The time factor is obviously critically involved in both the inside and outside loops since the $\theta$ servo must operate to vary the components of gravity before the air speed drops to the $\alpha$ stalling angle. Therefore these maneuvers can be closely simulated with the present invention by advanced students.

The negative rate of pitch, referring again to the dive maneuver also controls the pitch system so as to indicate a dive attitude, and $\theta$ card 3 in turn derives a voltage $+\sin\theta$ at slider 451 for input to the air speed servo tending to increase air speed by reason of the increased gravity component acting along the $x$ axis of the aircraft. In the case of a climb this voltage is negative tending to decrease air speed. In both cases the elevator moment voltage is also affected since the elevator potentiometer 339 is energized according to $(v^2+C)$. Assuming that the above elevator adjustment was for a small dive angle the air speed angle of attack, rate of pitch and pitch servo system are now unbalanced and remain so until the newly adjusted dive attitude is determined by balance between the elevator, angle of attack and rate of pitch, and until the new air speed is determined by balance between the combined thrust and gravity components and drag.

In the case of a climb, the elevator moment voltage tends to produce a positive pitch attitude through the $W_y$, $\alpha$ and $\theta$ servos as previously pointed out with reference to Fig. 6. Since the air speed tends to decrease during climb due to gravity the centrifugal force inputs to the $\alpha$ servo and to the $W_y$ servo from $W_y$ cards 3 and 4 respectively also decrease but at a lower rate than the elevator moment since $W_y$ cards 3 and 4 are energized according to $v$ rather than $v^2$. The tendency toward positive rate of pitch is thus weakened. Assuming now that the elevator is pulled back for a steep climb without further opening of the throttle, the angle of attack is further increased due to the increased vertical centrifugal force voltage from $W_y$ card 3 and to the decreased lift voltage from $\alpha$ card 1 that is energized according to $v^2$. This increase in angle of attack continues until a stall develops and the $\alpha$ cam switch 360 closes the rough air circuit at contact 399 to introduce the air bumping conditions attending a stall. Concurrently the cam switch 361 grounds the output circuit from the $W_y$ card 4 (junction 232) thereby eleminating the $W_y$ input at terminal 221, Fig. 12, representing centrifugal force. The air speed is now quite low and the rate of pitch servo is unbalanced in the opposite direction by reason of the predominance of the opposing "nosing down" voltage through air speed switch 316, Fig. 11, so that the trainer tends to nose down rapidly and go into a dive. As a result the gravity components derived from the $\theta$ servo are now reversed tending to cause the air speed to increase to a terminal velocity with the result that the pitch tends to become more positive as the positive moment voltage from $\alpha$ card 2 to the $W_y$ servo increases. As the pitch approaches neutral the air speed due to the preceding dive gradually decreases until the pitch angle again becomes positive. As previously explained in Fig. 6, the trainer will repeat the above cycle and simulate the damped oscillation or fugoid of an aircraft tending to resume normal flight.

During the above described climb and dive operations, vertical air speed is computed and indicated, Fig. 18, and in addition is integrated by the altitude servo, Fig. 26, to indicate altitude. This computation has been generally described it being sufficient to state that the vertical component of air speed $v \sin\theta$ is determined by the $\theta$ card 1, corrected at the summing amplifier 467 where roll and sideslip are present by a voltage $B \sin\phi$ from $\phi$ card 3, and by the $\alpha$ glide correction voltage from the air speed cards 3 and 7 designed according to $\alpha$. This $\alpha$ correction from the air speed servo system is explained by the close relationship between air speed and angle of attack i. e. $\alpha=v^2C_L$. The resultant output of amplifier 467 representing vertical air speed is simply integrated by the altitude servo to determine altitude.

A yawing maneuver is performed principally by means of the rudder control, Fig. 23, a right rudder for example raising the slider 510 for deriving a positive moment voltage from rudder potentiometer 511. This rudder moment voltage operates the $W_z$ servo in a positive (right) direction and is opposed mainly by a damping voltage $-\omega_z$ from card 1 and a second damping voltage $-v^2B$ from B card 2 and is aided by increased torque attending increased thrust. Where rate of pitch is involved as is usually the case, the rudder moment voltage is aided when $W_y$ is positive and is opposed when $W_y$ is negative as indicated by the resolved component input $W_y \sin\phi$. Also where rough air is involved, the rough air disturbing inputs to the $W_z$ servo alternate at random to aid and oppose the rudder moment.

Since a turning maneuver normally involves both yaw and pitch the integration of rate of yaw to determine azimuth $\psi$ involves modification of the derived voltages from cards 1 and 2 by the $\phi$ servo, card 1, Fig. 19. The derived voltage $W_z \cos\phi$ so obtained is an input (terminal 232) to the $\psi$ signal amplifier jointly with the pitch input $W_y \sin\phi$. The amplified $\psi$ signal is further modified by the $\theta$ servo, card 2, and this derived voltage $\psi \sec\theta$ is the resultant horizontal yaw component that is integrated by the $\psi$ servo, Fig. 16, for operating both the magnetic compass and the gyro-compass as previously explained.

The aileron control, Fig. 20, operates the roll servo for simulating either side-slip and roll maneuvers, or turns when used in combination with the rudder control, Fig. 23. The aileron moment input from potentiometer 471 to the $\phi$ servo is opposed by the roll stabilizer voltage from $\phi$ card 2, and by a side-slip coupling voltage from B card 1, Fig. 16, that tends to neutralize the aileron moment voltage. The aileron moment is aided by a thrust voltage from the thrust phase inverter 321, Fig. 11, and by a yaw voltage from $W_z$ card 2. As the roll servo is actuated the roll element of the attitude gyro, Figs. 19 and 20, is positioned to indicate the roll attitude.

It will be noted that the roll stabilizer card 2 is designed so that roll in either direction for both level and inverted flight is damped when either wing is lowered. Also, since a roll may be a continuous maneuver involving more than 360° the roll switch 485 operated from the servo controls the polarities of the voltages from the $\theta$ servo to the $\alpha$ servo and also from the $\phi$ servo to the $W_z$ servo when the roll angle exceeds 90° to maintain all coordinate voltages in proper phase relationship. It is to be noted further that the switching of all voltages by the cams 485, Fig. 19, and 445, Fig. 18, occurs when these voltages are of zero magnitude and thus no irregularity or transient is introduced into the system.

The combined aileron and rudder operation for executing a properly banked turn is more complicated and involves coordinating the controls with respect to air speed so that the gravity input $E \cos \theta \sin \phi$ to the B signal amplifier, Figs. 8 and 16, from the $\phi$ card 6 is equal and opposite to the centrifugal force input $vW_z$ from the $W_z$ card 3. This balance can be determined by observing the ball-bank indicator, Fig. 23, the ball 521 of which is positioned by the B servo so that the ball is centered when the B signal input is zero. If the B signal is other than zero, the ball will move to one side or the other indicating either side-slip or skidding. Since there will be change in air speed, the value of lateral centrifugal force $vW_z$ which depends on air speed also changes and therefore the bank angle is adjusted in proper relation to air speed for any given rate of turn $W_z$. The other functions of the $\phi$ servo card have been indicated previously.

Since rough air voltages are directed when rough air is simulated to the rate of pitch and yaw servos it will be apparent that rough air indications will also appear at the attitude gyro and the turn-and-bank indicator, as well as to other flight instruments previously referred to.

The execution of a slow roll in practice through a complete cycle requires skillful coordination of the controls since at certain attitudes the functions of the rudder and elevator are apparently reversed, i. e. when the roll angle is about 90° (or 270°) the rudder has vertical control and the elevator has horizontal control of the nose of the airplane. Before following through such a maneuver in the servo systems of the present invention, the execution of a slow roll in practice will be described briefly. Assuming that the roll is to be in the positive direction, i. e. clockwise, the maneuver is started at moderate to high crusing air speed by first operating the ailerons and using right rudder as for a right turn to speed up the maneuver. This causes dropping of the right wing and as the nose starts to swing to the right this turning tendency is checked by left rudder. Right aileron is maintained throughout the roll. An increasing amount of left rudder is applied to keep the nose up as the roll proceeds through 90°, and then gradually reduced as the roll proceeds toward 180°. As the plane still under full right aileron control rolls into the fully inverted position it tends to nose down and lose altitude thus requiring a forward movement of the elevator control. This is normally the dive position of the elevator but the aircraft is now inverted. The rudder is returned to neutral at about the fully inverted position for straight line flight and as the roll continues around toward 270° the forward elevator pressure is gradually reduced and the rudder is now progressively reversed to right to keep the nose up. As the roll proceeds toward the normal level flight (360°) position, the controls are again centralized in regaining normal level flight.

Referring now to Fig. 19 the voltage input to the $\phi$ servo from the aileron potentiometer for "right aileron" causes the roll servo motor to operate continuously in the positive direction indicated as long as right aileron is held. During this roll operation the slider contacts of all the potentiometer cards 1 to 6 move simultaneously in the positive direction, i. e. upward, it being understood that by reason of the circular form of the cards the upper and lower extremities of the card are joined together. Also as previously pointed out the roll element of the attitude gyro 30 and the roll switch 485 are positioned according to the degree of roll.

Assuming now that the aircraft has rolled from its normal level flight position to a 90° roll, the functioning of the roll cards is as follows. Card 1: As the slider 478 moves toward the 90° or grounded position the derived voltage $W_z \cos \phi$ approaches zero ($\cos 90°=0$) and therefore no $\psi$ signal is derived. This will be apparent since in the 90° roll position the wing span is vertical and hence turning about the Z axis of the aircraft produces no change in azimuth. Slider 479 on the other hand moves from a grounded position to a position of maximum derived voltage corresponding to $W_z$ since $\sin 90°=1$. This voltage is an input to the $\theta$ servo amplifier, Fig. 18, for controlling both the pitch element of the attitude gyro and the $\theta$ switch 445 and associated cards. In this attitude it will be noted that turning about the Z axis of the aircraft (now horizontally positioned) causes the nose of the aircraft to move in a vertical instead of a horizontal direction. Also change in pitch in the ordinary sense causes the nose to move in a horizontal instead of vertical direction. Accordingly since left rudder has been applied during the initial part of the slow roll maneuver to 90° the resulting $W_z$ voltage derived at slider 479, Fig. 19, energizes the $\theta$ servo amplifier to operate the pitch element 493 of the attitude gyro, Figs. 18 and 19, to indicate upward turning of the nose.

Card 2: During the 90° roll the voltage derived at the slider contact 494, Fig. 19, decreases from a maximum to zero representing the variation in the roll damping characteristics. This derived voltage is for the purpose of roll stabilization for insuring roll and roll recovery at a normal rate according to the roll angle. It will also be noted, referring to Fig. 16 that the B voltage from B card 1 for input to the $\phi$ servo increases the roll recovery tendency as side-slip increases.

Card 3: The voltage $-B \sin \phi$ derived at slider 495 as it moves positive 90° increases from zero to a maximum voltage representing —B. In other words the side-slip correction for the vertical air speed system is obviously a maximum when the roll angle is 90° and is practically zero for normal level flight.

Card 4: The derived voltages at sliders 480 and 481 both decrease from maximum representing $\alpha$ to zero at the ground positions. These $\alpha$ modifying voltages for the vertical air speed circuit (subject to polarity selection by the $\theta$ switch 445, Fig. 18) obviously affect the vertical air speed circuit a maximum when the wing is horizontal, either for normal or inverted flight, and a minimum when the wing is vertical as in a 90° roll. When the aircraft is in steady flight and no accelerations are present, the angle of attack is a function of air speed. Hence for any given air speed there is a given angle of attack to sustain lift. Since the actual vertical air speed of the aircraft is a function of the pitch angle and angle of attack, it is therefore a good approximation for the conditions mentioned above to derive vertical air speed as the difference between the vertical velocity derived as a function of the pitch angle and a velocity derived as a function of the attack angle. These two component voltages, namely that representing $v \sin \theta$ from slider 446 of $\theta$ card 1, Fig. 18, and the $\alpha$ glide correction voltage from $\phi$ card 4, Fig. 19, as selected by the $\theta$ switch 466 are summed algebraically as indicated at the vertical air speed amplifier 467, Fig. 18.

Card 5: The voltage at slider 482, Fig. 19, for the $\theta$ servo decreases from $W_y$ to zero since the vertical component $\cos \phi$ is zero. The voltage at slider 483 on the other hand increases from zero to the maximum $W_y$ for use (1) for the $\psi$ signal, i. e. $W_y$ produces maximum azimuth change at 90° roll, and (2) for the $W_z$ servo amplifier through $\phi$ switch 485 (except during inverted flight). The voltage at slider 486 of card 5 increases from zero to the maximum $W_y$ for use by the $W_z$ servo amplifier during inverted flight since the trigonometric signs for normal and inverted flight are reversed when considering direction of yaw for right and left rudder with respect to ground.

Card 6: For the 90° roll the voltage at slider 487 which derives the gravity acceleration along the Y axis, Fig. 8, increases from zero to a maximum $E \cos \theta$ for input to the B signal amplifier as it will be apparent that B is a maximum for this angle. The voltage at slider 488 representing a gravity loading factor along the Z axis for the $\alpha$ servo amplifier on the contrary decreases from a maximum $-E \cos \theta$ to zero necessitating increased angle of attack to overcome loss of vertical lift component at a 90° roll position.

As the roll passes through 90° the aircraft is now inverted and at 180° the attitude is that of inverted level flight. In rolling between 90° and 180° the roll cards again function as follows. Card 1: The voltage at slider 478 increases from zero to a maximum $$-W_z(\cos 180° = -1)$$

for reversing the voltage to the $\psi$ signal amplifier. This compensates azimuth indication for inverted flight, also bearing in mind that some left rudder is still held to hold the nose toward the right because of the inverted position of the plane. The voltage at slider 479 decreases from $+W_z$ to zero so that the $\theta$ servo is not affected by a yaw voltage at 180° roll.

Card 2: The derived voltage at slider 494 increases from zero to maximum indicating the relative damping or roll stabilizing effect as the roll progresses from 90° to 180°. It will be noted that roll card 2 which has various intermediate ground and voltage taps is designed to take into account the roll damping characteristics of the aircraft.

Card 3: The voltage at slider 495 decreases from $-B$ to zero to simulate minimum side-slip correction for the vertical air speed system during level inverted flight.

Card 4: The voltages at sliders 480 and 481 at 180° roll are exactly reversed as to polarity as compared with the normal level flight position because the angle of attack has become negative to support the aircraft. Accordingly the proper correction is introduced for the vertical air speed system, subject of course to the $\theta$ switch 445, Fig. 18.

Card 5: Voltage at slider 482 is reversed to $-W_y$ from the normal level position to take into account the opposite pitching direction for inverted flight, and the voltages at sliders 483 and 486 both decrease to zero at 180° since $W_y$ now has no horizontal component and hence produces no change in azimuth or yaw. It will be noted that since the $\phi$ switch 485 and the sliders of card 5 are mechanically synchronized, the polarity of the $W_y$ input voltage to the $W_z$ servo amplifier (selector contact 484), Fig. 19, is not reversed but remains unchanged at the 180° roll angle. This is because a double reversal occurs as is required to comply with the space geometry of the aircraft. For example, consider a 45° right banked turn, pulling back the elevator increases the turning rate in a clockwise direction over the ground. Similarly, if banked 135°, pulling back on the elevator causes an increase in clockwise rotation over the ground (even though left rudder is used in the inverted maneuver).

Card 6: Voltage at slider 487 decreases to zero since there is no lateral component of gravity during the level inverted flight attitude and this input to the B signal amplifier is therefore zero. The voltage at slider 488 increases to $+E \cos \theta$ since the gravity loading factor now has the maximum inverse effect and requires a large negative angle of attack. In connection with the roll toward 180° it should be noted that the rudder is gradually returned to neutral so that the $W_z$ servo is de-energized, and the elevator is moved forward to hold up the nose while in the inverted position. This latter operation energizes the $W_y$ servo and hence the $\theta$ servo through the $\phi$ card 5 to position the attitude gyro accordingly.

In the case of the $\theta$ voltage input to the $\alpha$ servo amplifier (selector contact 489), the circuit is transferred to contact 453 of the $\theta$ card 3 so that the negative input derived from this contact tends to make $\alpha$ negative. This is because a positive $\alpha$ is required to maintain normal flight whereas a negative $\alpha$ is required during inverted flight.

As the roll proceeds from 180° to 270° wherein the wing is again in vertical position the $\phi$ cards function as follows. Card 1: The voltage at slider 478 again decreases to zero since $W_z$ is not effective to change azimuth at 270° roll. The voltage at slider 479 used as an input to the $\theta$ servo amplifier increases to the maximum value $W_z$ since, as previously pointed out the rudder controls vertical movement of the nose of the plane for this angle. Card 2: The voltage at slider 494 decreases to zero to simulate minimum roll stabilizing effect when the wing is vertical. Card 3: The lateral graviy component voltage at slider 495 increases to a maximum for introducing the maximum side-slip correction to the vertical air speed system. Due to the 180° change in position of brush 488 a gravity voltage of opposite sign has been impressed on the B amplifier and since brush 495 has also changed 180° in position the sign of the B correction to vertical air speed remains the same as in the 90° roll position, namely negative to cause loss in altitude. Card 4: The $\alpha$ voltages affecting vertical air speed at the sliders 480 and 481 decrease to zero since for 270° roll position $\alpha$ produces no change in glide path angle and hence no vertical air speed component is present. Card 5: The $W_y$ voltage at slider 482 decreases to zero since the vertical component is zero and therefore the $\theta$ servo is unaffected by this input. On the other hand the voltage at slider 483 increases to the maximum $-W_y$ for producing maximum azimuth change for this position. Since the aircraft is still inverted until the 270° roll point is reached, the $W_y$ voltage input to the $W_z$ servo amplifier is switched by selector contact 484 from slider 483 to slider 486 thereby reversing the polarity for directionally correct azimuth indication. Card 6: The pitch voltage from slider 487 increases to the maximum $E \cos \theta$ for input to the B signal amplifier since the side-slip is obviously a maximum in this position. On the other hand the gravity factor voltage at slider 488 decreases to zero and therefore when near the wing-vertical position a large increase in angle of attack is required to produce the necessary lift.

During the above described interval of rolling from 180° through 270° (as well as thereafter to normal level flight) the rudder is reversed to right to hold up the nose as the roll proceeds through 270°. This has been explained above for the 90° roll position and it is sufficient to state that right rudder causes operation of the $W_z$ servo in the opposite direction for energizing $\phi$ card 1 accordingly so that the proper azimuth and pitch indications are obtained. As the roll approaches the 360° position the aileron is returned to neutral, thereby de-energizing the roll servo and the apparatus is then in position to resume normal lever flight.

Maintenance of trim is an important factor in actual flying. Since variation in air speed changes the trim of an aircraft for a given loading, the trim potentiometers associated with the elevator, rudder and aileron potentiometers respectively may be reset as desired to vary the moment voltage so as to restore proper trim.

Where a landing operation is simulated it will be noted that the descent must be controlled through the $\theta$ and air speed servos for proper approach attitude and air speed, with attention that the latter does not drop to the stalling speed. If stalling speed is reached the $\alpha$ and $\theta$ servos are controlled in the manner above described to cause sharp nosing down of the aircraft. Lowering of the landing gear and flaps as in practice increases drag at the $v$ servo, Figs. 11 and 15, and lowering of the flaps alone increases both lift at the $\alpha$ servo and pitching moment at the $W_y$ servo so that an actual field landing can be simulated. When first lowered, the increased lift of the flaps causes a "ballooning" of the aircraft and then a nose-down attitude as in actual practice. After "landing" as determined by the altimeter the operation is completed in conventional manner by setting the mixture control, Fig. 35, at "full lean," thus opening the idle cut-off switch 601 and de-energizing the engine and all associated circuits. All power to the engine system is shut off by opening the ignition switch 600.

It will be noted throughout the above discussion that certain rate servo systems, namely the rate of pitch and rate of yaw systems, operate with respect to the Y and Z aircraft axes respectively, and that the pitch, roll and azimuth servo systems are related to the rate servos by resolving means so that the aircraft attitude with respect to fixed earth axes can be determined. Although in the present instance, a rate of roll servo system for operation with respect to the aircraft X axis has been eliminated for practical reasons such as less complication and improved roll response, it shall be understood that the use of a rate of roll servo together with the other rate servos is within the scope of my invention.

By way of example, the use of such a rate of roll ($W_x$) servo system in the present invention is schematically shown by Fig. 39 which indicates only the other parts of the flight computing system that are necessary to an understanding of the manner in which the $W_x$ servo is related to the system. In the present instance, the aileron or roll moment voltage from the aileron potentiometer 471 is modified as indicated according to angle of attack by the $\alpha$ card 4 before input to the rate of roll servo motor amplifier 710. The $W_x$ servo cards 1 and 2 are oppositely energized by a fixed A. C. voltage and the derived voltages from these cards which are proportional to rate of roll are used to energize $\alpha$ card 5. The derived voltage from this card is another input to the $W_x$ servo amplifier and represents a reacting rolling moment resulting in damping of roll during normal low angle of attack maneuvers but aiding the roll in high angle of attack conditions as in a "snap roll." Another input to the $W_x$ servo is derived from $\alpha$ card 6 which is energized according to the B signal voltage and represents rolling moment due to side-slip as modified by angle of attack.

The $W_x$ cards 3 and 4 are oppositely energized by fixed A. C. voltages as indicated and the derived voltages representing $W_x$ are used to energize B card 3 from which a derived voltage is supplied to the $\alpha$ servo input, thus representing the effect of rate of roll during the side-slip on lift. The derived voltage from $W_x$ card 3 is also an input to the $\phi$ servo amplifier 711, the roll servo in this case functioning as an integrator similar to the pitch servo previously described and being operatively connected to the roll element of the attitude gyro 30, Fig. 20. In order to avoid unnecessary duplication in the drawings, the M-G sets of servo systems previously shown are indicated in block schematic.

The above description illustrates connections that may be used for including the rate of roll servo system in the flight computing system, it of course being understood that various changes in the connections may be made according to characteristics of the simulated aircraft and also to simplify the design.

Other changes of similar nature are within the scope of my invention for simulating aircraft characteristics depending on what special features are to be emphasized. For example, the rate of pitch servo mechanism may be omitted for the purpose of producing a quick response of the attitude gyro, as when the stick or control column is rapidly oscillated to move the elevator up and down. In such a case the delay introduced by the motor mechanism and gearing of the $W_y$ servo slows the response of the pitch servo so that the pitch element of the attitude gyro does not follow a rapid elevator movement as will be apparent from inspection of the "vertical system" of Fig. 6 which illustrates the inherent tendency of the $\alpha$ and $W_y$ servo motor systems to interact through a damped oscillation.

One arrangement for eliminating the delay inherent in the $W_y$ servo mechanism is shown by Fig. 40 wherein the moment voltage derived from the elevator potentiometer 339 is an input to the $W_y$ line amplifier 715, the voltage output of which bears a linear relation to the moment voltage input. The amplifier output energizes the primary winding 716 of the amplifier transformer 717 and a secondary winding 718 having a grounded center tap as indicated is arranged to energize the $\theta$ servo (pitch integrator) through previously described roll resolving potentiometer means indicated at 719. Hence it will be noted that the elevator impulse is transmitted instantly to the $\theta$ servo for operation of the attitude gyro.

The relationships between rate of pitch and angle of attack and air speed are maintained generally as previously described. The induced voltage in the secondary winding 720 of the $W_y$ transformer is proportional to rate of pitch and therefore is used to energize card 10 of the air speed servo system. The derived voltage from this card representing centrifugal force $W_y v$ is an input to the $\alpha$ servo amplifier. The $\alpha$ servo system is substantially the same as that shown by Fig. 15, the opposing moment voltage from $\alpha$ card 2 being used as an input to the $W_y$ line amplifier in the same manner. Since a motor mechanism which must be returned to a central or zero rate position is not involved, no damping input voltages to the $W_y$ line amplifier are required.

In the yaw system similar modifications may be made as will be seen by reference to Fig. 41 wherein a line amplifier is used for rate of yaw computation instead of the servo motor mechanisms of Figs. 7 and 23, thereby providing a non-oscillatory system. In other words, the simulation of a "snaking" characteristic by interaction of the rate of yaw and side-slip servo motor systems is foregone in place of certain other advantages, such as less complicated and expensive mechanism. In addition the response of the attitude gyro to sudden movement of the rudder control is improved.

In the arrangement of Fig. 41 the rudder moment voltage derived from the rudder potentiometer 511 is an input to the $W_z$ line amplifier 720, a second input to this amplifier being a voltage corresponding to $v^2B$ representing an opposing side force that is derived from B card 2 as previously described. The B servo motor amplifier is energized preferably through a B signal amplifier as in the previous instance by voltage inputs representing gravity and centrifugal force $W_z v$, this latter input being derived from another air speed card 11 which is energized according to $W_z$ from the $W_z$ transformer secondary winding 721. Another secondary winding 722 of the $W_z$ transformer is connected to the terminals of the cosinusoidal $\phi$ card 1 from which is derived in the manner previously described a voltage $W_z \cos \theta$ that is an input to the $\psi$ signal amplifier. This part of the circuit has been previously explained and it is sufficient to state that the output of this amplifier energizes the secant card 2 of the $\theta$ servo for deriving in turn the voltage $\psi$ secant $\theta$ which is the main input to the $\psi$ integrating servo for positioning the gyrocompass 27.

The $W_z$ voltage induced in another secondary winding 723 of the $W_z$ transformer energizes a network as indicated including a rectifier, an R-C damping circuit 724 and a D. C. meter 725 representing a rate of turn indicator. The R-C damping circuit of well-known design simulates to any desired extent the damping of the aircraft during turning so that an appropriate lag may be introduced in the response of the turn meter to the induced $W_z$ voltage.

The non-oscillatory system shown by Fig. 42 uses the $W_z$ servomotor but instead of the B servomotor a line amplifier is used. It will be recalled that in the previously described oscillatory yaw circuit outlined in Fig. 7 the interaction between the $W_z$ and B servomotor systems provides a damped oscillation simulating "snaking" and the ball-bank indicator is operated through the B servomotor mechanism so that the ball is damped.

In the arrangement of Fig. 42, the rudder moment voltage derived from the rudder potentiometer 511 is as before an input to the $W_z$ motor amplifier, and the derived voltage from $W_z$ card 3 (energized according to air speed) is a centrifugal force input $W_z v$ to the B line amplifier 726. The B line amplifier may be energized through a B signal amplifier having centrifugal force and gravity inputs as previously described. The side-slip voltage induced in the secondary winding 727 of the B amplifier transformer energizes an air speed card 12 that is contoured for a square relationship for obtaining the opposing side force voltage $v^2B$. This voltage is an input to the $W_z$ servo amplifier as before. Another secondary winding 728 of the B output transformer is connected to a rectifier as shown and the rectified voltage energizes a D. C. meter 729 representing a ball-bank indicator through an R-C damping circuit 730. This R-C damping circuit simulates to any desired extent the damping effect of the liquid on the ball in the glass tube used in standard ball-bank instruments. As in the case of Fig. 41, the non-oscillatory arrangement of Fig. 42 provides a less expensive design.

It will therefore be seen that a summing line amplifier may be used instead of a servo mechanism in those cases where the functions to be derived from the servo system are linear, as distinguished from servo systems where specially contoured potentiometer cards are required.

Since in the rate of roll servo, Fig. 39, the potentiometer voltages are derived according to a linear relationship, it will be apparent that this servo system may also be replaced by a summing line amplifier and transformer substantially as described above.

It will now be apparent that all aerial maneuvers, acrobatic and routine, may be realistically simulated by the present invention by properly coordinating the aileron, elevator, rudder and throttle controls as in practice since the principal moments and forces acting on an aircraft about and along its X, Y and Z axes, and the integrated aircraft attitude with respect to the fixed horizontal and vertical axes are simulated by servo systems above described. Accordingly, complete flexibility of operation is attained.

Terminology used herein is intended to comprehend the full function equivalent thereof, and by way of example, the term "turning moment" where used in the claims is intended to comprehend a moment acting with respect to any one of the three aircraft axes, and not necessarily with respect to the Z axis.

It should be understood that this invention is not limited to specific details of construction and arrangement thereof herein illustrated, and that changes and modifications may occur to one skilled in the art without departing from the spirit of the invention.

What I claim is:

1. A flight simulator computing system comprising a plurality of flight representing controls, means responsive to the operation of said controls for deriving voltages representing moments and forces tending to affect flight attitude and speed, a plurality of inter-related and inter-acting electrical systems representing respectively flight conditions responsive to said derived voltages for computing flight variables including airspeed, roll and pitch attitudes and side-slip and for producing voltages representing said variables, the roll and pitch systems including servo means having functional deriving means for resolving voltages representing flight variables including air speed and side-slip according to roll and pitch attitudes for deriving voltages representing vertical components of air speed, and means responsive to said vertical component voltages for indicating vertical air speed.

2. A flight simulator computing system comprising a plurality of flight representing controls, means responsive to the operation of said controls for deriving voltages representing moments and forces tending to affect flight attitude and speed, a plurality of inter-related and inter-acting servo-operated potentiometer groups representing respectively flight conditions including roll and pitch attitudes responsive to said derived voltages for computing flight variables and for producing voltages representing said variables, said roll and pitch groups including functional potentiometers for resolving voltages representing flight variables including air speed and side-slip according to roll and pitch attitudes for deriving voltages representing vertical components of air speed, and means responsive to said vertical component voltages for indicating vertical air speed.

3. A flight simulator computing system comprising a plurality of voltage deriving means, controls associated with said means adjustable respectively by a pilot for deriving individual voltages representing thrust and turning moments about aircraft axes, and a plurality of inter-related and inter-acting electrical systems each representing a fundamental flight relationship responsive to said derived voltages for jointly computing flight variables including air speed, rate of pitch and angle of attack, the electrical system representing air speed having means for deriving function voltages representing respectively air speed and other functions of air speed, said function voltages being used in said computing operation for energizing flight factor deriving means of said systems representing rate of pitch and angle of attack for deriving additional system input voltages representing moment and force respectively, said additional voltages controlling certain inter-acting systems and including voltages of opposite sense for matching said moment and force voltages thereby tending to establish an equilibrium for balancing the rate of pitch and angle of attack electrical systems.

4. A flight simulator computing system comprising a plurality of voltage deriving means, controls associated with said means adjustable respectively for deriving individual voltages representing thrust and turning moments about aircraft axes, and a plurality of inter-related interdependent potentiometer groups, each operated by servo apparatus and representing a fundamental flight relationship responsive to said derived voltages for jointly computing flight variables including air speed, rate of pitch and angle of attack, the servo group representing air speed having means for deriving function voltages representing respectively air speed and other functions of air speed, said function voltages being used in said computing operation for energizing flight factor potentiometers of said groups representing rate of pitch and angle of attack for deriving additional servo input voltages representing moment and force respectively, said additional voltages controlling inter-acting servo apparatus and including voltages of opposite sense for matching said moment and force voltages thereby tending to establish an equilibrium for balancing the rate of pitch and angle of attack servo apparatus.

5. In flight simulating apparatus having simulated flight controls, a flight computing system comprising voltage deriving means operable by the elevator control for deriving a voltage representing pitching moment, a servo system representing rate of pitch responsive to said moment voltage for deriving another voltage representing centrifugal force and a second servo system representing angle of attack responsive to said centrifugal force voltage for deriving another voltage opposite in sense to the aforesaid pitching moment voltage tending to balance said moment voltage input to said rate of pitch servo system, said angle of attack servo system also being operative to derive another voltage representing lift opposite in sense to the aforesaid centrifugal force voltage tending to balance said force voltage input to said angle of attack servo system whereby a balance tends to obtain between the aforesaid rate of pitch and angle of attack servo systems.

6. In flight simulating apparatus having simulated flight controls, a flight computing system comprising voltage deriving means operable by the elevator control for deriving a voltage representing pitching moment, an electrical system representing rate of pitch responsive to said moment voltage for deriving a control quantity representing centrifugal force and a second electrical system representing angle of attack responsive to said centrifugal force quantity for deriving another control quantity opposite in sense to the aforesaid pitching moment voltage tending to balance said rate of pitch system, said angle of attack system also being operative to derive another control quantity representing lift opposite in sense to the aforesaid centrifugal force voltage tending to balance said angle of attack system whereby a balance tends to obtain between the aforesaid rate of pitch and angle of attack systems.

7. In flight simulating apparatus having simulated flight controls, a flight computing system comprising voltage deriving means operable by the elevator control for deriving a voltage representing pitching moment, a servo system representing rate of pitch responsive to said moment voltage for deriving another voltage representing centrifugal force, a second servo system representing angle of attack responsive to said force voltage for deriving another voltage opposite in sense to the aforesaid pitching moment voltage for balancing said moment voltage input to said rate of pitch servo system, said angle of attack servo system also being operative to derive another voltage opposite in sense to the aforesaid force voltage for balancing said force voltage input to said angle of attack servo system whereby a balance is established between the aforesaid rate of pitch and angle of attack servo systems, said rate of pitch servo system also being operative to derive a voltage proportional to the aforesaid moment voltage, and integrating means controlled by said proportional voltage for changing the instant pitch attitude of the flight simulating apparatus.

8. In flight simulating apparatus having simulated flight controls, a flight computing system comprising voltage deriving means operable by the elevator control for deriving a voltage representing pitching moment, a servo system representing rate of pitch responsive to said moment voltage for deriving another voltage representing centrifugal force, integrating means controlled by said rate of pitch servo system for indicating pitch attitude, said integrating means having resolving means for deriving a voltage representing a gravity component, and a second servo system representing angle of attack responsive to said centrifugal force and gravity voltages for deriving another voltage opposite in sense to the aforesaid pitching moment voltage for input to said rate of pitch servo system, said angle of attack servo system also being operative to derive another voltage representing lift opposite in sense to the aforesaid gravity voltage for input to said angle of attack servo system whereby a balance tends to obtain between the aforesaid rate of pitch and angle of attack servo systems.

9. In flight simulating apparatus having simulated flight controls, a flight computing system comprising voltage deriving means operable by the elevator control for deriving a voltage representing pitching moment, a servo system representing rate of pitch responsive to said moment voltage for deriving another voltage representing centrifugal force, integrating means controlled by said rate of pitch servo system for indicating pitch attitude, said pitch integrating means including means for deriving a pair of voltages representing gravity components, a second servo system representing angle of attack responsive both to said force voltage and one of said gravity component voltages for deriving another voltage opposite in sense to the aforesaid pitching moment voltage for input to said rate of pitch servo system, said angle of attack servo system also being operable to derive an answer voltage representing lift for input to said angle of attack servo system, a third servo system representing air speed responsive to voltages representing thrust and drag, said air speed servo system being operative to derive voltages for modifying said angle of attack derived voltages and said centrifugal force voltage, said air speed servo system also being responsive to the other of said gravity component voltages whereby a change in pitch attitude is effective to cause the air speed and angle of attack servo systems to search for new positions of balance representing new values of air speed and angle of attack.

10. In flight simulating apparatus having simulated flight controls, a flight computing system comprising voltage deriving means energized according to a function of air speed and operable by the elevator control for deriving a voltage representing pitching moment, a servo system representing rate of pitch responsive to said moment voltage for modifying another voltage representing air speed, the modified voltage representing centrifugal force, integrating means controlled by said rate of pitch servo system for indicating pitch attitude, said integrating means having resolving means for deriving a voltage representing a gravity component, and a second servo system representing angle of attack responsive to said centrifugal force and gravity voltages for modifying another voltage representing air speed squared, the modified voltage being opposite in sense to the aforesaid pitching moment voltage for input to said rate of pitch servo system, said angle of attack servo system also being operative to modify another voltage representing air speed squared, the modified voltage representing lift and being opposite in sense to the aforesaid gravity voltage for input to said angle of attack servo system whereby a balance tends to obtain between the aforesaid rate of pitch and angle of attack servo systems.

11. In flight training apparatus having simulated aircraft controls including throttle and elevator controls, flight computing apparatus comprising means responsive to the operation of said controls for deriving flight controlling voltages, a plurality of inter-related and interacting servo systems responsive to said voltages for computing flight variables, one of said servo systems representing rate of pitch being responsive to an elevator control voltage for deriving in turn voltages representing centrifugal force and rate of pitch respectively, an integrating servo system representing pitch responsive to said rate of pitch voltage for deriving a pair of voltages representing gravity components resolved with respect to pitch, pitch attitude apparatus controlled by said pitch integrating servo system, another of said servo systems representing angle of attack being responsive to said centrifugal force voltage and also to one of said gravity component voltages for in turn deriving a voltage representing opposing pitching moment, said opposing pitching moment voltage being opposite in sense to said elevator control voltage for input to said rate of pitch servo system, another servo system representing air speed being responsive to a voltage that is modified by both the throttle control and said air speed servo system to represent thrust, said air speed servo system also being responsive to the other gravity component voltage for in turn deriving voltages representing functions of air speed for modifying said centrifugal force and moment voltages, and indicating means representing an air speed meter controlled by said air speed servo system.

12. In flight simulating apparatus having simulated flight controls, computing apparatus for determining simulated flight conditions including angle of attack, rate of pitch and pitch attitude comprising means responsive to the operation of one of said flight controls for deriving a first controlled quantity representing an angular pitching moment, an angle of attack system for deriving a balancing control quantity representing a reaction moment due to pitching, and integrating means responsive to the sum of said first and balancing control quantities as representing rate of pitch for determining pitch attitude, and pitch indicating means responsive to said integrating means.

13. In flight simulating apparatus having simulated flight controls, computing means for determining simulated flight conditions including angle of attack, rate of pitch and pitch attitude comprising means responsive to the operation of one of said flight controls for deriving a voltage representing an angular pitching moment, an electrical system representing angle of attack for deriving a balancing voltage representing a reaction moment due to pitching, and means for algebraically summing said moment voltages and for integrating the quantity represented by said summation for determining and indicating pitch attitude.

14. In flight simulating apparatus having simulated flight controls, computing apparatus for determining simulated flight conditions including angle of attack, rate of pitch and pitch attitude comprising means responsive to the operation of one of said flight controls for deriving a first control quantity representing an angular pitching moment, angle of attack means for deriving a balancing control quantity representing a reaction moment due to pitching, means for summing said first and balancing control quantities for determining rate of pitch and integrating means operable according to changes in the sum of said control quantities for determining pitch attitude.

15. In flight simulating apparatus having simulated flight controls, computing apparatus for determining simulated flight conditions including angle of attack, rate of pitch and pitch attitude comprising means responsive to the operation of one of said flight controls for deriving a voltage representing an angular pitching moment, angle of attack means for deriving a balancing voltage representing a reaction moment due to pitching, means for algebraically summing said moment voltages for determining rate of pitch and integrating means operable according to changes in the algebraic sum of said voltages for determining pitch attitude.

16. In flight simulating apparatus having simulated flight controls, computing apparatus for determining simulated flight conditions of aircraft including rate of movement about an aircraft axis and aircraft attitude comprising means responsive to the operation of one of said flight controls for deriving a first control quantity representing an angular turning moment with respect to said axis, means responsive to said control quantity for deriving a balancing control quantity representing a reaction moment due to the moment causing movement about said axis, the aforesaid means including means for summing said first and balancing control quantities for determining rate of angular movement with respect to said axis and integrating means operable according to changes in said control quantities for determining aircraft attitude with respect to a fixed plane.

17. In flight simulating apparatus having simulated flight controls, computing apparatus for determining simulated flight conditions including air speed, rate of pitch, angle of attack and pitch attitude comprising electrical means responsive to the operation of one of said flight controls for deriving a first voltage representing a pitching moment, means for deriving a voltage representing air speed, means for representing angle of attack, a potentiometer energized by said air speed voltage and adjustable by said angle of attack means for deriving a balancing voltage representing reaction pitching moment according to a combined effect of air speed and angle of attack, means for alegbraically summing said first and balancing voltages, a first integrating means operable according to the algebraic sum of said voltage for determining rate of pitch and a second integrating means operable in response to said first integrating means for determining pitch attitude.

18. In flight simulating apparatus having simulated flight controls, computing apparatus responsive to the operation of said controls for simulating flight conditions including rate of pitch, angle of attack, and pitch attitude comprising a first means responsive to the operation of one of said flight controls for deriving a first control quantity representing pitching moment, a second means responsive to said pitching moment quantity for deriving a second control quantity representing a pitching velocity factor, means operable according to the combined effect of said second derived quantity and respective control quantities from said computing apparatus representing a gravity factor and lift for computing angle of attack, means for deriving said lift quantity according to computed angle of attack, means also operable according to the computed angle of attack for deriving a balancing control quantity representing reaction pitching moment, and means for integrating the sum of said first and balancing moment quantities for representing pitch attitude.

19. In flight simulating apparatus having simulated flight controls, computing apparatus responsive to the operation of said controls for simulating flight conditions including rate of pitch, angle of attack and pitch attitude comprising a first means responsive to the operation of one of said flight controls for deriving a first control quantity representing pitching moments, a second means responsive to said pitching moment quantity for deriving a second control quantity representing a pitching velocity factor, means operable according to the combined effect of said second derived quantity and respective control quantities representing a gravity factor and lift for computing angle of attack, means for deriving said lift quantity according to computed angle of attack, means for deriving said lift quantity according to computed angle of attack and means also operable according to the computed angle of attack for deriving a balancing control quantity representing reaction pitching moment, said second means summing said first and balancing moment quantities and integrating means operable according to changes in the resulting sum of said quantities for determining pitch attitude, said integrating means also being operative to derive the aforesaid gravity factor control quantity and to position a pitch indicator.

20. In flight simulating apparatus having simulated flight controls, computing apparatus for simulating flight conditions including air speed, rate of pitch, angle of attack and pitch attitude comprising means responsive to the operation of one of said flight controls for deriving a first voltage representing pitching moment, means for deriving voltages representing functions of air speed, means responsive to said pitching moment voltage for deriving a voltage representing a pitching velocity factor, means operable according to the combined effect of said pitching velocity voltage and respective voltages representing a gravity factor and lift for computing angle of attack, means energized by an air speed voltage and operable according to computed angle of attack for deriving said lift voltage, and means also energized by an air speed voltage and operable according to the computed angle of attack for deriving a balancing voltage representing reaction pitching moment, means for algebraically summing said pitching moment and balancing moment voltages and integrating means operable according to changes in the resulting algebraic sum of said voltages for determining pitch attitude, said integrating means also being operative to derive the aforesaid gravity factor voltage and to position a pitch indicator.

21. A flight computing system for simulating flight conditions comprising controls individually adjustable to produce electric signals representing respectively flight controlling factors, means responsive to one of said controls for producing electric signal representing rate of pitch, a plurality of inter-acting electrical systems responsive to electric signals from said controls for representing various other flight conditions including air speed and angle of attack, the electrical system representing air speed being responsive jointly to electrical signals from another of said controls and from other of said electrical systems, the electrical system representing angle of attack being responsive to electric signal produced jointly by the rate of pitch means and air speed system, and an electrical integrating system responsive to rate of pitch electric signals for representing pitch attitude.

22. A flight computing system for simulating flight conditions comprising controls individually adjustable to produce potential representing respectively flight controlling factors, means responsive to one of said controls for producing potential representing rate-of-pitch, a plurality of inter-acting servo systems responsive to potential from said controls for representing various other flight conditions including air speed and angle of attack, the servo system representing air speed being responsive jointly to potential from another of said controls and from other of said servo systems, the servo system representing angle of attack being responsive to potential produced jointly by the rate-of-pitch means and air speed servo system, and an integrating servo responsive to rate-of-pitch potential for representing pitch attitude.

23. A flight computing system for simulating flight conditions comprising simulated throttle and elevator controls individually adjustable to produce potential representing respectively flight controlling factors, means responsive to said elevator control for producing potential representing rate-of-pitch, a plurality of inter-acting servo systems responsive to potential from said controls for representing various other flight conditions including air speed and angle of attack, the servo system representing air speed being responsive jointly to potential from said throttle control and from other of said servo systems, voltage deriving means responsive to one of said air speed and rate-of-pitch means and energized by voltage from the other of said means for deriving potential representing centrifugal force, the servo system representing angle of attack being responsive to said force potential, and an integrating servo system responsive to rate-of-pitch potential for representing pitch attitude.

24. In flight training apparatus having simulated flight controls and flight computing apparatus responsive to the operation of said controls for computing flight variables including respective means representing air speed, rate of pitch and angle of attack, means for simulating aerodynamic effects of wing flaps comprising means related to the air speed means for deriving voltages according to a function of simulated air speed, simulated flap control means operable by the pilot for modifying respective voltages to produce three voltages representing drag moment and lift, said computing apparatus being responsive to the modified voltages for controlling the respective means for varying respectively flight variables including air speed, rate of pitch and angle of attack, and integrating means responsive to the modified voltage representing said rate of pitch and derived by said computing apparatus for indicating pitch attitude.

25. Flight simulating apparatus comprising simulated flight controls including an elevator control for deriving flight controlling voltages, and a flight computing system including a plurality of inter-related and inter-acting servo mechanisms responsive to said voltages for computing flight variables, one of said servo mechanisms being controlled according to a voltage derived by said elevator control for representing pitch and another of said servo mechanisms being controlled according to pitch and other simulated flight factors for representing air speed, said air speed servo mechanism having means operative when the simulated air speed reaches a predetermined low value for modifying the input to said pitch servo mechanism whereby increase in glide angle at low air speed is simulated.

26. In flight training apparatus having simulated aircraft controls, flight computing apparatus comprising means responsive to the operation of said controls for deriving flight controlling voltages, a plurality of inter-related and inter-acting servo controlled potentiometer systems responsive to said voltages for computing flight variables including air speed, angle of attack, roll and pitch, one of said servo systems representing air speed having potentiometer means for deriving a glide correction potential representing a relationship between angle of attack and air speed, another of said servo systems representing roll having functional potentiometer means for resolving said glide correction potential into components according to roll, another of said servo systems representing pitch attitude having means for selecting according to positive or negative pitch attitude the proper polarity relation of said component potential, and indicating means representing a vertical air speed meter arranged to be affected by the aforesaid selected glide correction potential.

27. In flight computing apparatus for flight simulators having simulated aircraft controls and means for deriving control signals in accordance with operation of said controls, a plurality of inter-related and inter-acting electrical systems representing respectively simulated flight variables including air speed, angle of attack and pitch attitude, operable in response to said control signals for computing said flight variables, and for producing signals representing the respective variables, and means for combining the angle of attack ($\alpha$) and pitch ($\theta$) signals to produce electric signals representing functions of the flight angle ($\theta-\alpha$), certain of said electrical systems utilizing said flight angle signals for representing flight conditions.

28. In flight computing apparatus for flight simulators having simulated aircraft controls and means for deriving control voltages in accordance with operation of said controls, a plurality of inter-related and inter-acting servo systems representing respectively simulated flight variables including air speed, angle of attack and pitch attitude, operable in response to said control voltages for computing said flight variables, and potentiometer means jointly controlled by said angle of attack ($\alpha$) and pitch ($\theta$) servo systems for deriving voltages representing functions of the flight angle ($\theta-\alpha$), certain of said servo systems utilizing said flight angle voltages for computing flight variables including air speed.

29. In flight computing apparatus for flight simulators having simulated aircraft controls and means for deriving control voltages in accordance with operation of said controls, a plurality of inter-related and inter-acting servo systems representing respectively flight variables including air speed, angle of attack, roll and pitch, operable in response to said control voltages for computing said flight variables and cosinusoidal potentiometer means operable jointly in response to said angle of attack ($\alpha$) and pitch ($\theta$) servo systems for deriving gravity component voltages representing cosinusoidal functions of the flight angle ($\theta-\alpha$), said air speed servo system utilizing one of said component voltages for computing air speed, another component voltage being resolved by said roll servo system into a gravity component for side-slip computation.

30. In flight simulating apparatus for trainers having simulated flight controls, flight computing apparatus comprising means responsive to the operation of said controls for deriving flight controlling voltages, a plurality of inter-related and inter-acting servo systems responsive to said voltages for computing flight variables including air speed, angle of attack, rate of pitch and pitch, one of said servo systems representing rate of pitch being responsive to one of said flight controlling voltages representing elevator pitching moment and having means energized according to function of air speed for deriving a voltage representing centrifugal force, said rate of pitch servo system also operative to derive a voltage according to rate of pitch for operating a pitch integrating servo system, another of said servo systems representing angle of attack being responsive to said centrifugal force voltage and to a voltage representing a gravity component derived by the aforesaid pitch servo system and having means energized according to a function of air speed for deriving a voltage representing opposing moment for input to said rate of pitch servo system whereby said servo system tends to operate in damped oscillation after a change in air speed or attitude of the aircraft thereby simulating the damped wave path or fugoid incident to vertical oscillation of aircraft.

31. A flight simulator computing system comprising a plurality of voltage deriving means, simulated aircraft controls including throttle and rudder controls associated with said means adjustable for deriving separate voltages representing respectively thrust and turning moment about aircraft axes, a plurality of inter-related and inter-acting electrical systems each representing a principal flight relationship including air speed, rate of yaw and side-slip and being responsive to said derived voltages for jointly computing flight variables, the electrical system representing rate of yaw being jointly responsive to a plurality of voltages including one of the aforesaid derived voltages representing rudder turning moment, a voltage representing thrust and a voltage derived from the air speed and side-slip electrical system representing a side force opposing yawing, and integrating apparatus controlled according to the resultant of said voltages for positioning a simulated direction compass to represent compass heading.

32. In flight simulating apparatus having simulated flight controls, a flight computing system comprising voltage deriving means, a yaw control operatively connected to said deriving means for deriving a voltage representing turning moment, a servo system representing rate of yaw responsive to said moment voltage for deriving another voltage representing centrifugal force, means for resolving according to roll and pitch a gravity representing voltage, and a second servo system representing side-slip responsive to said force and gravity voltages for deriving according to simulated air speed another voltage representing opposing lateral force tending to balance said moment voltage input to said rate of yaw servo system, said side-slip derived voltage also being opposite in sense to the aforesaid centrifugal force voltage for input to said side-slip servo system, said opposite sense voltages tending to establish an equilibrium position for the aforesaid rate of yaw and side-slip servo systems.

33. In flight simulating apparatus having simulated flight controls, a flight computing system comprising voltage deriving means, a yaw control operatively connected to said deriving means for deriving a voltage representing turning moment, a motor operated servo system representing rate of yaw responsive to said moment voltage for deriving another voltage representing centrifugal force, a second motor operated servo system representing side-slip responsive to said centrifugal force voltage for deriving another voltage representing a lateral force tending to balance said turning moment voltage input to said rate of yaw servo system, said side-slip servo system also responsive to a voltage representing gravity force according to simulated pitch and roll, said gravity voltage being opposite in sense to the aforesaid centrifugal force voltage, said opposite sense voltages tending to establish an equilibrium position for the aforesaid rate of yaw and side-slip servo systems, and indicating elements representing bank and turn indicators arranged separately to be positioned according to the individual operation of said side-slip and rate of yaw servos respectively.

34. In flight simulating apparatus having simulated flight controls, a flight computing system comprising voltage deriving means, a yaw control operatively connected to said deriving means for deriving a voltage representing turning moment, a servo system representing rate of yaw responsive to said turning moment voltage for deriving another voltage representing centrifugal force, a second servo system representing side-slip responsive to said centrifugal force voltage for deriving another voltage opposite in sense to the aforesaid turning moment voltage tending to balance said turning moment voltage input to said rate of yaw servo system, said side-slip derived voltage also being opposite in sense to the aforesaid centrifugal force voltage for input to said side-slip servo system, said rate of yaw servo system also being operative to derive a voltage proportional to the aforesaid turning moment voltage, and integrating means controlled by said proportional voltage for establishing the instant compass heading of the flight simulating apparatus.

35. In flight simulating apparatus having simulated flight controls, a flight computing system comprising electric signal deriving means, a yaw control operatively connected to said deriving means for deriving electric signal representing turning moment, an electrical system representing rate of yaw responsive to said moment signal for deriving another electrical signal representing centrifugal force, means for resolving according to roll and pitch an electrical signal representing gravity, and an electrical system representing side-slip responsive to said force and gravity signals for producing in combination with another electrical system representing air speed another electrical signal representing opposing lateral force tending to balance said moment signal input to said rate of yaw system, said opposite sense signals tending to establish an equilibrium position for the aforesaid rate of yaw and side-slip systems.

36. In flight simulating apparatus having simulated flight controls, a flight computing system comprising voltage deriving means, a yaw control operatively connected to said deriving means for deriving a voltage representing turning moment, a servo system representing rate of yaw responsive to said moment voltage for deriving another voltage representing centrifugal force, means for resolving according to roll and pitch a voltage representing gravity, and a system representing side-slip responsive to said force and gravity voltages for producing in combination with another servo system representing air speed another voltage representing opposing lateral force tending to balance said moment voltage input to said rate of yaw servo system, said opposite sense voltages tending to establish an equilibrium position for the aforesaid rate of yaw servo and side-slip systems.

37. In flight simulating apparatus having a plurality of simulated aircraft controls, electrical computing means for determining simulated flight conditions including rate of yaw and side-slip comprising means responsive to the operation of one of said controls for deriving a voltage representing a yawing moment, means jointly responsive to the operation of said control and other controls for deriving a voltage representing a gravity component factor along the X—Y plane of the aircraft, integrating means responsive to said moment voltage for deriving another voltage representing a function of rate of yaw, and a second integrating means jointly responsive to said yaw rate function voltage and said gravity factor voltage for indicating a relative position representing side-slip.

38. In flight simulating apparatus having a plurality of simulated aircraft controls, computing means for representing simulated flight conditions including rate of yaw, side-slip and roll comprising means responsive to the operation of one of said controls for deriving a voltage representing a yawing moment, means responsive to the operation of another of said controls for deriving a voltage representing an angular roll velocity, integrating means responsive to said yaw moment voltage for deriving other voltages representing conditions involving yaw, a second integrating means responsive conjointly to said roll velocity voltage and one of said yaw voltages for indicating a relative position representing roll, means adjustable by said second integrating means for deriving a voltage representing a gravity component in the direction of side-slip and a third integrating means responsive conjointly to another of said yaw voltages and said gravity component voltage for indicating a relative position representing side-slip.

39. In flight training apparatus having simulated flight controls including rudder and elevator controls and flight computing apparatus including a plurality of inter-related and inter-acting servo mechanisms responsive to the operation of said controls for indicating respectively the aircraft compass bearing and pitch attitude, means for simulating magnetic compass indication comprising synchronous transmitting means operable by one of said servo mechanisms and positioned according to the compass bearing of the simulated flight, indicating means representing a magnetic compass actuated by said synchronous means, and means operable according to another of said servo mechanisms representing pitch for reversing the operation of the compass bearing servo mechanism to indicate compass direction reversal when the pitch attitude passes through the zenith and nadir positions.

40. In flight training apparatus having simulated flight controls including rudder and elevator controls and flight computing apparatus including a plurality of inter-related and inter-acting servo mechanisms responsive to the operation of said controls for indicating respectively the aircraft compass bearing and pitch attitude, means for simulating magnetic compass indication comprising an indicator operable by one of said servo mechanisms according to the compass bearing of the simulated flight, and switching means operable according to another of said servo mechanisms representing pitch for reversing the power input to the compass bearing servo mechanism whereby compass direction reversal is indicated when the pitch attitude passes through the zenith and nadir positions.

41. In flight training apparatus having simulated aircraft controls, flight computing apparatus comprising means responsive to the operation of said controls for deriving flight controlling voltages, a plurality of inter-related and inter-acting servo systems responsive to said voltages for computing flight variables including side-slip and rate of yaw, two of said servo systems representing side-slip and rate of yaw respectively being inter-related whereby the rate of yaw servo system which is responsive to one of said flight controlling voltages operates to derive a voltage representing centrifugal force for input to said side-slip servo system and said side-slip servo system operates to derive potential representing opposing side force for input to both said side-slip and rate of yaw servo systems, the input circuits to said side-slip and rate of yaw servo systems including impedances proportioned to cause damped oscillation operation of said rate of yaw servo system whereby a "snaking" characteristic of aircraft is simulated.

42. In flight training apparatus having simulated flight controls including rudder and elevator controls and the flight computing apparatus including a plurality of inter-related and inter-acting electrical systems responsive to the operation of said controls for indicating respectively the aircraft compass bearing and pitch attitude, means for simulating magnetic compass indication comprising transmitting means operable by one of said electrical systems for representing position according to the compass bearing of the simulated flight, indicating means representing a magnetic compass responsive to said transmitting means, and means operable according to another of said electrical systems representing pitch for reversing the operation of the compass bearing electrical system to indicate compass direction reversal when the pitch attitude passes through the zenith and nadir positions.

43. In flight training apparatus having simulated aircraft controls including rudder, aileron and elevator controls, flight computing apparatus comprising means responsive to the operation of said controls for deriving flight controlling voltages, a plurality of inter-related and inter-acting servo systems responsive to said voltages for computing flight variables, one of said servo systems representing rate of yaw being responsive to a rudder derived voltage representing turning moment for deriving voltages representing respectively centrifugal force, damping, and rate of yaw, an integrating servo system representing azimuth responsive to said rate of yaw voltage, indicating means representing a direction compass controlled by said azimuth servo system, other servo systems representing roll and pitch respectively being responsive to aileron and elevator derived voltages respectively, said roll and pitch servo systems jointly controlling indicating means representing an artificial horizon and having resolving means operable according to the operation of the respective systems, another servo system representing side-slip being responsive to the aforesaid centrifugal force voltage, a voltage representing opposing side force, and to a voltage representing a gravity component from said roll and pitch resolving means, said side-slip servo system deriving the potential representing said opposing side force for said input to said side-slip servo and to the rate of yaw servo systems, and indicating means representing a ball-bank indicator controlled by said side-slip servo system.

44. In flight training apparatus having simulated aircraft controls including rudder, aileron, elevator and throttle controls, flight computing apparatus comprising means responsive to the operation of said controls for deriving flight controlling voltages, a plurality of inter-related and inter-acting servo systems responsive to said voltages for computing flight variables, means for deriving equal voltages of opposite instant polarities modified according to throttle control and simulated air speed to represent thrust, one of said thrust voltages being modified according to air speed to represent thrust moment, one of said servo systems representing rate of pitch being responsive to an elevator control voltage and also to the thrust moment voltage for deriving computing voltages for other servo systems representing angle of attack and pitch, another servo system representing roll being responsive both to an aileron control voltage representing moment and to the thrust voltage of opposite instant polarity, said roll and pitch servo systems having means for resolving gravity representing voltages into components and being operatively connected respectively to indicators representing the roll and pitch elements of an artificial horizon, another servo system representing rate of yaw being responsive to a rudder control voltage representing turning moment and also to said thrust voltage of opposite instant polarity for deriving a voltage representing centrifugal force, another servo system representing side-slip being responsive to said centrifugal force voltage and to potential representing a gravity component derived from said pitch and roll servo systems, and an indicator representing a ball-bank indicator controlled by said side-slip servo system, said roll servo system also being responsive to a voltage derived by said side-slip system for modifying the roll operation.

45. In flight simulating apparatus having simulated flight controls for controlling the movement of an aircraft about its X, Y and Z axes, a flight computing system comprising voltage deriving means operable by the rudder control for deriving a voltage representing Z axis moment, a second voltage deriving means operable by the aileron control for deriving another voltage representing X axis moment, a first servo system representing rate of yaw responsive to said Z axis moment voltage for deriving another voltage representing centrifugal force, a second servo system representing side-slip controlled according to said force voltage for deriving another voltage opposite in sense to the aforesaid moment voltage for input to said rate of yaw servo system, the derived side-slip voltage also representing opposing side force and being opposite in sense to the aforesaid force voltage for input to said side-slip servo system, and a third servo system representing roll responsive to said X axis moment voltage for deriving a voltage representing the gravity component acting along the Y axis, said gravity voltage being an input to said side-slip servo system and opposite in sense to said centrifugal force voltage for positioning said side-slip servo system to represent side-slip.

46. In flight training apparatus for simulating aircraft having simulated elevator, rudder and aileron aircraft controls, flight computing apparatus comprising means responsive to the operation of said controls for deriving flight controlling voltages, a plurality of inter-related and interacting servo systems responsive to said voltages for computing flight variables, one of said servo systems representing rate of pitch being responsive to an elevator derived voltage representing pitching moment for in turn deriving another voltage representing centrifugal force, another servo system representing angle of attack responsive to said centrifugal force voltage for deriving another voltage representing moment that is opposite in sense to said pitching moment voltage for input to said rate of pitch servo system, said rate of pitch servo system also being operative to derive a voltage representing rate of pitch, pitch integrating means controlled by said rate of pitch voltage for changing the instant pitch attitude of the flight simulating apparatus, means representing the vertical attitude of the aircraft controlled by said integrating means, said integrating means likewise having resolving means for deriving voltages representing gravity components according to pitch attitude, another of said servo systems representing air speed being responsive to said gravity component voltages, an air speed indicator responsive to the operation of said air speed servo system, said air speed system having means for deriving voltages representing functions of air speed for modifying the aforesaid centrifugal force and moment voltages, another of said servo systems representing roll being responsive to an aileron derived voltage for controlling a plurality of voltage resolving means energized by voltages derived from the servo systems, and indicating means for representing the banked attitude of the aircraft controlled by said roll servo system, another of said servo systems representing rate of yaw being responsive to a rudder derived voltage for in turn deriving a voltage representing centrifugal force, another of said servo systems representing side-slip being responsive to said yaw derived centrifugal force voltage for deriving potential representing damping for effecting the operation of both said side-slip and rate of yaw servo systems, said side-slip system also being responsive to a voltage representing a side-slip gravity component resolved from said roll servo system for opposing said centrifugal force voltage, another of said servo systems representing heading being responsive to a voltage representing rate of yaw derived from said rate of yaw servo system and indicating means representing direction controlled by said heading system.

47. In grounded flight training apparatus having simulated aircraft controls including aileron, elevator and rudder controls, flight computing apparatus comprising means responsive to the operation of said controls for deriving basic flight factor voltages, a plurality of inter-related electrical systems responsive to said voltages for computing flight variables, one of said systems representing rate-of-pitch being responsive to an elevator control voltage for deriving a voltage representing rate-of-pitch, another of said systems representing rate-of-yaw, another of said systems representing roll attitude being responsive to an aileron control voltage and having cosinusoidal means for resolving voltages into component voltages in a reference Cartesian coordinate system according to roll, another of said systems representing pitch attitude being responsive to said rate-of-pitch voltage and also having cosinusoidal means for resolving voltages into components in said coordinate system according to pitch, and said roll and pitch systems jointly resolving said rate-of-pitch and rate-of-yaw voltages into components with respect to horizontal reference axis of said coordinate system, and another of said systems representing azimuth being responsive to resultant resolved component voltages from said pitch and roll systems with respect to said horizontal axis for operating simulated direction equipment.

48. In flight simulating means, a flight computing system having simulated aircraft controls and electrical means responsive to the operation of said controls for computing flight variables, said electrical means comprising voltage deriving means operable respectively by said aircraft controls, a plurality of inter-related electrical systems including rate-of-pitch, rate-of-yaw, and rate-of-roll systems responsive respectively to derived control voltages for in turn producing voltages representing linear and angular rates of movement of the aircraft with respect to a set of coordinates axes representing the three aircraft axes, resolving means for referring said rate voltages to a second set of coordinate axes representing fixed horizontal and vertical reference axes, a plurality of integrating servo systems controlled respectively by said rate voltages as referred to said second set of axes for computing and indicating the respective instant aircraft attitude with reference to said fixed horizontal and vertical axes, and indicating instruments representing respectively an artificial horizon, and a gyro compass operatively connected to said integrating servo systems.

49. In flight training apparatus having simulated aircraft controls, flight computing apparatus comprising means responsive to the operation of said controls for deriving flight controlling voltages, a plurality of inter-related and interacting servo systems responsive to said voltages for computing flight variables including roll, pitch, angle of attack, rate of pitch and rate of yaw, one of said servo systems representing rate of pitch being responsive to an elevator control voltage for deriving a voltage representing rate of pitch, another of said servo systems representing roll being responsive to an aileron control voltage and having cosinusoidal means for resolving said rate of pitch voltage into component voltages according to roll, another of said servo systems representing pitch being controlled by said rate of pitch servo system and having cosinusoidal means for deriving potentials representing a cosinusoidal function of pitch, and means synchronized with said roll servo system for selecting the proper polarity of said rate of pitch and pitch function potentials for use respectively in other servo systems representing rate of yaw and angle of attack so as to maintain proper trigonometric signs in the computation of the flight variables rate of yaw and angle of attack.

50. In flight training apparatus having simulated aircraft controls, flight computing apparatus comprising means responsive to the operation of said controls for deriving flight controlling voltages, a plurality of inter-related electrical systems responsive to said voltages for computing variables, one of said systems representing rate of pitch being responsive to an elevator control voltage for deriving a voltage representing rate of pitch, another of said systems representing rate of yaw being responsive to a yaw control voltage for deriving a voltage representing rate of yaw, another of said systems representing roll being responsive to an aileron control voltage and having cosinusoidal means for resolving said rate of pitch and rate of yaw voltages into component voltages according to roll, another of said systems representing pitch being responsive to component voltages from said roll system for positioning pitch attitude apparatus, and another system representing azimuth also responsive to component voltages from said roll system for operating simulated direction equipment.

51. Flight computing apparatus for aircraft simulators comprising simulated flight controls including an aileron control, means operable by said controls for deriving flight control voltages, and a plurality of interrelated and interacting electrical systems controlled by said flight voltages for computing and indicating flight variables, one of said systems representing rate of roll being responsive to a voltage derived by said aileron control and representing moment, said rate of roll system having means for deriving other potential corresponding to rate of roll for input respectively to an integrating system for representing the banked attitude of the aircraft and to the rate of roll system for representing a reacting rolling moment.

52. Flight computing apparatus for aircraft simulators comprising simulated flight controls including in aileron control, means operable by said controls for deriving flight control voltages, and a plurality of interrelated and interacting electrical systems controlled by said flight voltages for computing and indicating flight variables, one of said systems representing angle of attack having means for modifying the aileron derived control voltage representing moment according to angle of attack, another of said systems being responsive to said modified moment voltage and representing rate of roll, said rate of roll system having means for deriving other voltages according to rate of roll for input respectively to said angle of attack system and to an integrating system for representing the banked attitude of the aircraft, the said input to the angle of attack system being modified according to side-slip by another system that is controlled to represent side-slip.

53. Flight computing apparatus for aircraft simulators comprising simulated flight controls including an aileron control, means operable by said controls for deriving flight control voltages, and a plurality of interrelated and interacting electrical systems controlled by said flight voltages for computing and indicating flight variables, one of said systems representing rate of roll being responsive to a voltage derived by said aileron control and representing moment, said rate of roll system having means for deriving other potential corresponding to rate of roll, another of said systems representing angle of attack having potentiometer means energized according to roll moment potential for deriving in turn a voltage for input to said rate of roll system, said potentiometer means being arranged so that said derived voltage represents a reacting rolling moment for damping of roll during normal low angle of attack conditions and for aiding roll during high angle of attack conditions, another of said systems representing side-slip having means for modifying rate of roll potential for controlling said angle of attack system, said angle of attack system also having means for modifying a voltage representing side-slip for controlling said rate of roll system in simulation of rolling moment due to side-slip, and an integrating system also controlled by rate of roll potential for representing the banked attitude of the aircraft.

54. Flight computing apparatus for aircraft simulators comprising simulated flight controls including an aileron control, means operable by said controls for deriving flight control voltages, and a plurality of interrelated and interacting electrical systems controlled by said flight voltages for computing and indicating flight variables, one of said systems representing rate of roll being responsive to a voltage derived by said aileron control and representing moment, said rate of roll system having means for deriving other potential corresponding to rate of roll, another of said systems representing angle of attack having potentiometer means energized according to rate of roll potential for deriving in turn a voltage for input to said rate of roll system, said potentiometer means being arranged so that said derived voltage represents a reacting rolling moment for damping of roll during normal low angle of attack conditions and for aiding roll during high angle of attack conditions.

55. Flight computing apparatus for simulated flight of aircraft comprising simulated aircraft controls, means operable by said controls for deriving flight control voltages, and a plurality of interrelated and interacting electrical systems controlled by said flight voltages for computing and indicating flight variables including servo controlled voltage deriving means the setting of which represents air speed and an electrical summing system the input of which includes one of said flight control voltages, the voltage output of said summing system representing a rate of aircraft movement about an axis of the aircraft and energizing the aforesaid voltage deriving means according to the magnitude and sense of said rate whereby the derived voltage resulting from the setting of the air speed servo represents centrifugal force, another of said electrical systems being responsive to said centrifugal force voltage for computing another aerodynamic condition of the aircraft.

56. Flight computing apparatus for aircraft simulators comprising simulated flight controls, means operable by said controls for deriving flight control voltages, and a plurality of interrelated and interacting electrical systems controlled by said flight voltages for computing and indicating flight variables, said systems including a servo controlled potentiometer group the setting of which represents air speed and an electrical summing system energized by one of said flight control voltages, the output of said summing system representing a rate of aircraft movement about an axis of the aircraft, one of said air speed potentiometers being designed for functional representation of air speed and being energized according to the magnitude and sense of said rate from said summing system, the derived voltage from said potentiometer representing centrifugal force and being an input to another of said electrical systems in turn representing one of the aerodynamic conditions of the aircraft including respectively angle of attack and side-slip.

57. Flight computing apparatus for aircraft simulators comprising simulated flight controls, means operable by said controls for deriving flight control voltages, and a plurality of interrelated and interacting servo systems controlled by said flight voltages for computing and indicating flight variables, said servo systems including a servo controlled potentiometer group the setting of which represents air speed and a line amplifier energized by one of said flight control voltages, the output of said amplifier representing a rate of aircraft movement about an axis of the aircraft, one of said air speed potentiometers being designed for functional representation of air speed and being energized according to the magnitude and sense of said rate from the output of said line amplifier, the derived voltage from said potentiometer representing centrifugal force and being an input to another of said servo systems simulating an aerodynamic condition of the aircraft.

58. In flight simulating apparatus having simulated flight controls, a flight computing system comprising voltage deriving means operable by one of said controls for deriving a voltage representing moment, a first servo system representing angular rate of change of aircraft attitude responsive to said moment voltage for deriving another voltage representing force and a second servo system representing a flight condition responsive to said force voltage for deriving another voltage opposite in sense to the aforesaid moment voltage for input to said first servo system, said second servo system also being operative to derive another voltage opposite in sense to the aforesaid force voltage for input to said second servo system whereby a balance tends to obtain between the aforesaid first and second servo systems, and integrating means responsive to another voltage representing said rate of change and derived by said first servo system for positioning an indicator.

59. Flight computing apparatus for simulated flight of aircraft comprising simulated aircraft controls, means operable by said controls for deriving flight control voltages, and a plurality of interrelated and interacting electrical systems controlled by said flight voltages for computing and indicating flight variables, said systems including a servo system which represents air speed and another electrical system responsive to one of said flight control voltages for representing a rate of aircraft movement about an axis of the aircraft, said air speed system and the functional operation of said rate system being correlated for jointly deriving a voltage representing centrifugal force for input to another of said electrical systems for computing an aerodynamic condition of the aircraft.

60. Flight computing apparatus for aircraft simulators comprising simulated flight controls, means operable by said controls for deriving electric signals for flight control purposes, and a plurality of inter-related and interacting electrical systems controlled by said flight signals for computing and indicating flight variables, said electrical systems including an electrical system the condition of which represents air speed, said air speed system having signal deriving means, and a line amplifier energized by one of said flight signals, the output signal of said amplifier representing a rate of aircraft movement about an axis of the aircraft, said output signal energizing said air speed deriving means according to the represented magnitude and sense of said rate for deriving electric signal representing centrifugal force, said signal energizing another of said electrical systems simulating an aerodynamic condition of the aircraft.

61. Flight computing apparatus for aircraft simulators comprising simulated flight controls, means operable by said controls for deriving flight control voltages, and a plurality of inter-related and inter-acting electrical systems controlled by said flight voltages for computing and indicating flight variables, said systems including a servo controlled potentiometer group the setting of which represents air speed and an electrical summing system energized by one of said flight voltages, the output of said summing system representing rate of yaw, one of said air speed potentiometers being designed for functional representation of air speed and being energized according to the magnitude and sense of rate of yaw from said summing system, the derived voltage from said potentiometer representing centrifugal force and being an input to another of said electrical systems for computing side-slip.

62. Flight computing apparatus for aircraft simulators comprising simulated flight controls, means operable by said controls for deriving flight control voltages, and a plurality of interrelated and interacting electrical systems controlled by said flight voltages for computing and indicating flight variables, said systems including a servo controlled potentiometer group the setting of which represents air speed and an electrical summing system energized by potential representing centrifugal force and gravity, the output of said summing system representing side-slip, one of said air speed potentiometers being designed for functional representation of air speed and being energized according to the magnitude and sense of side-slip from said summing system, the derived voltage from said potentiometer representing an aerodynamic force acting on the aircraft and being an input to another of said electrical systems for computing rate of yaw.

63. Flight computing apparatus for aircraft simulators comprising simulated flight controls, means operable by said controls for deriving flight control voltages, and a plurality of interrelated and interacting electrical systems controlled by said flight voltages for computing and indicating flight variables, said systems including a servo controlled potentiometer group the setting of which represents air speed and an electrical summing system energized by one of said flight voltages, the output of said summing system representing rate of pitch, one of said air speed potentiometers being designed for functional representation of air speed and being energized according to the magnitude and sense of rate of pitch from said summing system, the derived voltage from said potentiometer representing centrifugal force and being an input to another of said electrical systems for computing angle of attack.

64. Flight computing apparatus for aircraft simulators comprising simulated flight controls, means operable by said controls for deriving flight controls voltages, and a plurality of interrelated and interacting systems controlled by said flight voltages for computing and indicating flight variables, said servo systems including a servo controlled potentiometer group the setting of which represents air speed and a line amplifier energized by one of said flight voltages, the output of said amplifier representing rate of pitch, one of said air speed potentiometers being designed for functional representation of air speed and being energized according to the magnitude and sense of rate of pitch from the output of said line amplifier, the derived voltage from said potentiometer representing centrifugal force and being an input to another of said servo systems for computing angle of attack.

65. In flight simulating apparatus for aircraft trainers having simulated flight controls including a throttle control, a flight computing system comprising voltage deriving means adjustable by said throttle control for producing voltage representing a function of horsepower and a servo-operated potentiometer group responsive to simulated flight factors and arranged to be positioned so as to represent air speed, said group including a potentiometer adapted to be energized by said horsepower function voltage and having means adjustable according to variations in the simulated air speed for deriving a voltage corresponding for a constant value of horsepower voltage approximately to the reciprocal of air speed for representing thrust, said air speed servo group being responsive to variations in said thrust voltage for varying the simulated air speed.

66. In flight simulating apparatus for aircraft trainers having simulated flight controls including a throttle control, a flight computing system comprising voltage deriving means adjustable by said throttle control for producing voltage representing a function of horsepower and a servo-operated potentiometer group responsive to simulated flight factors and arranged to be positioned so as to represent air speed, said group including a potentiometer contoured generally according to the relationship between thrust and air speed adapted to be energized by said horsepower function voltage and having servo-operated means adjustable according to variations in the simulated air speed for deriving a voltage representing thrust, and means for causing modification of said thrust voltage according to altitude, said air speed servo group being responsive to variations in the modified thrust voltage for varying the simulated air speed.

67. In flight simulating apparatus for aircraft trainers having simulated flight controls including a throttle and a variable pitch, constant speed propeller control, a flight computing system comprising voltage deriving means individually adjustable by said throttle and said propeller speed control respectively for jointly producing voltage representing a function of horsepower, means operable according to simulated air speed for converting said horsepower function voltage to a voltage representing thrust, and additional means adjustable according to simulated carburetor ice for causing modification of said thrust voltage, said air speed means being energized according to variations in the resultant thrust voltage for determining changes in air speed.

68. In flight training apparatus having a plurality of simulated flight controls including a throttle and means for deriving a voltage representing engine horsepower according to throttle operation, means for simulating carburetor icing comprising means for producing a voltage representing carburetor mixture temperature, electric motive means operable according to a predetermined low value of said temperature voltage for deriving a varying voltage to represent a progressive carburetor icing condition, and means for modifying said horsepower voltage according to said icing condition voltage whereby decreased power is simulated as carburetor icing increases, said motive means also being operable to progressively decrease said derived voltage for simulating de-icing when said temperature voltage increases to a predetermined value.

69. In flight training apparatus having a plurality of simulated flight controls including a throttle, means for deriving a voltage representing engine horsepower according to throttle operation and means controlled according to said horsepower voltage for indicating air speed, means for simulating carburetor icing comprising means responsive to simulated flight and pilot supervised conditions for producing a voltage representing carburetor mixture temperature, means operable according to the magnitude of said temperature voltage for deriving voltage representing a progressive carburetor icing condition, and means for modifying said horsepower voltage according to said icing condition voltage so that decreased air speed is indicated as carburetor icing increases.

70. In flight training apparatus having simulated engine control for deriving control potential, an electric indicator representing a manifold pressure indicator and operable according to said potential for indicating manifold pressure in accordance with engine operation, means for producing a voltage representing carburetor mixture temperature, and means responsive to the magnitude of said temperature voltage for deriving progressively increasing voltage representing a carburetor icing condition and conversely for deriving gradually decreasing voltage representing de-icing, said derived voltage modifying the operation of said indicator to indicate a lower manifold pressure concurrent with an icing condition and vice versa.

71. In flight simulating apparatus for aircraft trainers having simulated flight controls including a throttle control, voltage deriving means adjustable by said throttle control for deriving a voltage representing a function of horsepower, an electric indicator representing a manifold pressure meter responsive to said horsepower voltage for indicating manifold pressure, and means adjustable according to simulated carburetor icing for deriving a voltage opposite in sense to said horsepower voltage for causing said indicator to indicate lower pressure in the presence of an icing condition.

72. In flight simulating apparatus for aircraft trainers having simulated flight controls including a throttle control, a flight computing system comprising voltage deriving means adjustable by said throttle control for producing potential representing a function of horsepower and an electrical computing system the condition of which represents air speed responsive to simulated flight factors, said air speed system adapted to produce jointly with said horsepower function voltage another voltage corresponding for a constant value of horsepower approximately to the reciprocal of air speed for representing thrust, said air speed system being responsive to variations in said thrust voltage for varying the simulated air speed.

73. In flight simulating apparatus for aircraft trainers having simulated flight controls including a throttle and a variable pitch constant speed propeller control, a flight computing system comprising signal deriving means individually adjustable by said throttle and said propeller speed control for deriving signals representing functions of simulated engine power and propeller speed, computing means responsive to said engine power signal and other simulated flight factors for determining air speed, an indicator representing a tachometer, said indicator being responsive within the normal range of simulated propeller pitch operation to the signal derived by said propeller speed control for indicating propeller speed, and means responsive to said air speed computing means according to representations of predetermined high air speeds for producing an over-speed signal for over-riding the propeller speed control signal and causing said indicator to indicate an above normal over-speed condition.

74. In flight simulating apparatus for aircraft trainers having simulated flight controls including a throttle and a variable pitch constant speed propeller control, a flight computing system comprising signal deriving means individually adjustable by said throttle and said propeller speed control respectively for deriving signals representing functions of engine power and propeller speed, an indicator representing a tachometer, said indicator being responsive within the normal range of simulated propeller pitch operation to the signal derived by said propeller speed control for indicating propeller speed, means responsive to said engine power signal and other simulated flight factors for producing a signal representing air speed, and means jointly responsive to said air speed and engine power signals for overriding the propeller speed control signal and causing an underspeed reading at said indicator when both the simulated air speed and engine power decrease to a predetermined joint value.

75. In flight simulating apparatus for aircraft trainers having simulated flight controls including a throttle and a variable pitch, constant speed propeller control, a flight computing system including signal deriving means individually adjustable by said throttle and propeller speed controls respectively for deriving signals representing functions of engine power and propeller speed, means responsive to the engine power signal and other simulated flight factors for producing a signal representing air speed, an electrical indicator representing a tachometer, said indicator being responsive within the normal range of simulated propeller pitch operation to the propeller speed signal for indicating propeller speed, and electronic means controlled jointly by the air speed and engine power signals for over-riding the propeller speed control signal and lowering the reading of said indicator to represent "under-speed' 'in accordance with predetermined minimum joint value of the engine power and air speed signals with reference to the propeller speed signal.

76. In flight simulating apparatus for aircraft trainers having means for simulating flight conditions including altitude, means including said altitude simulating means for deriving potential representing atmospheric air temperature, means for arbitrarily deriving a potential representing the adjustment of carburetor heat control, and an electric indicator representing a carburetor mixture temperature indicator jointly responsive to said potentials.

77. In flight simulating apparatus for aircraft trainers having means for simulating air speed, means for deriving a voltage representing a reference air temperature, means for deriving a voltage dependent in magnitude on the magnitude of said air speed and for modifying said voltage for representing the amount of opening of an oil cooler shutter, and an electric indicator representing an oil temperature indicator jointly responsive to said reference and modified voltages.

78. In flight simulating apparatus for aircraft trainers having means for simulating air speed, means for deriving a voltage representing a reference air temperature, means for deriving a voltage dependent in magnitude on the magnitude of the simulated air speed and for modifying said voltage for representing the amount of opening of cowl flaps, means for deriving a voltage representing the adjustment of the carburetor mixture control, and an electric indicator representing a cylinder head temperature indicator jointly responsive to all said voltages.

79. In flight simulating apparatus for aircraft trainers having simulated flight controls including a throttle control, voltage deriving means responsive to said throttle control for deriving a voltage representing a function of horsepower, an electrical system responsive to said flight controls for computing and representing air speed, said air speed system adapted to produce jointly with said horsepower function voltage another voltage representing thrust, an electric indicator representing a manifold pressure meter responsive to said horsepower function voltage, and means adjustable according to simulated carburetor icing for deriving a voltage opposite in sense to said horsepower voltage for causing decrease of said thrust voltage and change in said indicator reading to represent lower pressure in the presence of an icing condition.

80. In flight training apparatus having simulated flight controls and flight computing apparatus responsive to the operation of said controls for computing flight variables including air speed and angle of attack said computing apparatus including inter-acting servo systems representing air speed and angle of attack, means for simulating wing icing comprising motive means arranged to be energized for deriving gradually varying voltage, said servo systems being responsive to the derived voltage for modifying air speed and angle of attack according to the simulated icing condition, and means under control of the pilot for reversing the operation of said voltage deriving means to simulate de-icing whereby the derived voltage gradually decreases with consequent diminishing effect on air speed and angle of attack.

81. In flight training apparatus having simulated flight controls and flight computing apparatus responsive to the operation of said controls for computing flight variables including rate of pitch, rate of yaw and angle of attack, means arranged to be energized for producing at random variable electrical impulses of opposite sense, said flight computing apparatus being responsive to said electrical impulses for modifying in opposite senses the representations of pitch and rate of yaw and associated flight variables to simulate irregular aerodynamic disturbing effects in characteristic manner, said computing apparatus including means for causing energization of said disturbing means when the computed angle of attack reaches a stall point for simulating aerodynamic effects of stall.

82. Flight simulating apparatus comprising simulated flight controls including an elevator for deriving flight controlling voltages, a flight computing system including a plurality of inter-related and inter-acting servo systems responsive to said voltages for computing flight variables, one of said servo systems being responsive to a voltage derived by said elevator control to represent rate of pitch and another of said servo systems being controlled according to operation of said rate of pitch servo system for representing angle of attack, said angle of attack servo system having means operative when the simulated angle of attack reaches a critical value for abruptly modifying the input to said rate of pitch servo system whereby high negative pitching rate following a stall is simulated.

83. In flight training apparatus having simulated flight controls and flight computing apparatus responsive to the operation of said controls for computing flight variables including rate of pitch, rate of yaw and angle of attack, means for simulating a rough air condition comprising means arranged to be energized for producing at random variable voltage impulses of opposite sense, means controllable by an instructor for causing operation of said rough air simulating means and also for varying the intensity of said impulses, said flight computing apparatus being responsive to said voltage impulses for modifying rate of pitch and rate of yaw and associated flight variables to simulate the disturbing effect of rough air in characteristic manner, and means to cause energization of said rough air simulating means when the angle of attack reaches a critical value for simulating a stall shake.

84. In flight training apparatus having simulated flight controls and flight computing apparatus including a plurality of interrelated and interacting servo systems representing flight variables responsive to the operation of said controls for computing flight variables including rate of pitch, rate of yaw and angle of attack, means for simulating a rough air condition comprising means arranged to be energized for producing at random variable voltage impulses, means controllable by an instructor for causing operations of said rough air simulating means and also for varying the intensity of said impulses, the servo systems representing rates of pitch and yaw respectively being responsive to said voltage impulses for modifying both said variables and associated flight variables to simulate the disturbing effect of rough air in characteristic manner, and means operable by the servo system representing angle of attack to cause energization of said rough air simulating means when the angle of attack reaches a stalling value.

85. In flight training apparatus having simulated flight controls and flight computing apparatus responsive to the operation of said controls including a plurality of interrelated and interacting servo systems for computing flight variables including rate of pitch, rate of yaw, side-slip, roll, altitude and angle of attack, means for simulating a rough air condition comprising means arranged to be energized for producing at random variable voltage impulses of opposite sense, means for causing operation of said rough air simulating means and also for varying the intensity of said impulses, said flight computing apparatus being responsive to said voltage impulses for modifying the operation of a servo system representing rate of pitch and also the operation of another servo system representing rate of yaw, said servo systems in turn modifying the operation of other servo systems representing pitch, side-slip, roll and altitude to simulate the disturbing effect of rough air in characteristic manner, and means to cause energization of said rough air simulating means when the angle of attack reaches a critical value for simulating a stall shake.

86. In flight training apparatus having simulated flight controls and flight computing apparatus including a plurality of interrelated servo systems responsive to the operation of said controls for computing respectively flight variables including angle of attack disturbing means for simulating a rough air condition comprising means arranged to be energized for producing at random variable voltage impulses of opposite sense, means controllable by an instructor for causing operations of said rough air simulating means and also for varying the intensity of said impulses, said flight computing apparatus being responsive to said voltage impulses of opposite sense for modifying the computation of one or more flight variables to simulate disturbing effects in characteristic manner, and means controlled by one of said servo systems representing angle of attack to cause energization of said disturbing means when the angle of attack reaches a critical value for applying randomly varying impulses at the point of stall to simulate stall action.

87. In flight training apparatus having simulated flight controls and flight controls and flight computing apparatus comprising a plurality of interrelated electrical systems responsive to the operation of said controls for computing respectively flight variables including angle of attack and side-slip, disturbing means for simulating a rough air condition comprising means for producing at random variable voltage impulses of opposite sense, means controllable by an instructor for causing operation of said rough air simulating means and also for varying the intensity of said impulses, the flight computing systems representing respectively angle of attack and side-slip being affected by said voltage impulses of opposite sense for modifying the computation of the corresponding flight variables to simulate disturbing effects in characteristic manner, and means controlled by the angle of attack system for causing energization of said disturbing means when the angle of attack reaches a critical value for applying randomly varying impulses at the point of stall to simulate stall action.

88. Flight training apparatus of the emplaced type comprising an individual structural unit including a pilot's seat and simulated aircraft controls constituting a pilot's station, a second individual structural unit juxtapositioned at the front of said pilot's station including flight computing apparatus and a panel having simulated flight indicating instruments responsive to said apparatus, said second unit consisting of a main vertical frame portion having a horizontally offset portion including the instrument panel arranged to overhang the forward portion of the pilot's station, said vertical frame portion having approximately behind said instrument panel a shelf-like structure on which are mounted servo motors for directly operating certain of said flight instruments, said vertical frame portion also having mounted thereon a plurality of servo motors provided with synchronous transmitters for operating corresponding synchronous receivers connected to other of said flight instruments on said panel a third individual structural unit including course charting apparatus positioned rearwardly of said second unit and a shell-like hood simulating an aircraft fuselage substantially enclosing said structural units and having a window adjacent said third unit for enabling an instructor to view said instrument panel.

89. Flight computing apparatus for simulating flight of aircraft comprising simulated aircraft controls, means operable by said controls for deriving flight control voltages, and a plurality of interrelated and interacting electrical systems controlled by said flight voltages for computing and indicating flight variables, said systems including a first electrical system for computing airspeed, a second electrical system for computing rate of pitch and a third electrical system for computing angle of attack, one of the first and second systems having servo controlled voltage deriving means energized by potential from the other system representing that flight variable for in turn deriving potential representing centrifugal force, and the third system representing angle of attack being responsive to said centrifugal force potential.

90. Flight computing apparatus for simulating flight of aircraft comprising simulated aircraft controls including aileron, elevator and rudder controls operable by a pilot, means responsive to the operation of said controls for deriving flight control voltages, a plurality of interrelated and interacting electrical systems including systems representing functions of pitch and roll attitudes, yaw and angle of attack, responsive to said flight voltages for computing the respective flight variable, and a plurality of flight condition indicating instruments including a simulated compass and attitude gyro responsive to the yaw and pitch and roll function systems respectively, certain of said systems adapted to produce signals of opposite sense representing gravity and other factors for affecting the systems controlling said compass and attitude gyro, the roll attitude system having servo controlled means operable according to the simulated roll angle for selecting as to sense said signals for application to systems to which the compass and attiutde gyro are responsive, thereby to simulate continuous roll through 360°.

91. In flight training apparatus having simulated aircraft controls, flight computing apparatus comprising means responsive to the operation of said controls for deriving flight controlling voltages, a plurality of interrelated and interacting electrical systems responsive to said voltages for computing flight variables including roll and pitch attitudes and angle of attack, one of said systems representing pitch attitude being responsive to an elevator control voltage for computing the pitch angle and having servo controlled means for deriving according to pitch attitude potentials of opposite sense representing gravity components acting on the aircraft, one of said gravity component potentials being an input signal for another of said systems representing angle of attack, another of said systems representing roll being responsive to an aileron control voltage and having servo controlled circuit controlling means operable according to the simulated roll angle for determining the sense of the aforesaid input signals to the angle of attack system in simulation of continuous roll through 360°.

92. In flight training apparatus having simulated aircraft controls, flight computing apparatus comprising means responsive to the operation of said controls for deriving flight controlling voltages, a plurality of interrelated and interacting electrical systems responsive to said voltages for computing flight variables including roll and pitch attitudes, angle of attack, rate of pitch and rate of yaw, one of said systems respresenting rate of pitch being responsive to an elevator control voltage for derving a voltage representing rate of pitch, another of said systems representing roll being responsive to an aileron control voltage and having servo controlled means for resolving said rate of pitch voltage into component voltages of opposite sense according to roll angle, one of said component voltages being an input signal for another of said systems representing rate of yaw, another of said systems representing pitch being controlled by said rate of pitch system and having servo controlled means for deriving according to pitch attitude potentials of opposite sense representing gravity components acting on the aircraft, one of said gravity component potentials being an input signal for another of said systems representing angle of attack, said roll system also having circuit controlling means operable according to the simulated roll angle for determining the sense of the aforesaid input signals to the rate of yaw and angle of attack systems in simulation of continuous roll through 360°.

References Cited in the file of this patent

UNITED STATES PATENTS

| | | |
|---|---|---|
| 2,584,261 | Davis et al. | Feb. 5, 1952 |
| 2,636,285 | Fogarty et al. | Apr. 28, 1953 |

UNITED STATES PATENT OFFICE

CERTIFICATE OF CORRECTION

Patent No. 2,842,867

July 15, 1958

Richard C. Dehmel

It is hereby certified that error appears in the printed specification of the above numbered patent requiring correction and that the said Letters Patent should read as corrected below.

Column 4, line 23, for "as such as" read -- as such in --; column 7, line 39, for "24", first occurrence, read -- 24′ --; column 11, line 36, for "contactor" read -- conductor --; column 20, line 54, for "337 and 38" read -- 337 and 338 --; column 22, line 17, for "group" read -- ground --; line 54, for "is", second occurrence, read -- in --; column 23, lines 8 and 9, strike out the sentence "The instructor's switch is connected in parallel therewith."; column 39, line 22, for "may be" read -- may by --; line 23, after "677" strike out "to"; column 40, line 72, for "slide-slip" read -- side-slip --; column 56, lines 37 and 38, strike out "means for deriving said lift quantity according to computed angle of attack"; column 65, line 15, for "including in" read -- including an --; column 72, line 66, after "controls" strike out "and flight controls".

Signed and sealed this 22nd day of March 1960.

(SEAL)
Attest:

KARL H. AXLINE
Attesting Officer

ROBERT C. WATSON
Commissioner of Patents